United States Patent
Katoh et al.

(10) Patent No.: US 11,634,638 B2
(45) Date of Patent: Apr. 25, 2023

(54) LIQUID CRYSTAL COMPOSITION, REFLECTIVE LAYER, METHOD FOR PRODUCING REFLECTIVE LAYER, AND COPOLYMER

(71) Applicant: FUJIFILM Corporation, Tokyo (JP)

(72) Inventors: Shunya Katoh, Minami-ashigara (JP); Keisuke Kodama, Minami-ashigara (JP); Yuko Suzuki, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 346 days.

(21) Appl. No.: 16/837,726

(22) Filed: Apr. 1, 2020

(65) Prior Publication Data

US 2020/0231874 A1 Jul. 23, 2020

Related U.S. Application Data

(63) Continuation of application No. PCT/JP2018/036854, filed on Oct. 2, 2018.

(30) Foreign Application Priority Data

Oct. 2, 2017 (JP) .............................. JP2017-192714

(51) Int. Cl.
| | | |
|---|---|---|
| *C09K 19/38* | (2006.01) | |
| *C08F 220/30* | (2006.01) | |
| *C09K 19/58* | (2006.01) | |
| *G02B 5/08* | (2006.01) | |

(52) U.S. Cl.
CPC ...... *C09K 19/3852* (2013.01); *C08F 220/303* (2020.02); *C09K 19/586* (2013.01); *G02B 5/0808* (2013.01); *C08F 2800/10* (2013.01)

(58) Field of Classification Search
CPC .................................................... C09K 19/38
See application file for complete search history.

(56) References Cited

U.S. PATENT DOCUMENTS

| | | | | |
|---|---|---|---|---|
| 2005/0045854 | A1* | 3/2005 | Radcliffe ........... | C09K 19/3852 252/299.65 |
| 2013/0203920 | A1* | 8/2013 | Tanabe ................... | C08L 33/14 525/200 |
| 2016/0108316 | A1 | 4/2016 | Kurisawa et al. | |
| 2016/0272888 | A1 | 9/2016 | Endou et al. | |
| 2017/0299785 | A1* | 10/2017 | Saitoh .............. | G02F 1/133536 |
| 2018/0142155 | A1 | 5/2018 | Kurisawa et al. | |

FOREIGN PATENT DOCUMENTS

| | | | | |
|---|---|---|---|---|
| JP | 2003-121853 | A | 4/2003 | |
| JP | 2003121853 | A * | 4/2003 | ............. C08L 33/12 |
| JP | 2006-16599 | A | 1/2006 | |
| JP | 2007-504296 | A | 3/2007 | |
| JP | 2013-71945 | A | 4/2013 | |
| JP | 2014-215360 | A | 11/2014 | |
| JP | 2017-122241 | A | 7/2017 | |
| WO | WO 2014/123056 | A1 | 8/2014 | |
| WO | WO 2015/076031 | A1 | 5/2015 | |
| WO | WO-2016111341 | A1 * | 7/2016 | ............. B32B 37/06 |
| WO | WO 2016/204066 | A1 | 12/2016 | |
| WO | WO 2017/010560 | A1 | 1/2017 | |
| WO | WO-2017010560 | A1 * | 1/2017 | |

OTHER PUBLICATIONS

Machine Translation of JP2003121853 (Year: 2022).*
Machine Translation of WO2017010560 (Year: 2022).*
Japanese Notice of Reasons for Refusal for corresponding Japanese Application No. 2019-546725, dated Apr. 27, 2021, with an English translation.
Japanese Notice of Reasons for Refusal for corresponding Japanese Application No. 2019-546725, dated Jan. 11, 2022, with an English translation.
International Preliminary Report on Patentability and Written Opinion of the International Searching Authority (Forms PCT/IB/326, PCT/IB/373 and PCT/ISA/237) for International Application No. PCT/JP2018/036854, dated Apr. 16, 2020, with English translation.
International Search Report (Form PCT/ISA/210) for International Application No. PCT/JP2018/036854, dated Jan. 15, 2019, with English translation.
Chinese Office Action and Search Report for corresponding Chinese Application No. 201860064180.6, dated Jun. 17, 2021, with an English translation.

* cited by examiner

*Primary Examiner* — Chanceity N Robinson
(74) *Attorney, Agent, or Firm* — Birch, Stewart, Kolasch & Birch, LLP

(57) ABSTRACT

Provided are a liquid crystal composition which has excellent planarity in a case of being formed into a coating film and is also capable of forming a reflective layer having excellent diffuse reflectivity, a reflective layer that is formed using the liquid crystal composition, and a method for producing a reflective layer. Provided also is a copolymer that can be used as an alignment control agent for a liquid crystal compound.

19 Claims, No Drawings

LIQUID CRYSTAL COMPOSITION, REFLECTIVE LAYER, METHOD FOR PRODUCING REFLECTIVE LAYER, AND COPOLYMER

CROSS-REFERENCE TO RELATED APPLICATIONS

This application is a Continuation of PCT International Application No. PCT/JP2018/036854 filed on Oct. 2, 2018, which claims priority under 35 U.S.C. § 119(a) to Japanese Patent Application No. 2017-192714 filed on Oct. 2, 2017, The above application is hereby expressly incorporated by reference, in its entirety, into the present application.

BACKGROUND OF THE INVENTION

1. Field of the Invention

The present invention relates to a liquid crystal composition, a reflective layer, a method for producing a reflective layer, and a copolymer.

2. Description of the Related Art

A cholesteric liquid crystalline phase is a liquid crystalline phase in which liquid crystal molecules are aligned in a helical manner and which has a periodic structure with a refractive index anisotropy in a helical axis direction, and has a property of reflecting light corresponding to a helical pitch on a plane perpendicular to the helical axis. In recent years, a layer in which an alignment state of the cholesteric liquid crystalline phase is fixed (hereinafter, also referred to as a "layer formed by fixing a cholesteric liquid crystalline phase") has been applied to various fields such as a light reflecting plate and a screen. Due to the nature of the cholesteric liquid crystalline phase, either dextrorotatory circularly polarized light or levorotatory circularly polarized light is selectively reflected in a case where light is incident from the normal direction of the surface of the layer formed by fixing a cholesteric liquid crystalline phase.

The layer formed by fixing a cholesteric liquid crystalline phase as described above is formed, for example, by applying a liquid crystal composition containing a liquid crystal compound on a transparent base material to form a composition layer, and then fixing the liquid crystal compound contained in the composition layer to a desired alignment state. At that time, the liquid crystal compound in the composition layer is aligned by receiving an alignment regulating force from the base material interface and the air interface.

In addition, a compound containing a fluorine chain is generally known as an alignment control agent for regulating the alignment on the air interface side. For example, JP2006-016599A discloses an example in which uniaxial alignment of a polymerizable rod-like liquid crystal composition is controlled by using a (meth)acrylic copolymer having a molecular weight of 10,000 or more containing a mesogen moiety composed of two rings and a fluorine atom-containing moiety as an alignment control agent.

SUMMARY OF THE INVENTION

By the way, in recent years, attempts have been made to further improve the diffuse reflectivity (property of reflecting light in various directions) of a layer formed by fixing a cholesteric liquid crystalline phase. For example, a method of making the direction of a helical axis of a liquid crystal compound aligned in a cholesteric liquid crystalline phase state non-uniform in a layer has been studied.

The present inventors formed a layer in which a cholesteric liquid crystalline phase was fixed using a liquid crystal composition containing the (meth)acrylic copolymer disclosed in the foregoing JP2006-016599A as an alignment control agent, and examined the diffuse reflectivity thereof. As a result, it was found that the diffuse reflectivity did not satisfy the level required recently.

In addition, the present inventors also studied the performance of a coating film formed from the liquid crystal composition, and found that it is necessary to further improve the planarity. In other words, the present inventors found that it is necessary to further suppress drying unevenness and foreign matter that appear on the surface of the coating film.

In view of the above circumstances, an object of the present invention is to provide a liquid crystal composition which has excellent planarity in a case of being formed into a coating film and is also capable of forming a reflective layer having excellent diffuse reflectivity.

Further, an object of the present invention is to provide a reflective layer that is formed using the liquid crystal composition.

Further, an object of the present invention is to provide a method for producing a reflective layer using the liquid crystal composition.

Further, an object of the present invention is to provide a copolymer that can be used as an alignment control agent for a liquid crystal compound.

As a result of extensive studies to achieve the foregoing objects, the present inventors have found that the foregoing objects can be achieved in a case where the liquid crystal composition contains a polymerizable liquid crystal compound and a copolymer having a predetermined structure. The present invention has been completed based on these findings.

That is, it has been found that the foregoing objects can be achieved by the following configuration.

[1] A liquid crystal composition comprising:
a polymerizable liquid crystal compound; and
a copolymer containing a repeating unit containing a group represented by General Formula (X1) which will be described later and a repeating unit derived from a monomer represented by General Formula (Y1) which will be described later, and having a weight-average molecular weight of less than 10,000.

[2] The liquid crystal composition according to [1], in which a content of the repeating unit containing a group represented by General Formula (X1) is 25% by mass or more with respect to all the repeating units of the copolymer.

[3] The liquid crystal composition according to [1] or [2], in which the repeating unit containing a group represented by General Formula (X1) is a repeating unit derived from a monomer represented by General Formula (X2) which will be described later.

[4] The liquid crystal composition according to any one of [1] to [3], in which $Z^1$ is an alkyl group having 1 to 20 carbon atoms in which —$CH_2$— may be substituted with —O—, —CO—O—, —O—CO—, or —CO—, an alkenyl group having 2 to 20 carbon atoms in which —$CH_2$— may be substituted with —O— or —CO—, a halogen atom, a cyano group, an acetyl group, a formyl group, a carboxy group, or a hydroxy group.

[5] The liquid crystal composition according to any one of [1] to [4], in which, in General Formula (Y1), $A^1$ and $A^2$ each independently represent a 1,2-phenylene group, a 1,3-phenylene group, a 1,4-phenylene group, or a 1,4-cyclohexylene group, each of which may have a substituent, $X^1$ represents a single bond, —O—, —CO—O—, or —O—CO—, one or more of $Y^1$'s represent —CO—O— or —O—CO—, and $Z^1$ represents an alkyl group having 1 to 8 carbon atoms in which —$CH_2$— may be substituted with —O—, —O—CO—O—, —O—CO—, or —CO—, an alkenyl group having 2 to 8 carbon atoms in which —$CH_2$— may be substituted with —O— or —CO—, a halogen atom, or a cyano group.

[6] The liquid crystal composition according to any one of [1] to [5], in which a content of the repeating unit derived from a monomer containing two or more polymerizable groups in the copolymer is less than 5 mol % with respect to all the repeating units of the copolymer.

[7] The liquid crystal composition according to any one of [1] to [6], in which the copolymer has a weight-average molecular weight of less than 9,000.

[8] The liquid crystal composition according to any one of [1] to [7], in which a content of the copolymer is 0.01% by mass or more and less than 5% by mass with respect to a content of the polymerizable liquid crystal compound.

[9] The liquid crystal composition according to any one of [1] to [8], further comprising:

a chiral agent.

[10] A reflective layer obtained by polymerizing the liquid crystal composition according to any one of [1] to [9].

[11] A method for producing a reflective layer, comprising:

a step 1 of forming a composition layer on a transparent base material not subjected to a uniaxial alignment treatment using the liquid crystal composition according to any one of [1] to [9];

a step 2 of aligning a liquid crystal compound contained in the composition layer into a cholesteric liquid crystalline phase state; and a step 3 of fixing the cholesteric liquid crystalline phase after the step 2.

[12] A copolymer comprising:

a repeating unit derived from a monomer represented by General Formula (X2) which will be described later; and a repeating unit derived from a monomer represented by General Formula (Y1) which will be described later, in which the copolymer has a weight-average molecular weight of less than 10,000.

According to the present invention, it is possible to provide a liquid crystal composition which has excellent planarity in a case of being formed into a coating film and is also capable of forming a reflective layer having excellent diffuse reflectivity.

Further, according to the present invention, it is possible to provide a reflective layer that is formed using the liquid crystal composition.

Further, according to the present invention, it is possible to provide a method for producing a reflective layer using the liquid crystal composition.

Further, according to the present invention, it is possible to provide a copolymer that can be used as an alignment control agent for a liquid crystal compound.

DESCRIPTION OF THE PREFERRED EMBODIMENTS

Hereinafter, the present invention will be described in detail.

The description of the constituent elements described below may be made based on representative embodiments of the present invention, but the present invention is not limited to such embodiments.

In the present specification, the numerical range expressed by using "to" means a range including numerical values described before and after "to" as a lower limit value and an upper limit value, respectively.

Further, in the present specification, the term "(meth)acrylate" is a notation expressing both acrylate and methacrylate, the term "(meth)acryloyl group" is a notation expressing both acryloyl group and methacryloyl group, and the term "(meth)acrylic" is a notation expressing both acrylic and methacrylic.

Liquid Crystal Composition

A feature of the liquid crystal composition according to the embodiment of the present invention is that it contains a copolymer which will be described later (hereinafter, also referred to as a "specific copolymer"). Due to including the specific copolymer, the liquid crystal composition according to the embodiment of the present invention has excellent planarity in a case of being formed into a coating film and is also capable of forming a reflective layer having excellent diffuse reflectivity.

Although the action mechanism of the present invention is not clear, the present inventors speculate as follows.

It is considered that, in a case where a composition layer of a liquid crystal composition containing a specific copolymer and a liquid crystal compound is formed on a base material, the specific copolymer is likely to be unevenly distributed at the interface on the air interface side due to the presence of a repeating unit containing a group represented by General Formula (X1) which will be described later, and controls the alignment of the liquid crystal compound from the air interface side. In addition, it is considered that a repeating unit derived from a monomer represented by General Formula (Y1) which will be described later in the specific copolymer has a structure in which a mesogen moiety contained in the repeating unit is easily movable and has excellent compatibility with a liquid crystal compound, due to structural characteristics thereof. It is considered that, due to the synergism of these action mechanisms, the liquid crystal compound is controlled in alignment by the copolymer, and therefore the direction of the helical axis of the helically aligned liquid crystal compound becomes non-uniform in the layer, in a case where the liquid crystal compound in the composition layer is aligned into a cholesteric liquid crystalline phase state.

As a result, the layer formed by fixing a cholesteric liquid crystalline phase (that is, the layer in which the alignment state is fixed (hereinafter, also referred to as "CL layer") has a cholesteric liquid crystal structure, and the cholesteric liquid crystal structure gives a stripe pattern of a bright portion (continuous line) and a dark portion (continuous line) in a cross-sectional view of the CL layer observed by a scanning electron microscope (SEM), and therefore has a region in which the angle between the normal of a line formed by at least one dark portion and the surface of the CL layer periodically or irregularly changes (note that the region in which the angle between the normal of a line formed by at least one dark portion and the surface of the CL layer periodically changes can be confirmed in a cross-sectional SEM image, for example, as a region in which the bright portion and the dark portion have a wave-like structure). Therefore, light incident from the normal direction of the CL layer is reflected by the CL layer, and the light can be diffusely reflected in various directions, not in limited directions.

On the other hand, in a case where the direction of the helical axis of the helically aligned liquid crystal compound is uniform in the layer in the state of the cholesteric liquid crystalline phase, the cholesteric liquid crystal structure gives a stripe pattern of a bright portion (continuous line) and a dark portion (continuous line) in a cross-sectional view of the CL layer observed by a scanning electron microscope, and therefore both the bright portion and the dark portion are linear so as to be parallel to the surface of the CL layer. Therefore, in a case where light is incident from the normal direction of the CL layer, the light is reflected in the normal direction, but is hardly reflected in the oblique direction, which results in poor diffuse reflectivity.

In addition, according to the foregoing specific copolymer, it has also been confirmed that the planarity of the coating film of the composition layer of the liquid crystal composition is improved owing to the fact that the specific copolymer has a weight-average molecular weight of less than a predetermined value and the fact that the specific copolymer contains a repeating unit containing a group represented by General Formula (X1). In particular, as will be described later, it has been confirmed that, in a case where the content of the repeating unit containing a group represented by General Formula (X1) is 25% by mass with respect to all the repeating units of the specific copolymer, not only the planarity of the composition layer of the liquid crystal composition is excellent, but also the diffuse reflectivity of the reflective layer is more excellent.

(Specific Copolymer)

Hereinafter, the specific copolymer will be described.

The specific copolymer contains a repeating unit containing a group represented by General Formula (X1) which will be described later and a repeating unit derived from a monomer represented by General Formula (Y1) which will be described later, and has a weight-average molecular weight of less than 10,000.

Hereinafter, each of repeating units contained in the specific copolymer will be described.

<Repeating Unit Containing Group Represented by General Formula (X1)>

The specific copolymer contains a repeating unit containing a group represented by General Formula (X1).

Hereinafter, General Formula (X1) will be described.

*-L$^{11}$-CF$_2$X$^a$ (X1)

In Formula (X1), L$^{11}$ represents a single bond or a perfluoroalkylene group having 1 to 6 carbon atoms which may contain —O—. The perfluoroalkylene group having 1 to 6 carbon atoms which may contain —O— and is represented by L$^{11}$ may be linear or branched. Examples of the branched perfluoroalkylene group having 1 to 6 carbon atoms which may contain —O— and is represented by L$^{11}$ include, in a case where the number of carbon atoms is 4, —CF(CF$_3$)OCF$_2$CF$_2$—, —CF$_2$CF$_2$OCF(CF$_3$)—, —CF(CF$_3$)CF$_2$CF$_2$CF$_2$—, and —CF$_2$CF$_2$CF(CF$_3$)—.

As the perfluoroalkylene group having 1 to 6 carbon atoms which may contain —O— and is represented by L$^{11}$, a perfluoroalkylene group having 1 to 6 carbon atoms is preferable, and a perfluoroalkylene group having 4 to 6 carbon atoms is more preferable.

X$^a$ represents a hydrogen atom or a fluorine atom. X$^a$ is preferably a fluorine atom.

* represents a bonding position.

In a case where X$^a$ represents a hydrogen atom, L$^{11}$ is preferably a perfluoroalkylene group having 1 to 6 carbon atoms which may contain —O—.

The repeating unit containing a group represented by General Formula (X1) is preferably a repeating unit derived from a monomer represented by Formula (X2).

(X2)

In General Formula (X2), R$^{11}$ represents a hydrogen atom or a methyl group. R$^{11}$ is preferably a hydrogen atom.

R$^{12}$ represents a monovalent group including the group represented by General Formula (X1).

The monovalent group including the group represented by General Formula (X1), which is represented by R$^{12}$, is not particularly limited, and examples thereof include General Formula (X3).

*-L$^{12}$-L$^{11}$-CF$_2$X$^a$ (X3)

In General Formula (X3), L$^{12}$ is a single bond or an alkylene group having 1 to 30 carbon atoms in which —CH$_2$— may be substituted with —O—. The number of carbon atoms in the alkylene group having 1 to 30 carbon atoms in which —CH$_2$— may be substituted with —O—, which is represented by L$^{12}$, is preferably 1 to 20 and more preferably 1 to 10. The alkylene group may be linear, branched, or cyclic. L$^{12}$ may further have a substituent. Examples of the substituent include a hydroxy group.

In General Formula (X3), L$^{11}$ and X$^a$ each have the same definition as L$^{11}$ and X$^a$ in General Formula (X1), and the suitable aspects thereof are also the same.

In General Formula (X3), * represents a bonding position.

From the viewpoint of reducing the surface energy of the liquid crystal composition and enhancing the effects of the present invention, the monomer represented by General Formula (X3) is preferably a monomer represented by General Formula (X4).

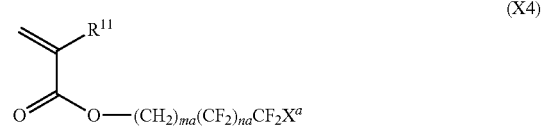

(X4)

In General Formula (X4), R$^{11}$ represents a hydrogen atom or a methyl group. R$^{11}$ is preferably a hydrogen atom.

ma represents an integer of 0 or more. The upper limit of ma is, for example, 20 or less. ma is preferably an integer of 1 to 10, more preferably an integer of 1 to 6, and still more preferably an integer of 1 to 4.

na represents an integer of 1 to 6. na is more preferably an integer of 3 to 5.

X$^a$ represents a hydrogen atom or a fluorine atom. X$^a$ is preferably a fluorine atom.

Examples of the monomer represented by General Formula (III) include 2,2,2-trifluoroethyl (meth)acrylate, 2,2,3,3,3-pentafluoropropyl (meth)acrylate, 2-(perfluorobutyl) ethyl (meth)acrylate, 2-(perfluorohexyl)ethyl (meth) acrylate, 2-(perfluoroheptyl)ethyl (meth)acrylate, 2-(perfluoro-3-methylbutyl)ethyl (meth)acrylate, 2-(perfluoro-5-methylhexyl)ethyl (meth)acrylate, 1H,1H,3H-tetrafluoropropyl (meth)acrylate, 1H,1H,5H-octafluoropentyl (meth)acrylate, 1H,1H,7H-dodecafluoroheptyl (meth)acrylate, 1H-1-(trifluoromethyl)trifluoroethyl (meth)acrylate, 1H,1H,3H-hexafluorobutyl (meth)acrylate, 3-perfluorobutyl-2-hydroxypropyl (meth)acrylate, 3-perfluorohexyl-2-hydroxypropyl (meth)acrylate, 3-(perfluoro-3-methylbutyl)-2-hydroxypropyl (meth)acrylate, and 3-(perfluoro-5-methylhexyl)-2-hydroxypropyl (meth)acrylate.

The content of the repeating unit containing a group represented by General Formula (X1) in the specific copolymer (in a case where there are a plurality of repeating units containing a group represented by General Formula (X1), the total content of the plurality of repeating units) is, for example, 5% by mass or more with respect to all the repeating units of the specific copolymer, and is preferably 25% by mass or more from the viewpoint that the composition layer of the liquid crystal composition has more excellent planarity and the reflective layer has more excellent diffuse reflectivity. The upper limit value of the content of the repeating unit containing a group represented by General Formula (X1) is, for example, 70% by mass or less and preferably 60% by mass or less with respect to all the repeating units of the specific copolymer.

<Repeating Unit Derived from Monomer Represented by General Formula (Y1)>

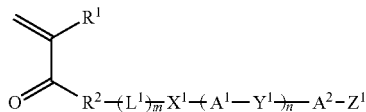

(Y1)

In Formula (Y1), $R^1$ represents a hydrogen atom or a methyl group. $R^1$ is preferably a hydrogen atom.

$R^2$ represents —O— or —NR$^3$— where $R^3$ represents a hydrogen atom or an alkyl group having 1 to 3 carbon atoms. $R^2$ is preferably —O—. Incidentally, $R^3$ is preferably a hydrogen atom.

$L^1$ represents an alkylene group having 1 to 20 carbon atoms in which —$CH_2$— may be substituted with —O—, —S—, or —CO—. In addition, in $L^1$, the position adjacent to $X^1$ is preferably a carbon atom.

The number of carbon atoms in the alkylene group having 1 to 20 carbon atoms in which —$CH_2$— may be substituted with —O—, —S—, or —CO—, which is represented by $L^1$, is not particularly limited, but is preferably 1 to 15, more preferably 1 to 10, and still more preferably 1 to 6.

In particular, the alkylene group having 1 to 20 carbon atoms in which —$CH_2$— may be substituted with —O—, —S—, or —CO—, which is represented by $L^1$, is preferably an alkylene group having 1 to 10 carbon atoms and more preferably an alkylene group having 1 to 6 carbon atoms.

The alkylene group having 1 to 20 carbon atoms in which —$CH_2$— may be substituted with —O—, —S—, or —CO—, which is represented by $L^1$, may further have a substituent.

$X^1$ and $Y^1$ each independently represent a single bond, —O—, —CO—O—, —O—CO—, —O—CO—O—, —O—$CH_2$—, —$CH_2$—O—, —C=N—, —N=C—, —CO—O—$CH_2CH_2$, or —$CH_2CH_2$—CO—O—.

$X^1$ is preferably a single bond, —O—, —CO—O—, or —O—CO—, more preferably a single bond or —O—, and still more preferably —O— from the viewpoint that the diffuse reflectivity of the reflective layer is more excellent.

$Y^1$ is preferably a single bond, —CO—O—, or —O—CO— from the viewpoint that the diffuse reflectivity of the reflective layer is more excellent, and it is preferred that one or more of $Y^1$'s represent —CO—O— or —O—CO—.

$A^1$ and $A^2$ each independently represent a phenylene group, a cyclohexylene group, or a naphthylene group, each of which may have a substituent.

In particular, from the viewpoint that the diffuse reflectivity of the reflective layer is more excellent, $A^1$ is preferably a 1,2-phenylene group, a 1,3-phenylene group, a 1,4-phenylene group, or a 1,4-cyclohexylene group, each of which may have a substituent, and more preferably a 1,4-phenylene group which may have a substituent.

In particular, from the viewpoint that the diffuse reflectivity of the reflective layer is more excellent, $A^2$ is preferably a 1,2-phenylene group, a 1,3-phenylene group, a 1,4-phenylene group, or a 1,4-cyclohexylene group, each of which may have a substituent, and more preferably a 1,4-phenylene group which may have a substituent.

The substituents that $A^1$ and $A^2$ may have are not particularly limited, and examples thereof include an alkyl group having 1 to 20 carbon atoms in which —$CH_2$— may be substituted with —O—, —CO—O—, or —O—CO—.

$Z^1$ represents an alkyl group having 1 to 20 carbon atoms in which —$CH_2$— may be substituted with —O—, —CO—O—, —O—CO—O—, or —CO—, an alkenyl group having 2 to 20 carbon atoms in which —$CH_2$— may be substituted with —O— or —CO—, a halogen atom, a cyano group, an acetyl group, a formyl group, a carboxy group, a hydrogen atom, or a hydroxy group.

The number of carbon atoms in the alkyl group having 1 to 20 carbon atoms in which —$CH_2$— may be substituted with —O—, —CO—O—, —O—CO—, or —CO—, which is represented by $Z^1$, is preferably 1 to 10, more preferably 1 to 8, and still more preferably 1 to 6. The alkyl group having 1 to 20 carbon atoms in which —$CH_2$— may be substituted with —O—, —CO—O—, —O—CO—, or —CO—, which is represented by $Z^1$, may be linear, branched, or cyclic.

The alkyl group having 1 to 20 carbon atoms in which —$CH_2$— may be substituted with —O—, —CO—O—, —O—CO—O—, or —CO—, which is represented by $Z^1$, is preferably an alkyl group having 1 to 10 carbon atoms in which —$CH_2$— may be substituted with —CO—O— or —O—CO—, and more preferably an alkyl group having 1 to 8 carbon atoms in which —$CH_2$— may be substituted with —CO—O— or —O—CO—.

The number of carbon atoms in the alkenyl group having 2 to 20 carbon atoms in which —$CH_2$— may be substituted with —O— or —CO—, which is represented by $Z^1$, is preferably 2 to 10, more preferably 2 to 8, and still more preferably 2 to 6. The alkenyl group having 2 to 20 carbon atoms in which —$CH_2$— may be substituted with —O— or —CO—, which is represented by $Z^1$, may be linear, branched, or cyclic.

The alkenyl group having 2 to 20 carbon atoms in which —$CH_2$— may be substituted with —O— or —CO—, which is represented by $Z^1$, is preferably an alkenyl group having 2 to 10 carbon atoms in which —$CH_2$— may be substituted with —O— or —CO— and more preferably an alkenyl group having 2 to 8 carbon atoms in which —$CH_2$— may be substituted with —O— or —CO—.

From the viewpoint that the diffuse reflectivity of the reflective layer is more excellent, $Z^1$ is preferably an alkyl group having 1 to 20 carbon atoms in which —$CH_2$— may be substituted with —O—, —CO—O—, —O—CO—, or —CO—, or —CO—, an alkenyl group having 2 to 20 carbon atoms in which —CH$_2$— may be substituted with —O— or —CO—, a halogen atom, a cyano group, an acetyl group, a formyl group, a carboxy group, or a hydroxy group, and more preferably an alkyl group having 1 to 8 carbon atoms in which —CH$_2$— may be substituted with —CO—O— or —O—CO—, an alkenyl group having 2 to 8 carbon atoms in which —CH$_2$— may be substituted with —O— or —CO—, a halogen atom, or a cyano group. That is, Z$^1$ is preferably other than a hydrogen atom.

In addition, the alkyl group having 1 to 20 carbon atoms in which —CH$_2$— may be substituted with —O—, —CO—O—, —O—CO—, or —CO—, and the alkenyl group having 2 to 20 carbon atoms in which —CH$_2$— may be substituted with —O— or —CO—, each of which is represented by Z$^1$, may further have a substituent.

m represents 0 or 1. m is preferably 1 from the viewpoint that the diffuse reflectivity of the reflective layer is more excellent.

n represents an integer of 2 to 4. n is preferably 2 or 3 from the viewpoint of more excellent planarity.

In General Formula (Y1), a plurality of A$^1$'s and a plurality of Y$^1$'s may be the same as or different from each other.

Hereinafter, specific examples of the monomer represented by General Formula (Y1) will be described, but the present invention is not limited thereto.

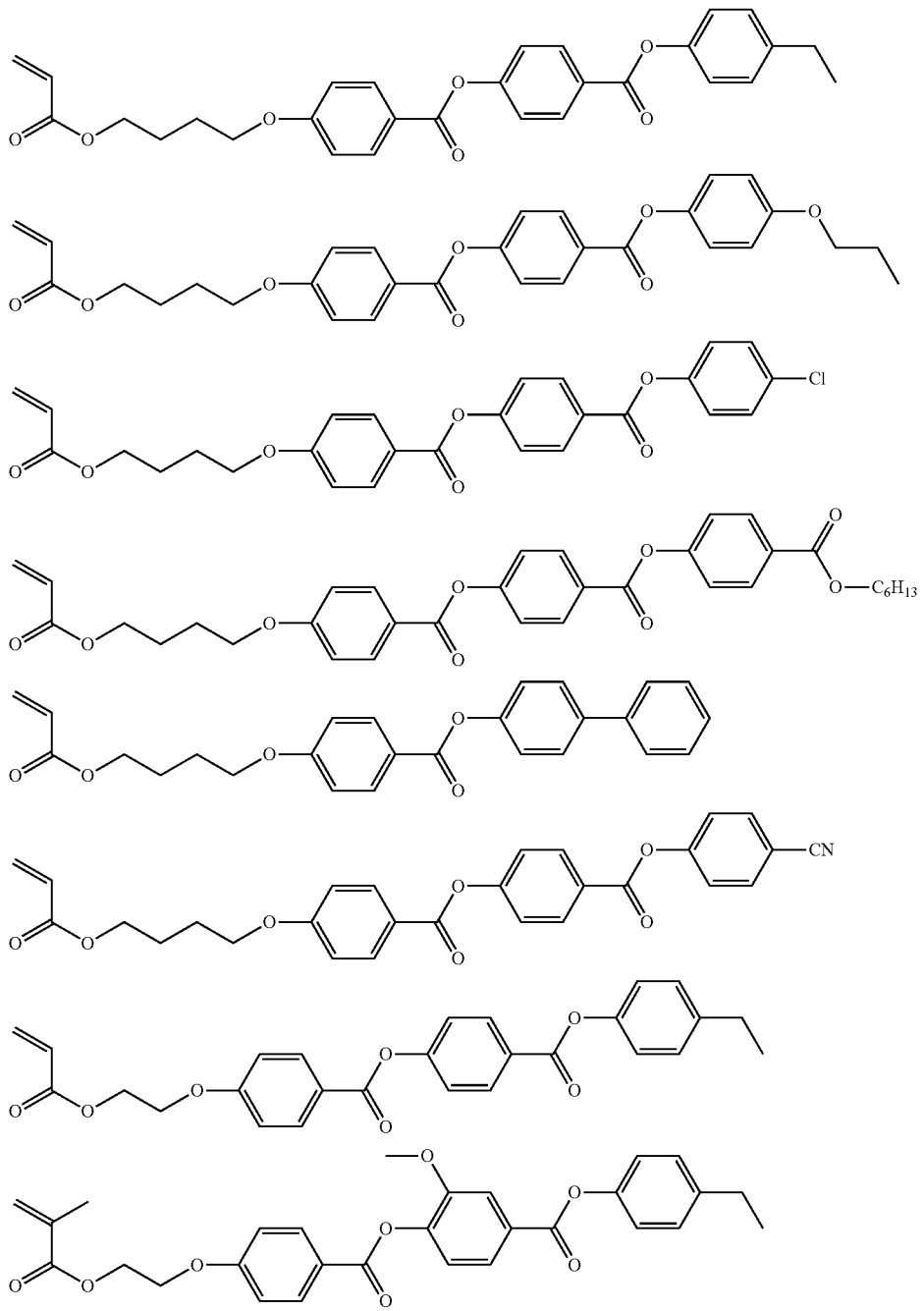

-continued
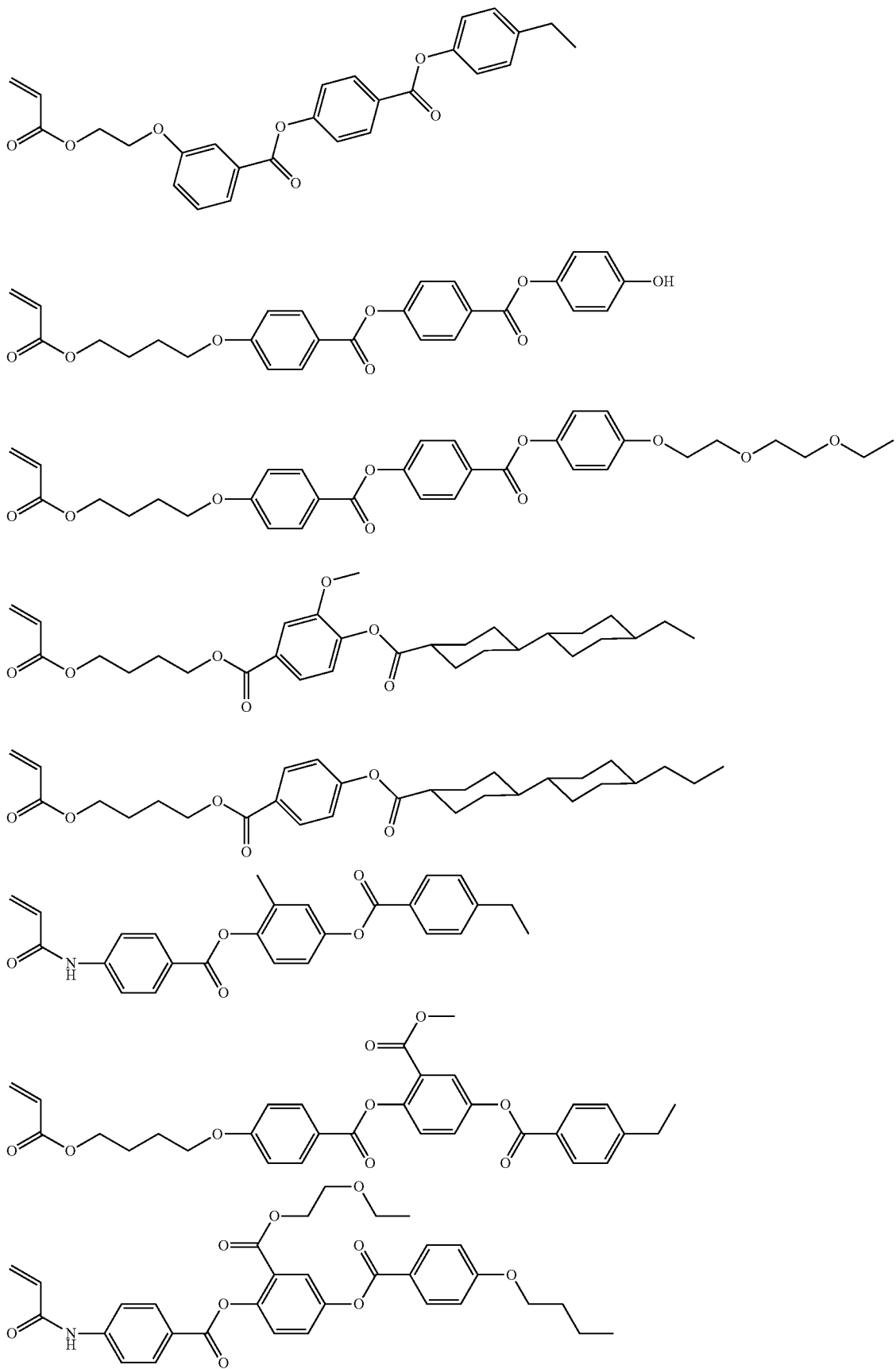

-continued

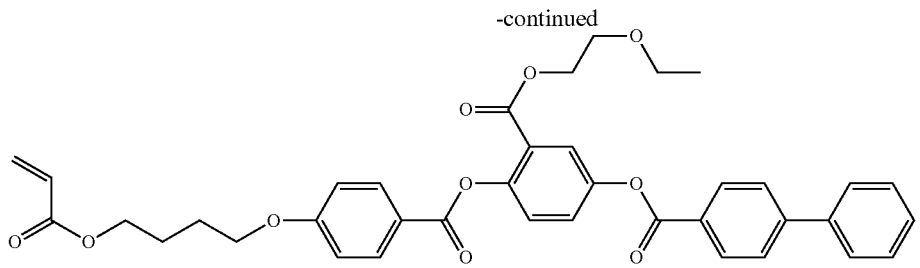

The content of the repeating unit derived from General Formula (Y1) in the specific copolymer (in a case where there are a plurality of repeating units derived from General Formula (Y1), the total content of the plurality of repeating units) is, for example, 40% by mass or more, preferably 60% by mass or more, and more preferably 65% by mass or more with respect to all the repeating units of the specific copolymer. The upper limit value of the content of the repeating unit derived from General Formula (Y1) is, for example, 95% by mass or less, preferably 80% by mass or less, and more preferably 75% by mass or less, with respect to all the repeating units of the specific copolymer.

<Other Copolymerization Components>

The specific copolymer may further contain a repeating unit derived from other copolymerizable monomers, in addition to the repeating unit containing a group represented by General Formula (X1) and the repeating unit derived from a monomer represented by General Formula (Y1).

The other copolymerizable monomers are not particularly limited, and examples thereof include monomers such as BLEMMER E, BLEMMER PE90, BLEMMER PE200, BLEMMER PE350, BLEMMER AE90, BLEMMER AE200, BLEMMER AE400, BLEMMER P, BLEMMER PP1000, BLEMMER PP500, BLEMMER PP800, BLEMMER AP400, BLEMMER AP550, BLEMMER AP800, BLEMMER BMA, BLEMMER CHMA, BLEMMER CHA, BLEMMER LMA, BLEMMER GLM, AND BLEMMER LA (all of which are manufactured by NOF Corporation), and monomers such as acrylic acid, 4-acryloylmorpholine, N,N-diisopropylacrylamide, vinylpyrrolidone, hydroxyethyl methacrylate, and acetoacetoxyethyl methacrylate.

In a case where the specific copolymer contains a repeating unit derived from other copolymerizable monomers, the content of the repeating unit derived from other copolymerizable monomers (in a case where there are a plurality of repeating units derived from other copolymerizable monomers, the total content of the plurality of repeating units) is, for example, 40% by mass or less, preferably 20% by mass or less, and more preferably 10% by mass or less, with respect to all the repeating units of the specific copolymer.

In the specific copolymer, the content of the repeating unit derived from a monomer containing two or more polymerizable groups is preferably less than 5 mol % with respect to all the repeating units of the specific copolymer, from the viewpoint that the mesogen moiety in General Formula (Y1) is easily movable and the diffuse reflectivity of the reflective layer is more excellent. Here, the polymerizable group may be, for example, a polymerizable ethylenically unsaturated group or a ring polymerizable group. Specific examples of the polymerizable group include a (meth)acryloyl group, a vinyl group, a styryl group, an allyl group, an epoxy group, and an oxetane group.

It is preferable that General Formula (Y1) does not include two or more polymerizable groups.

The weight-average molecular weight of the specific copolymer is less than 10,000. The weight-average molecular weight of the specific copolymer is more preferably less than 9,000 from the viewpoint of more excellent planarity. The lower limit of the weight-average molecular weight of the specific copolymer is not particularly limited, but is, for example, 4,000 or more. The dispersity (Mw/Mn) is usually 1.0 to 3.0, preferably 1.0 to 2.0, and more preferably 1.1 to 2.0.

The specific copolymer can be synthesized by a conventional method.

The specific copolymer may be used alone or in combination of two or more thereof.

The content of the specific copolymer (in a case where there are a plurality of specific copolymers, the total content of the plurality of specific copolymers) in the liquid crystal composition is preferably 0.01% by mass or more and less than 5% by mass, more preferably 0.01% to 3% by mass, and still more preferably 0.05% to 3% by mass with respect to the content of the polymerizable liquid crystal compound contained in the composition.

Polymerizable Liquid Crystal Compound

The liquid crystal composition contains a polymerizable liquid crystal compound. In addition, the polymerizable liquid crystal compound is intended to refer to a liquid crystal compound having a polymerizable group. Hereinafter, the polymerizable liquid crystal compound that can be used in the present invention will be described in detail.

The type of the liquid crystal compound is not particularly limited.

Generally, liquid crystal compounds can be classified into a rod type (rod-like liquid crystal compound) and a disc type (discotic liquid crystal compound, disk-like liquid crystal compound) depending on the shape thereof. Further, the rod type and the disk type each have a low molecular weight type and a high molecular weight type. The high molecular weight generally refers to having a degree of polymerization of 100 or more (Polymer Physics-Phase Transition Dynamics, Masao Doi, page 2, Iwanami Shoten, 1992). Any liquid crystal compound can be used in the present invention. Two or more liquid crystal compounds may be used in combination.

The liquid crystal compound has a polymerizable group. The type of the polymerizable group is not particularly limited, and a functional group capable of addition polymerization reaction is preferable, and a polymerizable ethylenically unsaturated group or a cyclic polymerizable group is more preferable. More specifically, the polymerizable group is preferably a (meth)acryloyl group, a vinyl group, a styryl group, an allyl group, an epoxy group, or an oxetane group, and more preferably a (meth)acryloyl group.

The number of polymerizable groups is not particularly limited, and may be one or more. Above all, the number of the polymerizable groups is preferably plural, more preferably 2 to 6, and still more preferably 2 to 4 from the viewpoint that the diffuse reflectivity of the reflective layer is more excellent.

The molecular weight of the liquid crystal compound is not particularly limited, but is preferably 400 or more and more preferably 700 or more. The upper limit of the molecular weight of the liquid crystal compound is not particularly limited, but is often 2000 or less (especially in a case of a low-molecular weight type liquid crystal compound).

In addition, in a case where a rod-like liquid crystal compound is used, the liquid crystal compound is preferably a compound having four or more rings in the core portion of the mesogen group in the liquid crystal compound, and more preferably a compound having five or more rings in the core portion of the mesogen group in the liquid crystal compound, from the viewpoint of controlling the viscosity.

The liquid crystal compound is preferably a liquid crystal compound represented by Formula (I) from the viewpoint that the reflective layer has more excellent diffuse reflectivity.

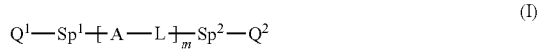

(I)

In the formula,

A represents a phenylene group which may have a substituent or a trans-1,4-cyclohexylene group which may have a substituent, L represents a single bond or a linking group selected from the group consisting of —CH$_2$O—, —OCH$_2$—, —(CH$_2$)$_2$O—CO—, —CO—O(CH$_2$)$_2$—, —CO—O—, —O—CO—, —O—CO—O—, —CH=CH—CO—O—, —O—CO—CH=CH—, —CH=N—N=CH—, —C=N—, —N=C—, —C≡C—, and —NH—, m represents an integer of 3 to 12, Sp$^1$ and Sp$^2$ each independently represent a single bond or a linking group selected from the group consisting of a linear or branched alkylene group having 1 to 20 carbon atoms and a group where one or two or more —CH$_2$— in a linear or branched alkylene group having 1 to 20 carbon atoms is substituted by —O—, —S—, —NH—, —N(CH$_3$)—, —CO—, —O—CO—, or —CO—O—, and Q$^1$ and Q$^2$ each independently represent a hydrogen atom or a polymerizable group selected from the group consisting of groups represented by Formulae (Q-1) to (Q-5), provided that one of Q$^1$ and Q$^2$ represents a polymerizable group.

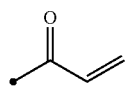

(Q-1)

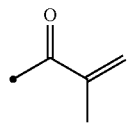

(Q-2)

(Q-3)

-continued

(Q-4)

(Q-5)

A is a phenylene group which may have a substituent or a trans-1,4-cyclohexylene group which may have a substituent. In the present specification, the phenylene group is preferably a 1,4-phenylene group.

m pieces of A's may be the same as or different from each other.

In a case where a trans-1,4-cyclohexylene group which may have a substituent is contained as A, from the viewpoint of more excellent diffuse reflectivity of the reflective layer, upon assuming that the number obtained by dividing the number of trans-1,4-cyclohexylene groups which may have a substituent, which is represented by A, by m is defined as mc, a liquid crystal compound satisfying mc>0.1 is preferable, and a liquid crystal compound satisfying 0.4≤mc≤0.8 is more preferable.

Note that mc is a number represented by the following calculating expression.

mc=(the number of trans-1,4-cyclohexylene groups which may have a substituent represented by A)/m m represents an integer of 3 to 12, preferably an integer of 3 to 9, more preferably an integer of 3 to 7, and still more preferably an integer of 3 to 5.

The substituent which the phenylene group and the trans-1,4-cyclohexylene group in Formula (I) may have is not particularly limited, and examples thereof include substituents selected from the group consisting of an alkyl group, a cycloalkyl group, an alkoxy group, an alkyl ether group, an amide group, an amino group, a halogen atom, and a group formed by combining two or more of these substituents. Examples of the substituent include substituents represented by —CO—X$^3$-Sp$^3$-Q$^3$ which will be described later. The phenylene group and the trans-1,4-cyclohexylene group may have 1 to 4 substituents. In a case of having two or more substituents, the two or more substituents may be the same as or different from each other.

In the present specification, the alkyl group may be either linear or branched. The number of carbon atoms in the alkyl group is preferably 1 to 30, more preferably 1 to 10, and still more preferably 1 to 6. Examples of the alkyl group include a methyl group, an ethyl group, an n-propyl group, an isopropyl group, an n-butyl group, an isobutyl group, a sec-butyl group, a tert-butyl group, an n-pentyl group, an isopentyl group, a neopentyl group, a 1,1-dimethylpropyl group, an n-hexyl group, an isohexyl group, a heptyl group, an octyl group, a nonyl group, a decyl group, an undecyl group, and a dodecyl group. The explanation of the alkyl group in the alkoxy group is also the same as the explanation on the foregoing alkyl group. Further, in the present specification, specific examples of the alkylene group in a case of being referred to as an alkylene group include divalent groups obtained by removing one hydrogen atom from each of the foregoing examples of the alkyl group. Examples of the halogen atom include a fluorine atom, a chlorine atom, a bromine atom, and an iodine atom.

In the present specification, the number of carbon atoms in the cycloalkyl group is preferably 3 or more and more preferably 5 or more and is preferably 20 or less, more preferably 10 or less, still more preferably 8 or less, and particularly preferably 6 or less. Examples of the cycloalkyl group include a cyclopropyl group, a cyclobutyl group, a cyclopentyl group, a cyclohexyl group, a cycloheptyl group, and a cyclooctyl group.

The substituent which the phenylene group and the trans-1,4-cyclohexylene group may have is preferably a substituent selected from the group consisting of an alkyl group, an alkoxy group, and —CO—$X^3$-$Sp^3$-$Q^3$. Here, $X^3$ represents a single bond, —O—, —S—, or —N($Sp^4$-$Q^4$)- or represents a nitrogen atom forming a ring structure together with $Q^3$ and $Sp^3$. $Sp^3$ and $Sp^4$ each independently represent a single bond or a linking group selected from the group consisting of a linear or branched alkylene group having 1 to 20 carbon atoms and a group where one or two or more —$CH_2$— in a linear or branched alkylene group having 1 to 20 carbon atoms is substituted with —O—, —S—, —NH—, —N($CH_3$)—, —CO—, —O—CO—, or —CO—O—.

$Q^3$ and $Q^4$ each independently represent a hydrogen atom, a cycloalkyl group, a group where one or two or more —$CH_2$— in a cycloalkyl group is substituted with —O—, —S—, —NH—, —N($CH_3$)—, —CO—, —O—CO—, or —CO—O—, or any polymerizable group selected from the group consisting of groups represented by Formulae (Q-1) to (Q-5).

Specific examples of the group where one or two or more —$CH_2$— in a cycloalkyl group is substituted with —O—, —S—, —NH—, —N($CH_3$)—, —CO—, —O—CO—, or —CO—O— include a tetrahydrofuranyl group, a pyrrolidinyl group, an imidazolidinyl group, a pyrazolidinyl group, a piperidyl group, a piperazinyl group, and a morpholinyl group. Among them, a tetrahydrofuranyl group is preferable, and a 2-tetrahydrofuranyl group is more preferable.

In Formula (I), L represents a single bond or a linking group selected from the group consisting of —$CH_2$O—, —O$CH_2$—, —($CH_2$)$_2$O—CO—, —CO—O($CH_2$)$_2$—, —CO—O—, —O—CO—, —O—CO—O—, —CH=CH—CO—O—, —O—CO—CH=CH—, —CH=N—N=CH—, —C=N—, —N=C, —C≡C—, and —NH—. L is preferably —CO—O—, —O—CO—, or —NH—, m pieces of L's may be the same as or different from each other.

$Sp^1$ and $Sp^2$ each independently represent a single bond or a linking group selected from the group consisting of a linear or branched alkylene group having 1 to 20 carbon atoms and a group where one or two or more —$CH_2$— in a linear or branched alkylene group having 1 to 20 carbon atoms is substituted with —O—, —S—, —NH—, —N($CH_3$)—, —CO—, —O—CO—, or —CO—O—, $Sp^1$ and $Sp^2$ are each independently preferably a linking group formed by combining one or two or more groups selected from the group consisting of a linear alkylene group having 1 to 10 carbon atoms to which a linking group selected from the group consisting of —O—, —O—CO—, and —CO—O— is bonded to both terminals thereof, —O—CO—, —CO—O—, —O—, and a linear alkylene group having 1 to 10 carbon atoms, and more preferably a linear alkylene group having 1 to 10 carbon atoms to which —O— is bonded to both terminals thereof.

$Q^1$ and $Q^2$ each independently represent a hydrogen atom or a polymerizable group selected from the group consisting of groups represented by Formulae (Q-1) to (Q-5), provided that either one of $Q^1$ and $Q^2$ represents a polymerizable group.

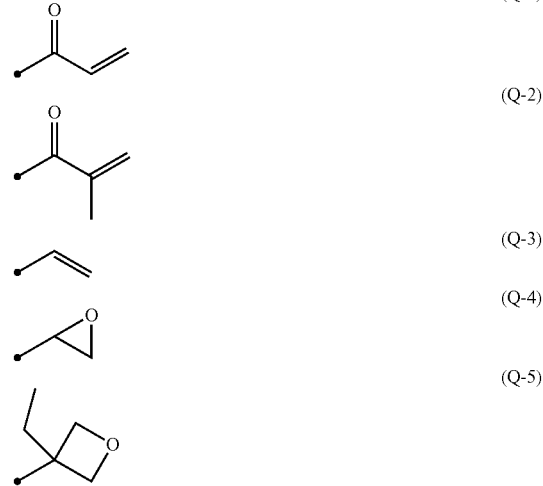

The polymerizable group is preferably an acryloyl group (Formula (Q-1)) or a methacryloyl group (Formula (Q-2)).

Specific examples of the liquid crystal compound include a liquid crystal compound represented by Formula (1-11), a liquid crystal compound represented by Formula (I-21), and a liquid crystal compound represented by Formula (I-31). In addition to the foregoing compounds, known compounds such as a compound represented by Formula (I) in JP2013-112631A, a compound represented by Formula (I) in JP2010-070543A, a compound represented by Formula (I) in JP2008-291218A, a compound represented by Formula (I) in JP4725516B, a compound represented by General Formula (II) in JP2013-087109A, a compound described in paragraph [0043] of JP2007-176927A, a compound represented by Formula (1-1) in JP2009-286885A, a compound represented by General Formula (I) in WO2014/010325A, a compound represented by Formula (1) in JP2016-081035A, and a compound represented by Formulae (2-1) and (2-2) in JP2016-121339A can be mentioned.

Liquid Crystal Compound Represented by Formula (I-11)

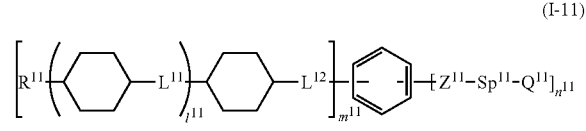

In the formula, $R^{11}$ represents a hydrogen atom, a linear or branched alkyl group having 1 to 12 carbon atoms, or —$Z^{12}$-$Sp^{12}$-$Q^{12}$, $L^{11}$ represents a single bond, —CO—O—, or —CO—, $L^{12}$ represents —CO—O—, —O—CO—, —CO—$NR^2$—, or —$NR^2$—CO—, $R^2$ represents a hydrogen atom or an alkyl group having 1 to 3 carbon atoms, $Z^{11}$ and $Z^{12}$ each independently represent a single bond, —O—, —NH—, —N($CH_3$)—, —S—, —CO—O—, —O—CO—, —O—CO—O—, —CO—$NR^{12}$, or —$NR^{12}$—CO—, $Sp^{11}$ and $Sp^{12}$ each independently represent a single bond, a linear or branched alkylene group having 1 to 12 carbon atoms which may be substituted with $Q^{11}$, or a linking group obtained by substituting one or more —$CH_2$— in a linear or branched alkylene group having 1 to 12 carbon atoms which may be substituted with $Q^{11}$ with —O—, —S—, —NH—, —N($Q^{11}$)-, or —CO—, $Q^{11}$ represents a hydrogen atom, a cycloalkyl group, a group where one or two or more —$CH_2$— in a cycloalkyl group are substituted with —O—, —S—, —NH—, —N($CH_3$)—, —CO—, —O—CO—, or —CO—O—, or a polymerizable group selected from the group consisting of groups represented by Formulae (Q-1) to (Q-5), $Q^{12}$ represents a hydrogen atom or a polymerizable group selected from the group consisting of groups represented by Formulae (Q-1) to (Q-5), $l^{11}$ represents an integer of 0 to 2, $m^{11}$ represents an integer of 1 or 2, $n^{11}$ represents an integer of 1 to 3, and a plurality of $R^{11}$'s, a plurality of $L^{11}$'s, a plurality of $L^{12}$'s, a plurality of $l^{11}$'s, a plurality of $Z^{11}$'s, a plurality of $Sp^{11}$'s, and a plurality of $Q^{11}$'s may be respectively the same as or different from each other.

The liquid crystal compound represented by Formula (I-11) contains at least one -$Z^{12}$-$Sp^{12}$-$Q^{12}$ in which $Q^{12}$ is a polymerizable group selected from the group consisting of groups represented by Formulae (Q-1) to (Q-5), as $R^{11}$.

In addition, in the liquid crystal compound represented by Formula (I-11), $R^{11}$ is preferably -$Z^{11}$-$Sp^{11}$-$Q^{11}$ in which $Z^{11}$ is —CO—O—, —O—CO—, —CO—$NR^{12}$—, or $NR^{12}$—CO—, and $Q^{11}$ is a polymerizable group selected from the group consisting of groups represented by Formulae (Q-1) to (Q-5). In addition, in the liquid crystal compound represented by Formula (I-11), $R^{11}$ is preferably -$Z^{12}$-$Sp^{12}$-$Q^{12}$ in which $Z^{11}$ is —CO—O—, —CO—$NR^{12}$—, or $NR^{12}$—CO—, and $Q^{12}$ is a polymerizable group selected from the group consisting of groups represented by Formulae (Q-1) to (Q-5).

All 1,4-cyclohexylene groups contained in the liquid crystal compound represented by Formula (I-11) are trans-1,4-cyclohexylene groups.

A suitable aspect of the liquid crystal compound represented by Formula (I-11) may be, for example, a compound in which $L^{11}$ is a single bond, $l^{11}$ is 1-(dicyclohexyl group), and $Q^{11}$ is a polymerizable group selected from the group consisting of groups represented by Formulae (Q-1) to (Q-5).

Another suitable aspect of the liquid crystal compound represented by Formula (I-11) may be, for example, a compound in which $m^{11}$ is 2, $l^{11}$ is 0, and two $R^{11}$'s each represent -$Z^{11}$-$Sp^{12}$-$Q^{12}$, and $Q^{12}$ is a polymerizable group selected from the group consisting of groups represented by Formulae (Q-1) to (Q-5).

Liquid Crystal Compound Represented by Formula (I-21)

In the formula, $Z^{21}$ and $Z^{22}$ each independently represent a trans-1,4-cyclohexylene group which may have a substituent or a phenylene group which may have a substituent, the above substituents are each independently 1 to 4 substituents selected from the group consisting of —CO—$X^{21}$-$Sp^{23}$-$Q^{23}$, an alkyl group, and an alkoxy group, m21 represents an integer of 1 or 2, and n21 represents an integer of 0 or 1, in a case where m21 represents 2, n21 represents 0, in a case where m21 represents 2, two $Z^{21}$'s may be the same or different, at least one of $Z^{21}$ or $Z^{22}$ is a phenylene group which may have a substituent, $L^{21}$, $L^{22}$, $L^{23}$, and $L^{24}$ each independently represent a single bond or a linking group selected from the group consisting of —$CH_2O$—, —$OCH_2$—, —$(CH_2)_2$—O—CO—, —CO—, —CO—O$(CH_2)_2$—, —CO—O—, —O—CO—, —O—CO—O—, —CH=CH—CO—O—, and —O—CO—CH=CH—, $X^{21}$ represents —O—, —S—, or —N($Sp^{25}$-$Q^{25}$)- represents a nitrogen atom forming a ring structure together with $Q^{23}$ and $Sp^{23}$, $r^{21}$ represents an integer of 1 to 4, $Sp^{21}$, $Sp^{22}$, $Sp^{23}$, and $Sp^{25}$ each independently represent a single bond or a linking group selected from the group consisting of a linear or branched alkylene group having 1 to 20 carbon atoms and a group where one or two or more —$CH_2$— in a linear or branched alkylene group having 1 to 20 carbon atoms is substituted with —O—, —S—, —NH—, —N($CH_3$)—, —CO—, —O—CO—, or —CO—O—, $Q^{21}$ and $Q^{22}$ each independently represent a polymerizable group selected from the group consisting of groups represented by Formulae (Q-1) to (Q-5), $Q^{23}$ represents a hydrogen atom, a cycloalkyl group, a group where one or two or more —$CH_2$— in a cycloalkyl group is substituted with —O—, —S—, —NH—, —N($CH_3$)—, —CO—, —O—CO—, or —CO—O—, any one polymerizable group selected from the group consisting of groups represented by Formulae (Q-1) to (Q-5), or a single bond in a case where $X^{21}$ is a nitrogen atom forming a ring structure together with $Q^{23}$ and $Sp^{23}$, and $Q^{25}$ represents a hydrogen atom, a cycloalkyl group, a group where one or two or more —$CH_2$— in a cycloalkyl group is substituted with —O—, —S—, —NH—, —N($CH_3$)⇒, —O—CO—, or —CO—O—, or any one polymerizable group selected from the group consisting of groups represented by Formulae (Q-1) to (Q-5), provided that in a case where $Sp^{25}$ is a single bond, $Q^{25}$ is not a hydrogen atom.

It is also preferred that the liquid crystal compound represented by Formula (I-21) has a structure in which a 1,4-phenylene group and a trans-1,4-cyclohexylene group are alternately present. For example, preferred is a structure in which m21 is 2, n21 is 0, and $Z^{21}$ is a trans-1,4-cyclohexylene group which may have a substituent or an arylene group which may have a substituent, each of which from the $Q^{21}$ side, or a structure in which m21 is 1, n21 is 1, $Z^{21}$ is an arylene group which may have a substituent, and $Z^{22}$ is an arylene group which may have a substituent.

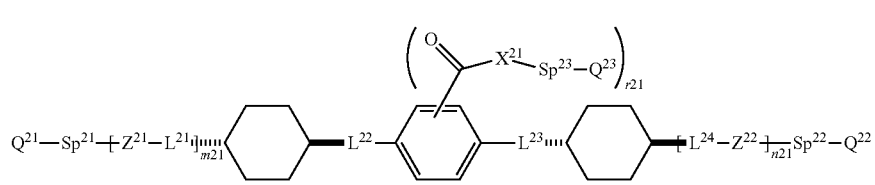

(I-21)

Liquid Crystal Compound Represented by Formula (I-31)

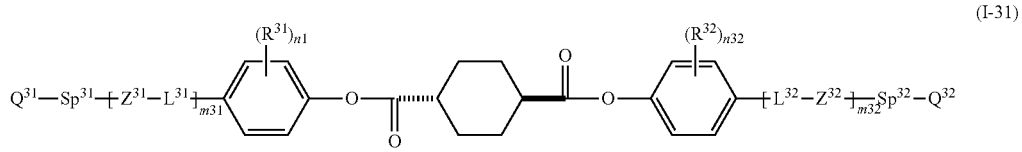

In the formula, $R^{31}$ and $R^{32}$ each independently represent an alkyl group, an alkoxy group, and a group selected from the group consisting of —CO—$X^{31}$-$Sp^{33}$, n31 and n32 each independently represent an integer of 0 to 4, $X^{31}$ represents a single bond, —O—, —S—, or —N($Sp^{34}$-$Q^{34}$)- or represents a nitrogen atom forming a ring structure together with $Q^{33}$ and $Sp^{33}$, $Z^{31}$ represents a phenylene group which may have a substituent, $Z^{32}$ represents a trans-1,4-cyclohexylene group which may have a substituent or a phenylene group which may have a substituent, the above substituents are each independently 1 to 4 substituents selected from the group consisting of an alkyl group, an alkoxy group, and —CO—$X^{31}$-$Sp^{33}$-$Q^{33}$, $m^{31}$ represents an integer of 1 or 2, and m32 represents an integer of 0 to 2, in a case where m31 and m32 represent 2, two $Z^{31}$'s and $Z^{32}$'s may be the same or different, $L^{31}$ and $L^{32}$ each independently represent a single bond or a linking group selected from the group consisting of —CH$_2$O—, —OCH$_2$—, —(CH$_2$)$_2$—CO—, —CO—O—(CH$_2$)$_2$—, —CO—O—, —O—CO—, —O—CO—O—, —CH=CH—CO—O—, and —O—CO—CH=CH—, $Sp^{31}$, $Sp^{32}$, $Sp^{33}$, and $Sp^{34}$ each independently represent a single bond or a linking group selected from the group consisting of a linear or branched alkylene group having 1 to 20 carbon atoms and a group where one or two or more —CH$_2$— in a linear or branched alkylene group having 1 to 20 carbon atoms is substituted with —O—, —S—, —NH—, —N(CH$_3$)—, —CO—, —O—CO—, or —CO—O—, $Q^{31}$ and $Q^{32}$ each independently represent a polymerizable group selected from the group consisting of groups represented by Formulae (Q-1) to (Q-5), and $Q^{33}$ and $Q^{34}$ each independently represent a hydrogen atom, a cycloalkyl group, a group where one or two or more —CH$_2$— in a cycloalkyl group is substituted with —O—, —S—, —NH—, —N(CH$_3$)—, —CO—, —O—CO—, or —CO—O—, or any one polymerizable group selected from the group consisting of groups represented by Formulae (Q-1) to (Q-5), provided that $Q^{33}$ may represent a single bond in a case of forming a ring structure together with $X^{31}$ and $Sp^{33}$, and $Q^{34}$ is not a hydrogen atom in a case where $Sp^{34}$ is a single bond.

As the liquid crystal compound represented by Formula (I-31), particularly preferable compounds include a compound in which $Z^{32}$ is a phenylene group and a compound in which m32 is 0.

It is also preferred that the compound represented by Formula (I) has a partial structure represented by Formula (II).

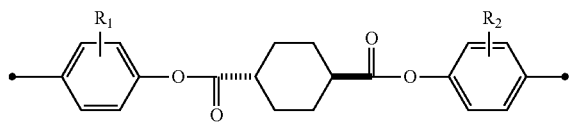

In Formula (II), black circles indicate the bonding positions with other moieties of Formula (I). It is sufficient that the partial structure represented by Formula (II) is included as a part of the partial structure represented by Formula (III) in Formula (I).

In the formula, $R^1$ and $R^2$ are each independently a group selected from the group consisting of a hydrogen atom, an alkyl group, an alkoxy group, and a group represented by —CO—$X^3$-$Sp^3$-$Q^3$. Here, $X^3$ represents a single bond, —O—, —S—, or —N($Sp^4$-$Q^4$)- or represents a nitrogen atom forming a ring structure together with $Q^3$ and $Sp^3$. $X^3$ is preferably a single bond or —O—. $R^1$ and $R^2$ preferably —CO—$X^3$-$Sp^3$-$Q^3$. It is also preferred that $R^1$ and $R^2$ are the same. The bonding position of each of $R^1$ and $R^2$ to the phenylene group is not particularly limited.

$Sp^3$ and $Sp^4$ each independently represent a single bond or a linking group selected from the group consisting of a linear or branched alkylene group having 1 to 20 carbon atoms and a group where one or two or more —CH$_2$— in a linear or branched alkylene group having 1 to 20 carbon atoms are substituted with —O—, —S—, —NH—, —N(CH$_3$)—, —CO—, —O—CO—, or —CO—O—. $Sp^3$ and $Sp^4$ are each independently preferably a linear or branched alkylene group having 1 to 10 carbon atoms, more preferably a linear alkylene group having 1 to 5 carbon atoms, and still more preferably a linear chain alkylene group having 1 to 3 carbon atoms.

$Q^3$ and $Q^4$ each independently represent a hydrogen atom, a cycloalkyl group, a group where one or two or more —CH$_2$— in a cycloalkyl group are substituted with —O—, —S—, —NH—, —N(CH$_3$)—, —CO—, —O—CO—, or —CO—O—, or any one polymerizable group selected from the group consisting of groups represented by Formulae (Q-1) to (Q-5).

It is also preferred that the compound represented by Formula (I) has, for example, a structure represented by Formula (II-2).

(II-2)

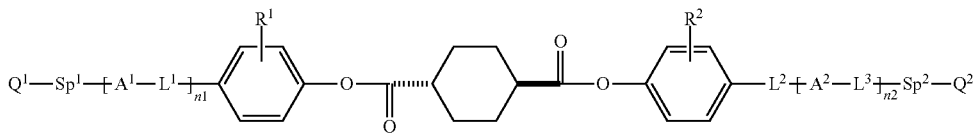

In the formula, $A^1$ and $A^2$ each independently represent a phenylene group which may have a substituent or a trans-1,4-cyclohexylene group which may have a substituent, and the above substituents are each independently 1 to 4 substituents selected from the group consisting of an alkyl group, an alkoxy group, and —CO—$X^3$-$Sp^3$-$Q^3$, $L^1$, $L^2$, and $L^3$ each independently represent a single bond or a linking group selected from the group consisting of —CH$_2$O—, —OCH$_2$—, —(CH$_2$)$_2$O—CO—, —CO—O(CH$_2$)$_2$—, —CO—O—, —O—CO—, —O—CO—O—, —CH=CH—CO—O—, and —O—CO—CH=CH—, n1 and n2 each independently represent an integer of 0 to 9, and n1+n2 is 9 or less.

Each of $Q^1$, $Q^2$, $Sp^1$, and $Sp^2$ has the same definition as that of each group in Formula (I). Each of $X^3$, $Sp^3$, $Q^3$, $R^1$, and $R^2$ has the same definition as that of each group in Formula (II).

Another suitable aspect of the liquid crystal compound includes a compound represented by Formula (IV).

Compound Represented by Formula (IV)

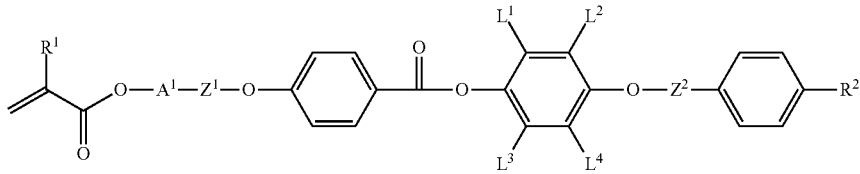

In Formula (IV), $A^1$ represents an alkylene group having 2 to 18 carbon atoms, in which one CH$_2$ or two or more non-adjacent CH$_2$'s in the alkylene group may be substituted with —O—;

$Z^1$ represents —CO—, —O—CO—, or a single bond;
$Z^2$ represents —CO— or —CO—CH=CH—;
$R^1$ represents a hydrogen atom or a methyl group;
$R^2$ represents a hydrogen atom, a halogen atom, a linear alkyl group having 1 to 4 carbon atoms, a methoxy group, an ethoxy group, a phenyl group which may have a substituent, a vinyl group, a formyl group, a nitro group, a cyano group, an acetyl group, an acetoxy group, an N-acetylamide group, an acryloylamino group, an N,N-dimethylamino group, a maleimide group, a methacryloylamino group, an allyloxy group, an allyloxycarbamoyl group, an N-alkyloxycarbamoyl group in which the alkyl group has 1 to 4 carbon atoms, an N-(2-methacryloyloxyethyl)carbamoyloxy group, an N-(2-acryloyloxyethyl)carbamoyloxy group, or a group represented by Formula (IV-2); and $L^1$, $L^2$, $L^3$, and $L^4$ each independently represent an alkyl group having 1 to 4 carbon atoms, an alkoxy group having 1 to 4 carbon atoms, an alkoxycarbonyl group having 2 to 5 carbon atoms, an acyl group having 2 to 4 carbon atoms, a halogen atom, or a hydrogen atom, and at least one of $L^1$, $L^2$, $L^3$, or $L^4$ represents a group other than a hydrogen atom.

-$Z^5$-T-Sp-P          Formula (IV-2)

In Formula (IV-2), P represents an acryloyl group, a methacryl group, or a hydrogen atom, and $Z^5$ represents a single bond, —CO—O—, —O—CO—, —CO—NR$^1$— (where $R^1$ represents a hydrogen atom or a methyl group), —NR$^1$—CO—, —CO—S—, or —S—CO—, T represents 1,4-phenylene, and Sp represents a divalent aliphatic group having 1 to 12 carbon atoms which may have a substituent, in which one CH$_2$ or two or more non-adjacent CH$_2$'s in the aliphatic group may be substituted with —O—, —S—, —O—CO—, —CO—O—, or —O—CO—O—.

The compound represented by Formula (IV) is preferably a compound represented by Formula (V).

Compound Represented by Formula (V)

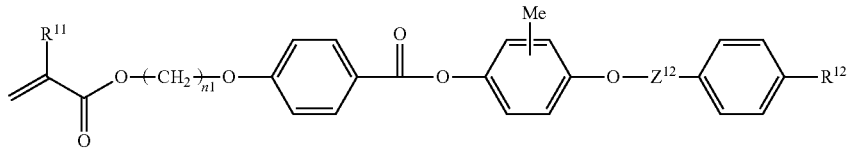

In Formula (V), n1 represents an integer of 3 to 6;
$R^{11}$ represents a hydrogen atom or a methyl group;
$R^{12}$ represents —CO— or —CO—CH=CH—; and
$R^{12}$ represents a hydrogen atom, a linear alkyl group having 1 to 4 carbon atoms, a methoxy group, an ethoxy group, a phenyl group, an acryloylamino group, a methacryloylamino group, an allyloxy group, or a group represented by Formula (IV-3).

-$Z^{51}$-T-Sp-P          Formula (IV-3)

In Formula (IV-3), P represents an acryloyl group or a methacryl group;

$Z^{51}$ represents —CO—O— or —O—CO—;

T represents 1,4-phenylene; and

Sp represents a divalent aliphatic group having 2 to 6 carbon atoms which may have a substituent, in which one $CH_2$ or two or more non-adjacent $CH_2$'s in the aliphatic group may be substituted with —O—, —O—CO—, —CO—O—, or O(=O)OO—.

n1 represents an integer of 3 to 6 and is preferably 3 or 4.

$Z^{12}$ represents —CO— or CO—CH=CH— and preferably represents —CO—.

$R^{12}$ represents a hydrogen atom, a linear alkyl group having 1 to 4 carbon atoms, a methoxy group, an ethoxy group, a phenyl group, an acryloylamino group, a methacryloylamino group, an allyloxy group, or a group represented by Formula (IV-3), more preferably represents a methyl group, an ethyl group, a propyl group, a methoxy group, an ethoxy group, a phenyl group, an acryloylamino group, a methacryloylamino group, or a group represented by Formula (IV-3), and still more preferably represents a methyl group, an ethyl group, a methoxy group, an ethoxy group, a phenyl group, an acryloylamino group, a methacryloylamino group, or a group represented by Formula (IV-3).

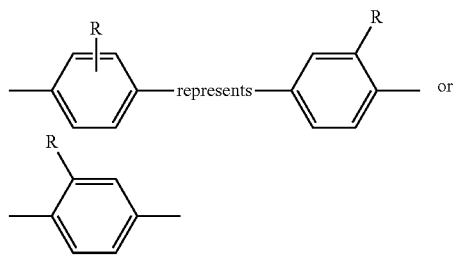

Note that R is intended to refer to Me.

Specific examples of the compound represented by Formula (IV) include the compounds exemplified below.

(1)

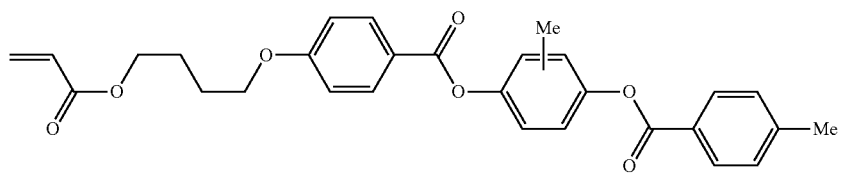

(2)

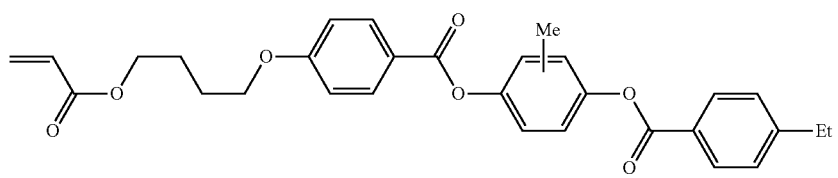

(3)

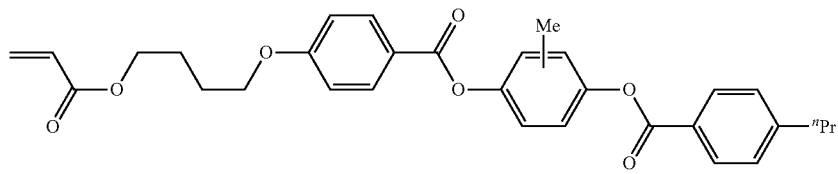

(4)

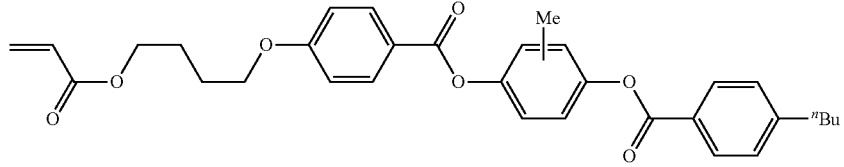

(5)

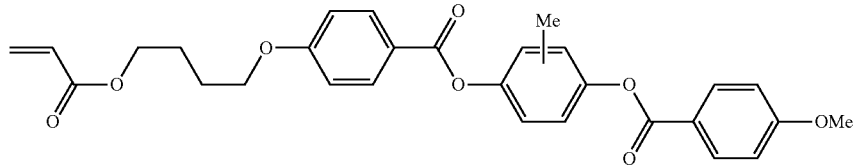

(6)

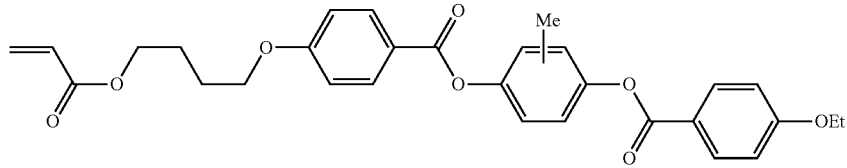

-continued
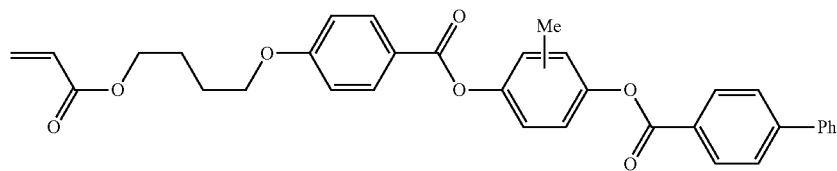
(7)
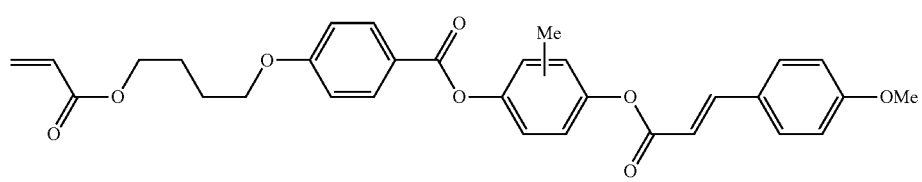
(8)
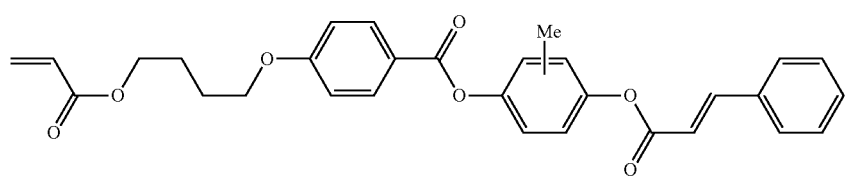
(9)
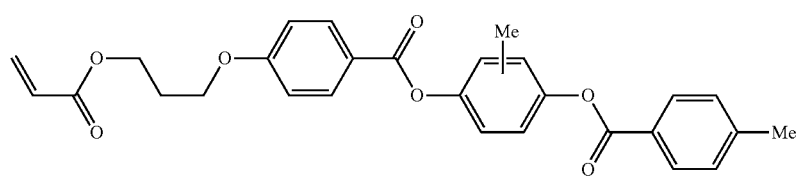
(1A)
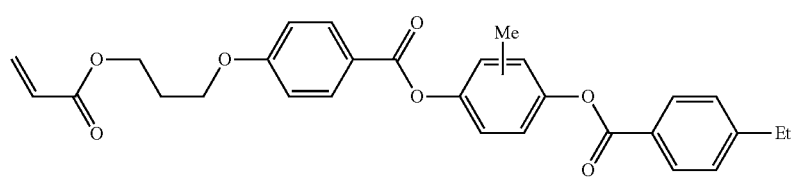
(2A)
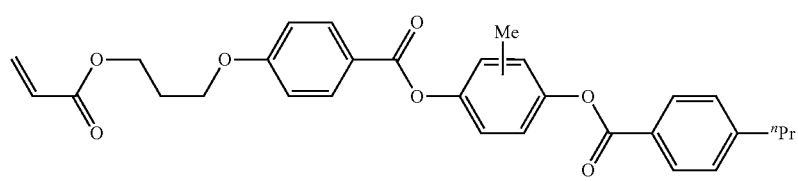
(3A)
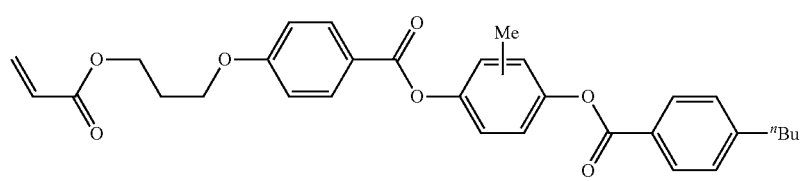
(4A)
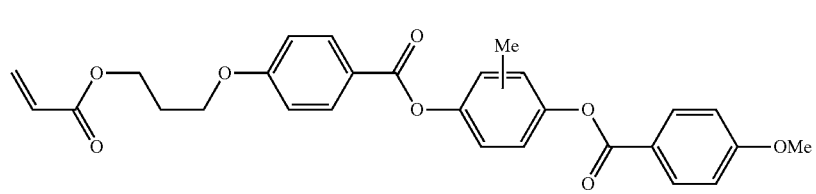
(5A)

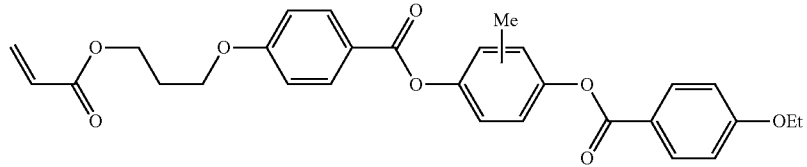
(6A)
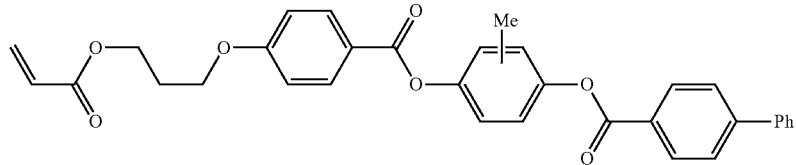
(7A)
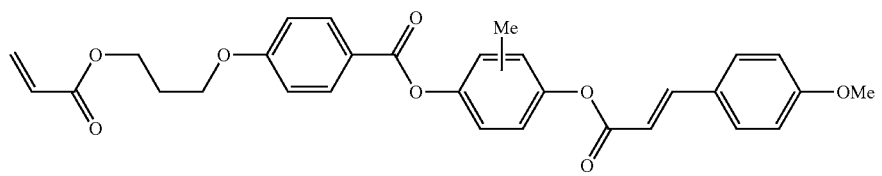
(8A)
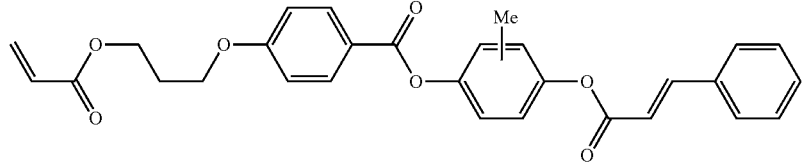
(9A)
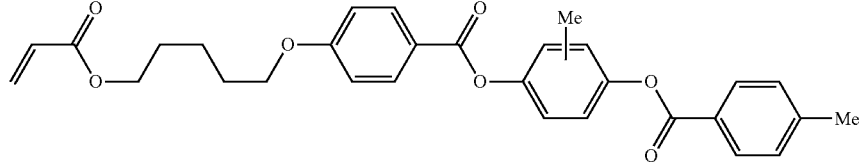
(1B)
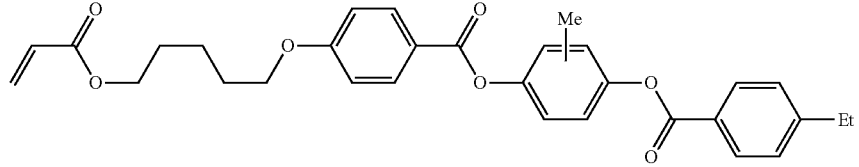
(2B)
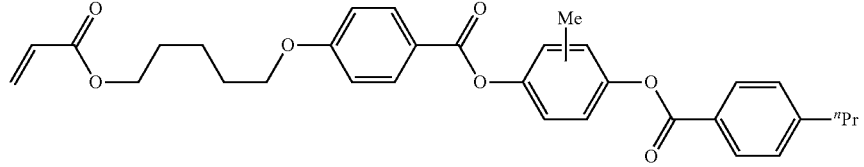
(3B)
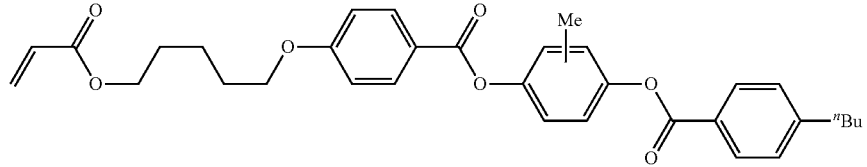
(4B)

-continued
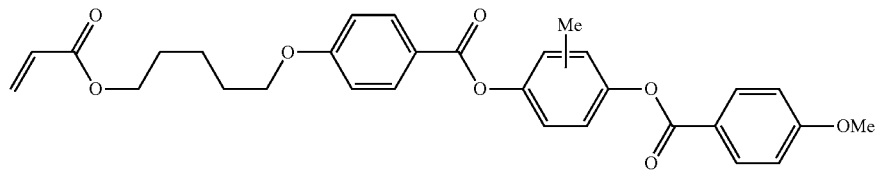
(5B)
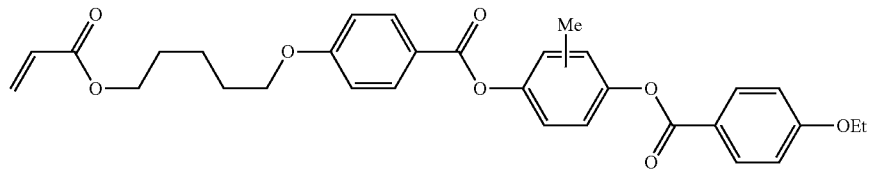
(6B)
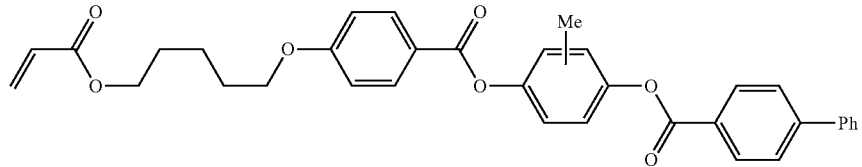
(7B)
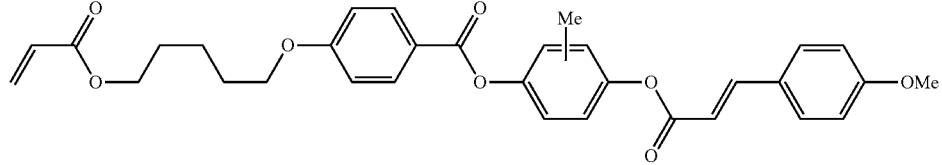
(8B)
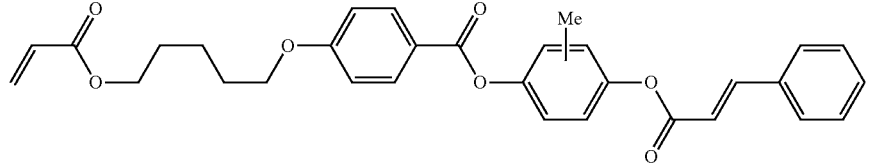
(9B)
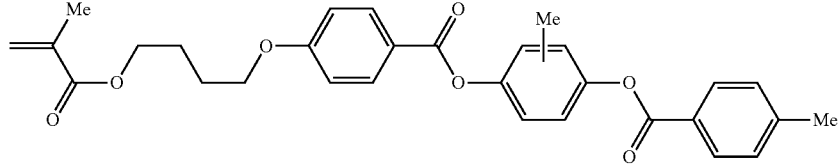
(1C)
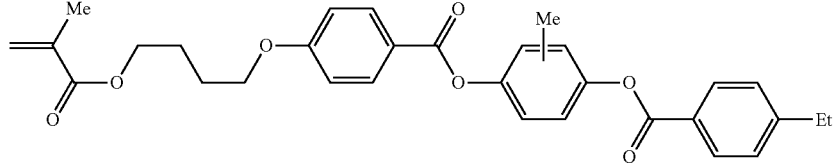
(2C)
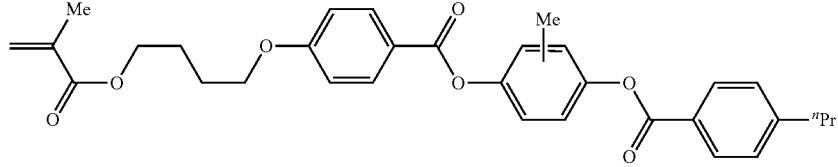
(3C)
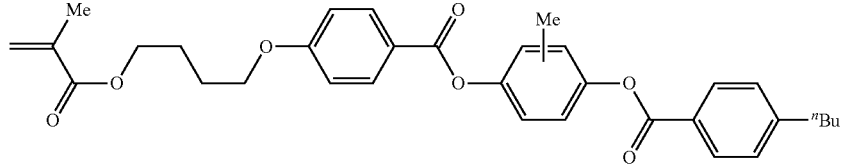
(4C)

-continued
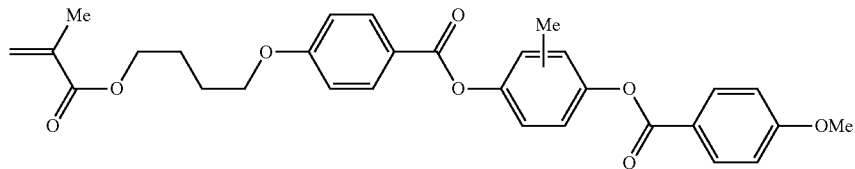
(5C)
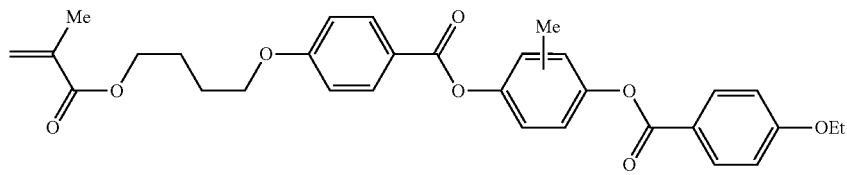
(6C)
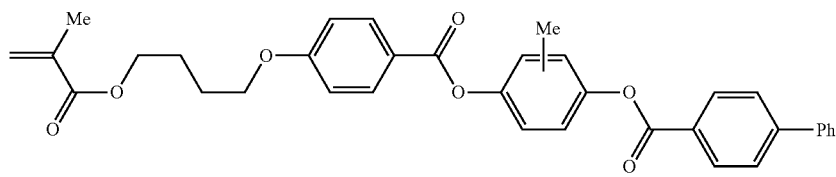
(7C)
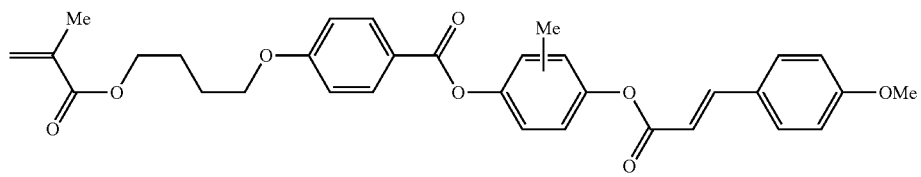
(8C)
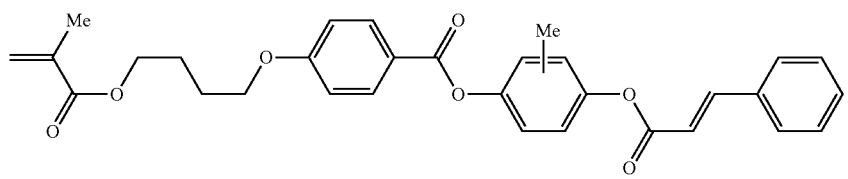
(9C)
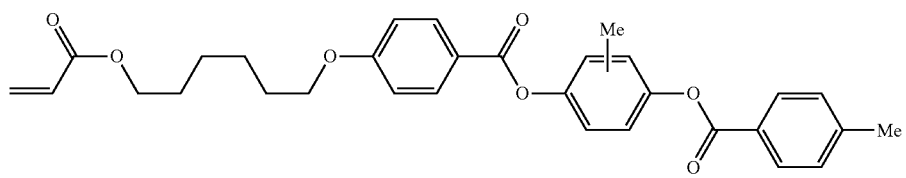
(1D)
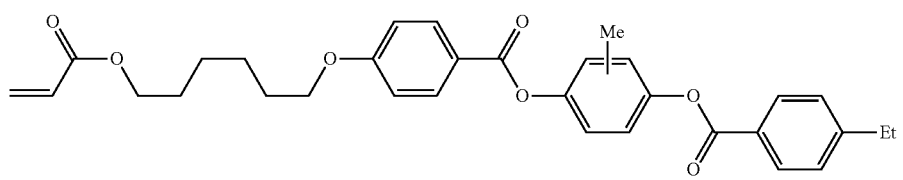
(2D)
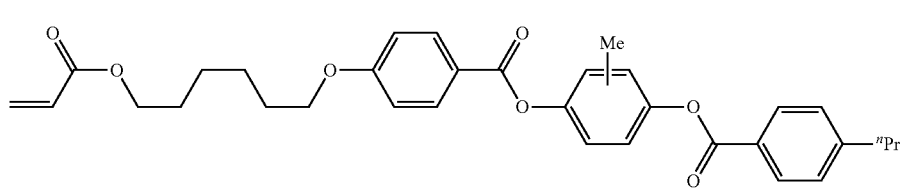
(3D)

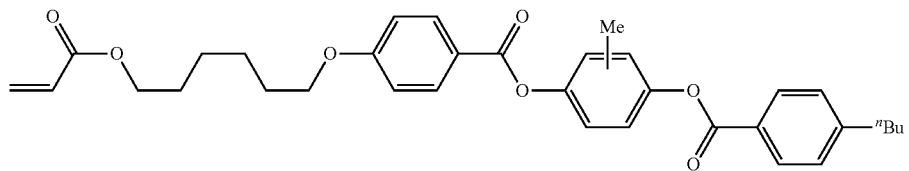
(4D)
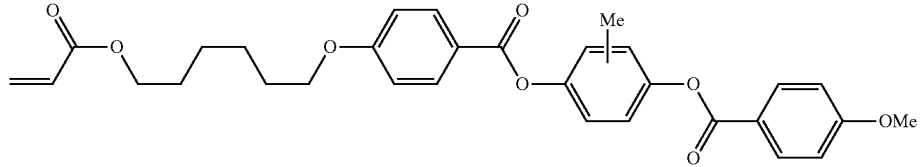
(5D)
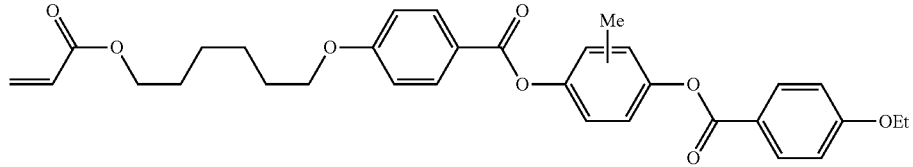
(6D)
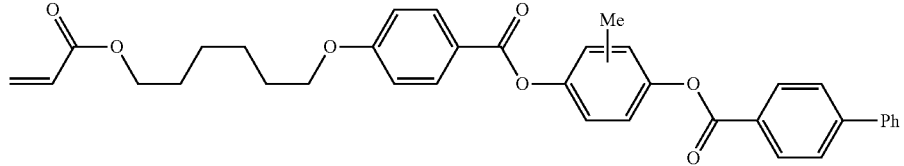
(7D)
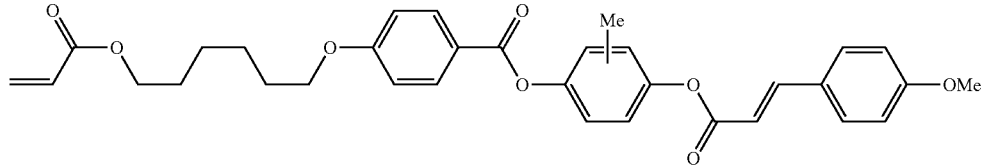
(8D)
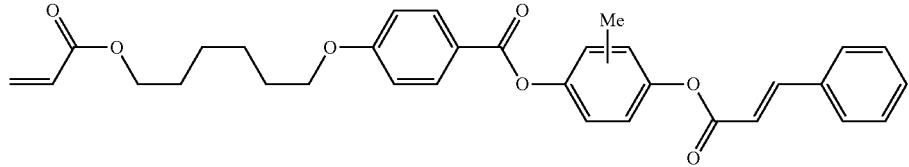
(9D)
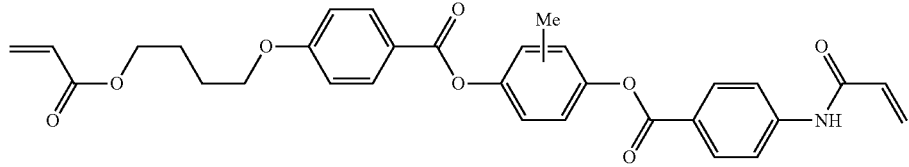
(1L)
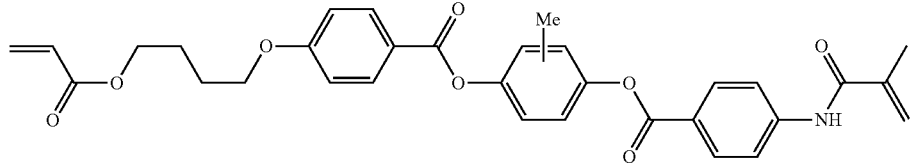
(2L)

-continued
(3L)
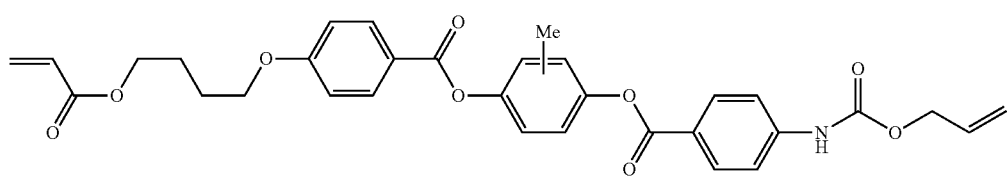
(4L)
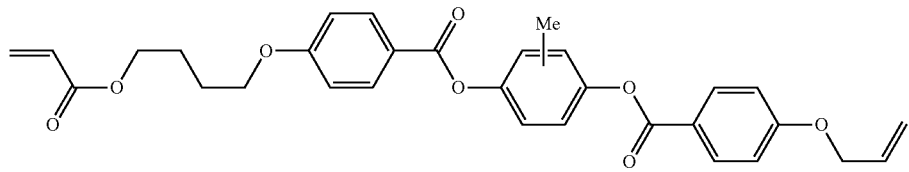
(5L)
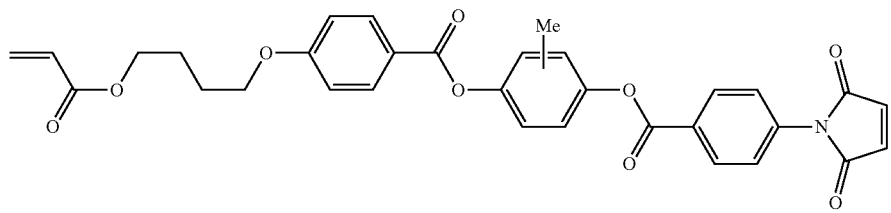
(6L)
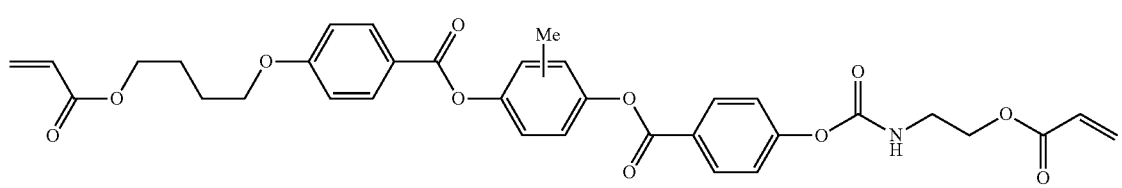
(7L)
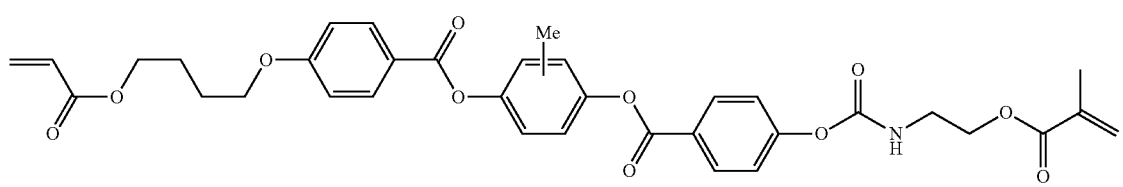
(8L)
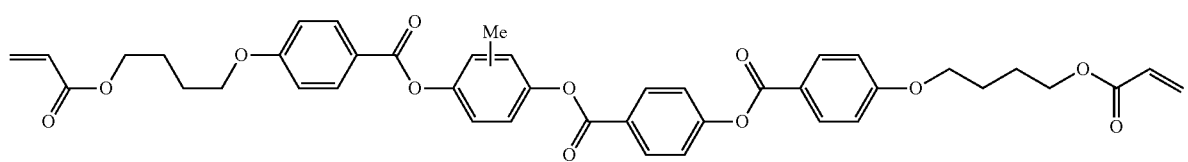
(9L)
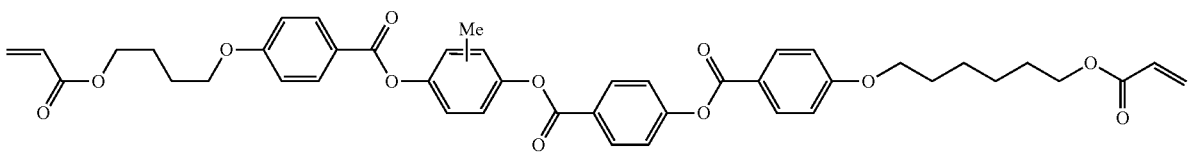
(10L)
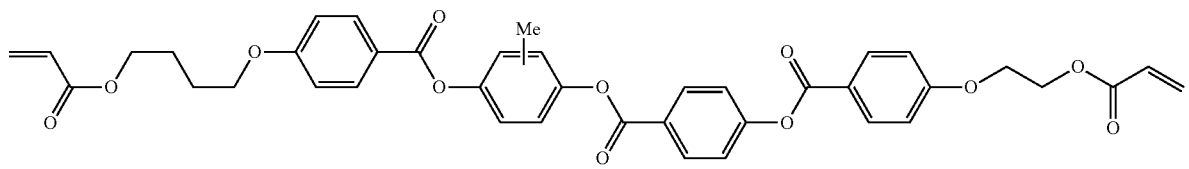

-continued
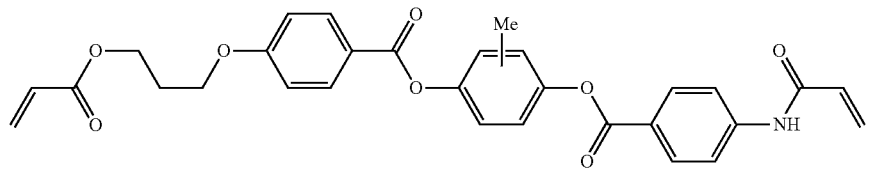
(1M)
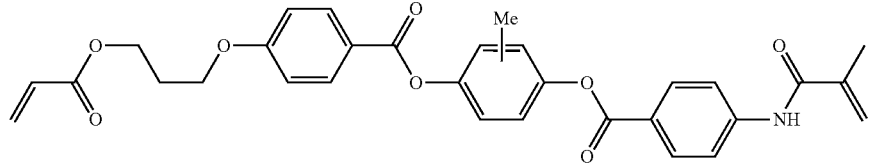
(2M)
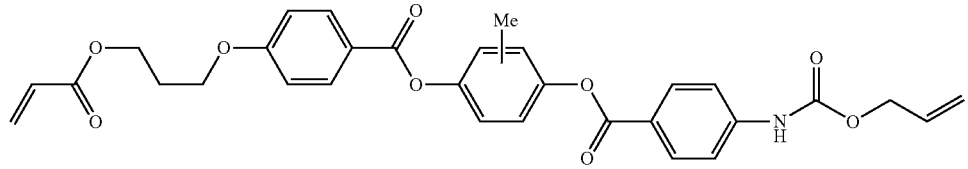
(3M)
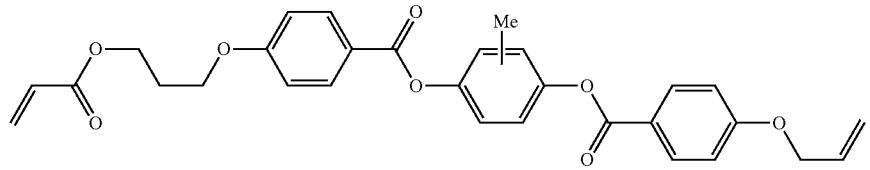
(4M)
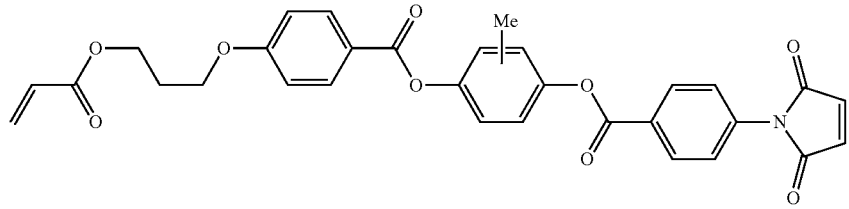
(5M)
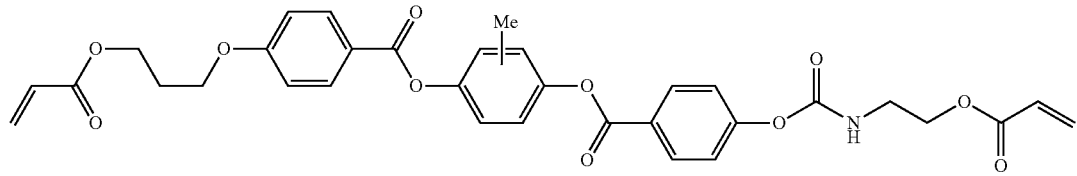
(6M)
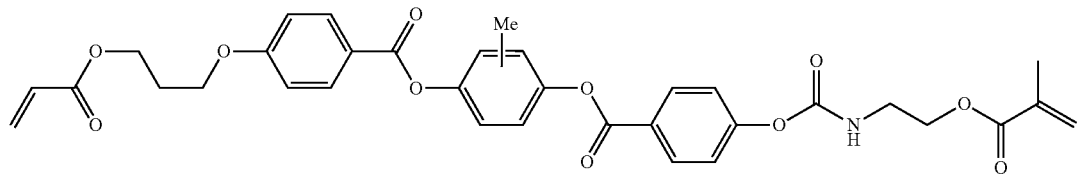
(7M)
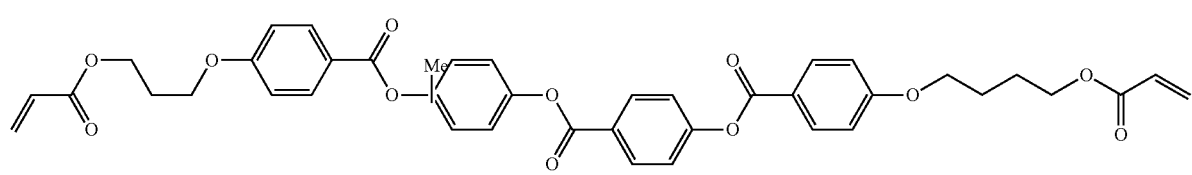
(8M)

-continued
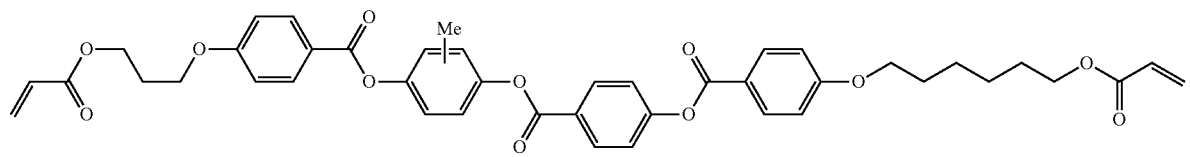
(9M)
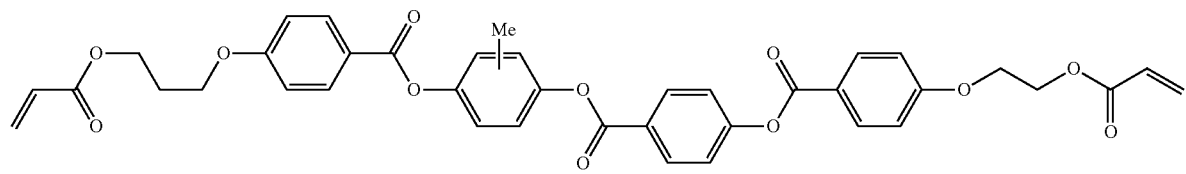
(10M)
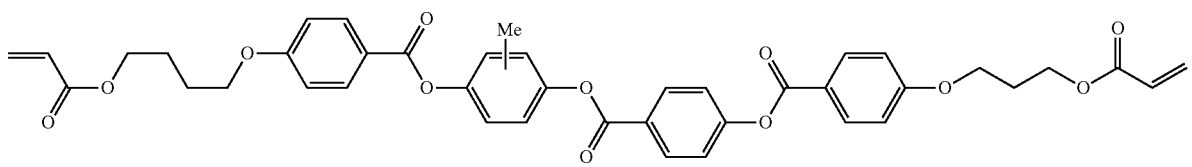
(1N)
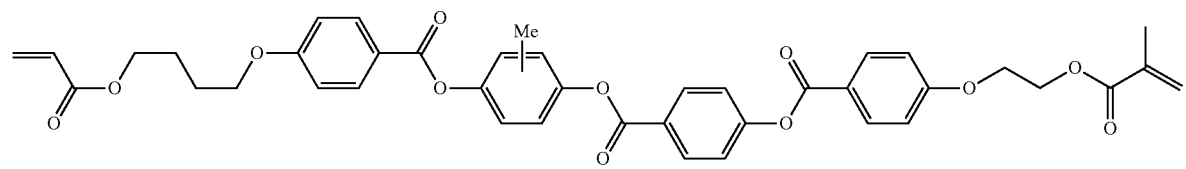
(2N)
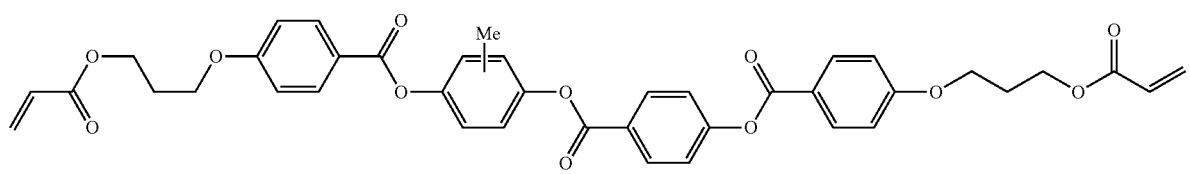
(3N)
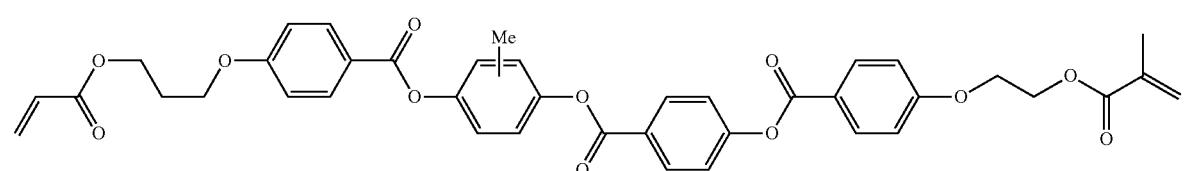
(4N)
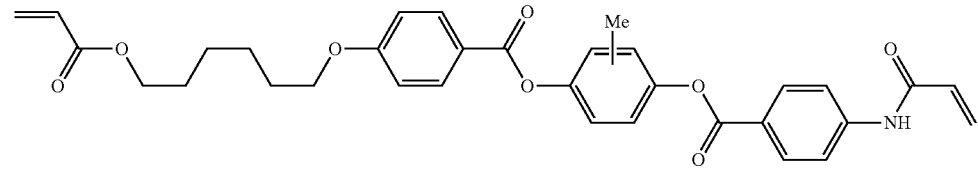
(5N)
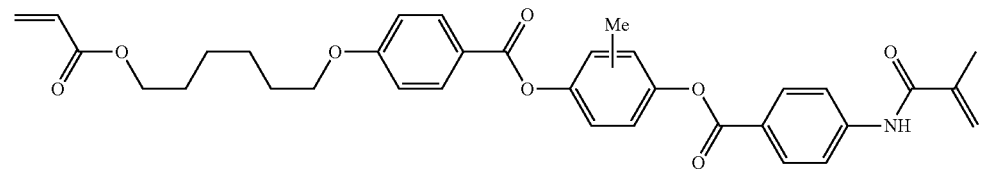
(6N)

(7N)
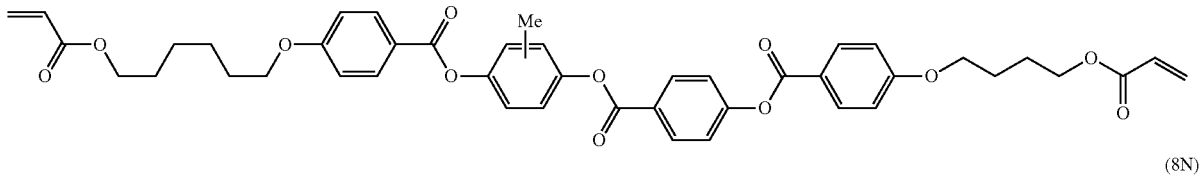

(8N)
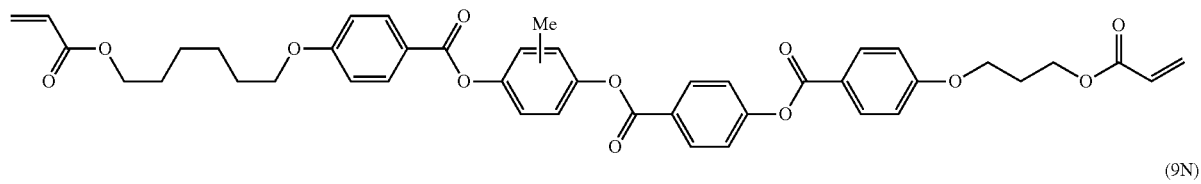

(9N)
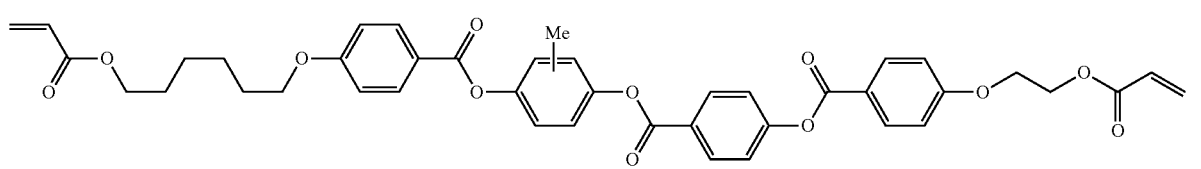

(10N)
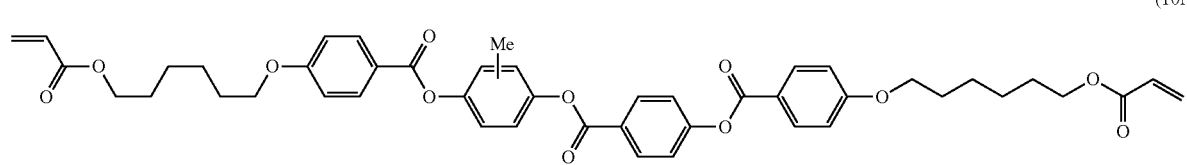

Another suitable aspect of the liquid crystal compound includes a compound represented by Formula (VI).

Compound Represented by Formula (VI)

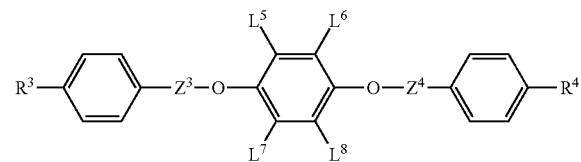

In Formula (VI), $Z^3$ represents —CO— or —CH=CH—CO—;

$Z^4$ represents —CO— or —CO—CH=CH—;

$R^3$ and $R^4$ each independently represent a hydrogen atom, a halogen atom, a linear alkyl group having 1 to 4 carbon atoms, a methoxy group, an ethoxy group, an aromatic group which may have a substituent, a cyclohexyl group, a vinyl group, a formyl group, a nitro group, a cyano group, an acetyl group, an acetoxy group, an acryloylamino group, an N,N-dimethylamino group, a maleimide group, a methacryloylamino group, an allyloxy group, an allyloxycarbamoyl group, an N-alkyloxycarbamoyl group in which the alkyl group has 1 to carbon atoms, an N-(2-methacryloyloxyethyl) carbamoyloxy group, an N-(2-acryloyloxyethyl)carbamoyloxy group, or a group represented by Formula (VI-2); and $L^5$, $L^6$, $L^7$, and $L^8$ each independently represent an alkyl group having 1 to 4 carbon atoms, an alkoxy group having 1 to 4 carbon atoms, an alkoxycarbonyl group having 2 to 5 carbon atoms, an acyl group having 2 to 4 carbon atoms, a halogen atom, or a hydrogen atom, and at least one of $L^5$, $L^6$, $L^7$, or $L^8$ represents a group other than a hydrogen atom.

-$Z^5$-T-Sp-P     Formula (VI-2)

In Formula (VI-2), P represents an acryloyl group, a methacryl group, or a hydrogen atom, and $Z^5$ represents CO—O—, —O—CO—, —CO—NR$^1$— (where R$^1$ represents a hydrogen atom or a methyl group), —NR$^1$—CO—, —CO—S—, or S—CO—, T represents 1,4-phenylene, and Sp represents a divalent aliphatic group having 1 to 12 carbon atoms which may have a substituent, in which one CH$_2$ or two or more non-adjacent CH$_2$'s in the aliphatic group may be substituted with —O—, —S—, —O—CO—, —CO—O—, or —O—CO—O—.

The compound represented by Formula (VI) is preferably a compound represented by Formula (VII).

Compound Represented by Formula (VII)

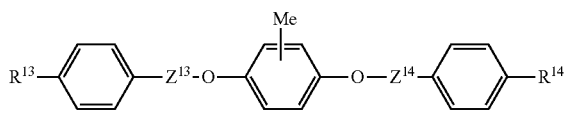

In Formula (VII), $Z^{13}$ represents —CO— or —CO—CH=CH—;

$Z^{14}$ represents —CO— or —CH=CH—CO—; and $R^{13}$ and $R^{14}$ each independently represent a hydrogen atom, a linear alkyl group having 1 to 4 carbon atoms, a methoxy group, an ethoxy group, a phenyl group, an acryloylamino group, a methacryloylamino group, an allyloxy group, or a group represented by Formula (IV-3).

$Z^{13}$ represents —CO— or —CO—CH=CH— and preferably represents —CO—.

$R^{13}$ and $R^{14}$ each independently represent a hydrogen atom, a linear alkyl group having 1 to 4 carbon atoms, a methoxy group, an ethoxy group, a phenyl group, an acryloylamino group, a methacryloylamino group, an allyloxy group, or a group represented by Formula (IV-3), preferably represents a methyl group, an ethyl group, a propyl group, a methoxy group, an ethoxy group, a phenyl group, an acryloylamino group, a methacryloylamino group, or a group represented by Formula (IV-3), and more preferably represents a methyl group, an ethyl group, a methoxy group, an ethoxy group, a phenyl group, an acryloylamino group, a methacryloylamino group, or a group represented by Formula (IV-3).

Specific examples of the compound represented by Formula (VI) include the compounds exemplified below.

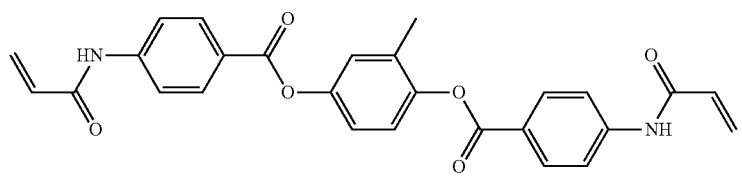
(11L)

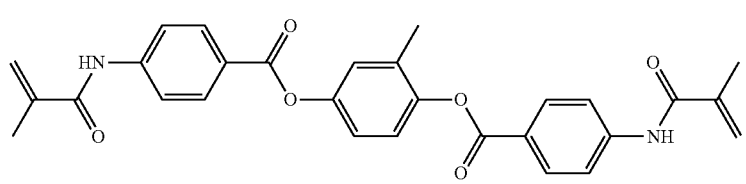
(12L)

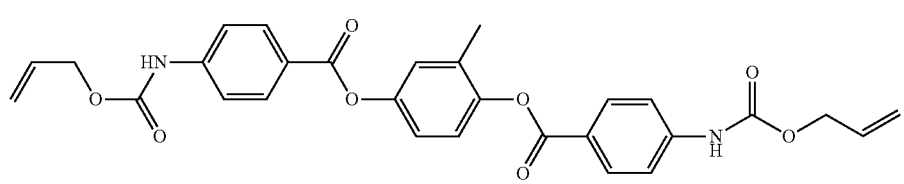
(13L)

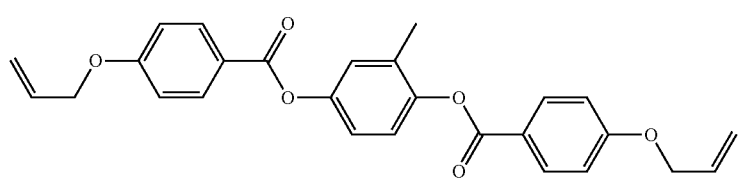
(14L)

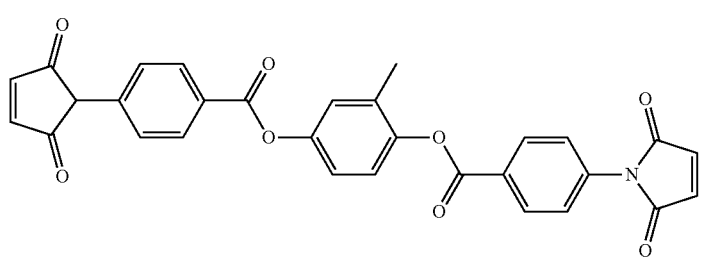
(15L)

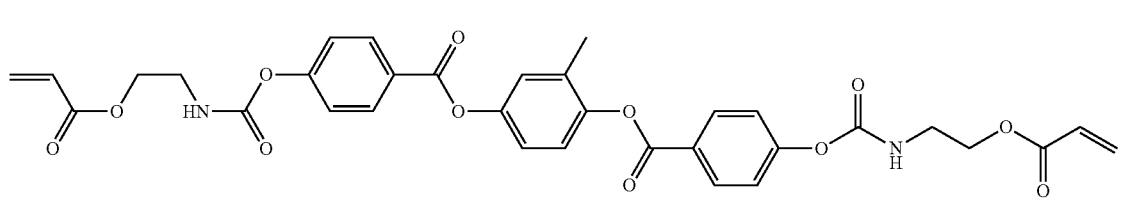
(16L)

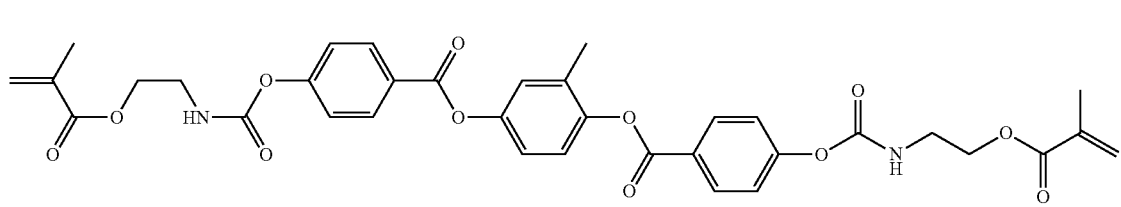
(17L)

-continued
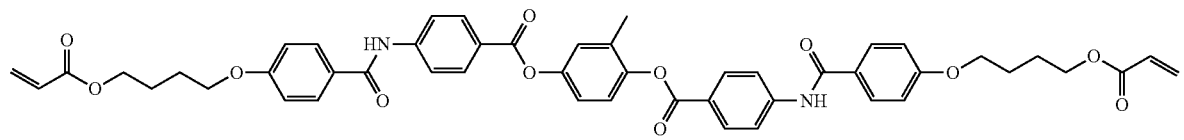
(18L)
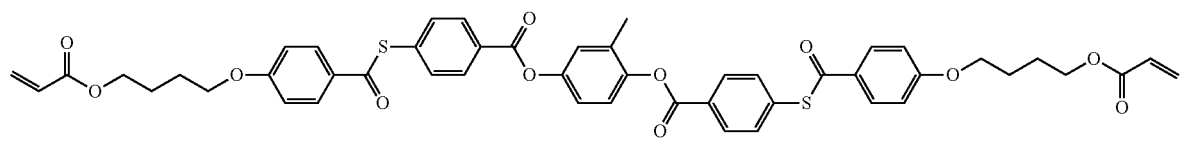
(19L)
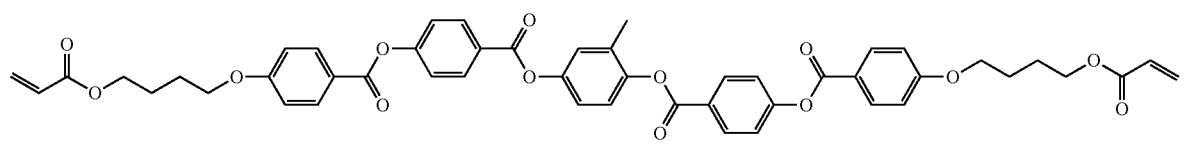
(11M)
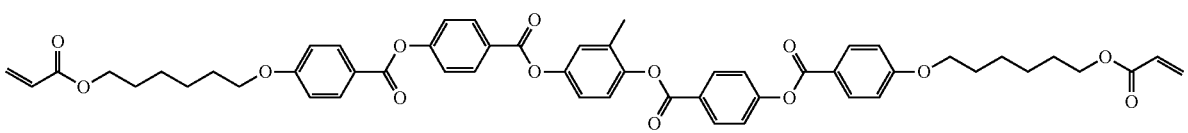
(12M)
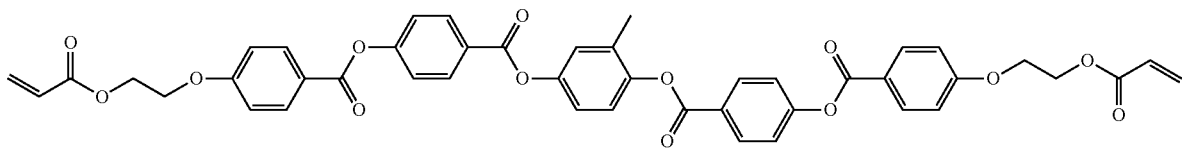
(13M)
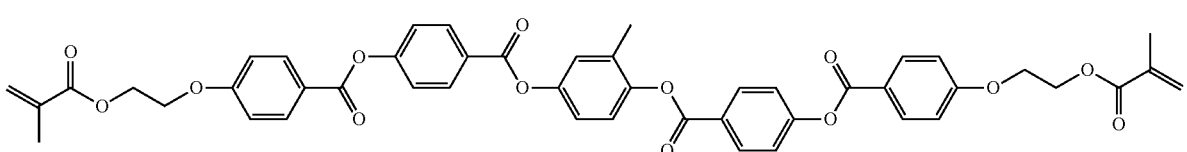
(14M)
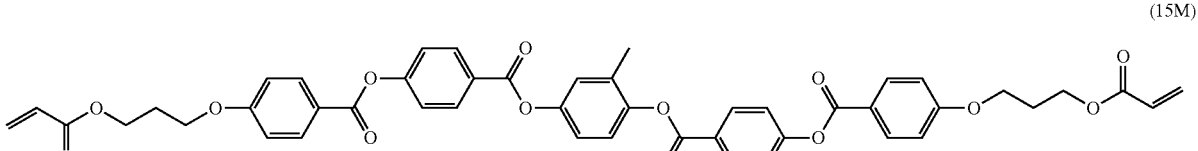
(15M)
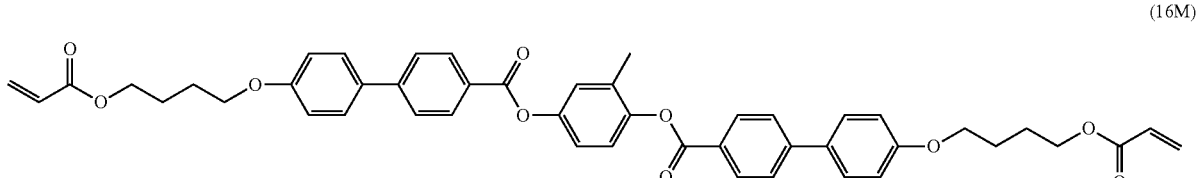
(16M)
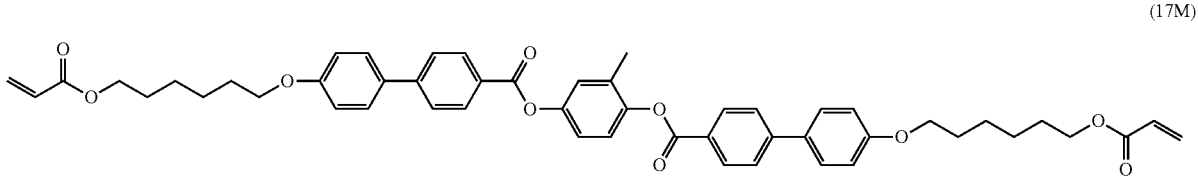
(17M)

-continued (18M)

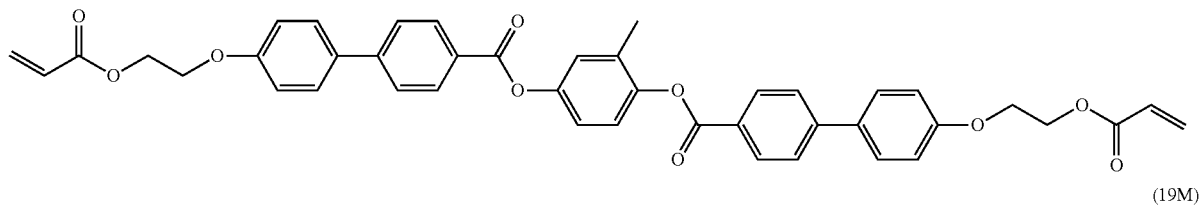

(19M)

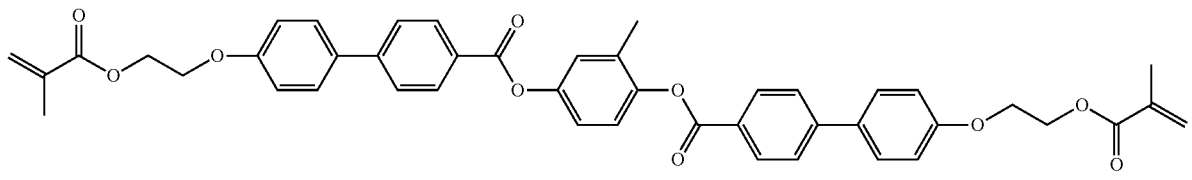

(20M)

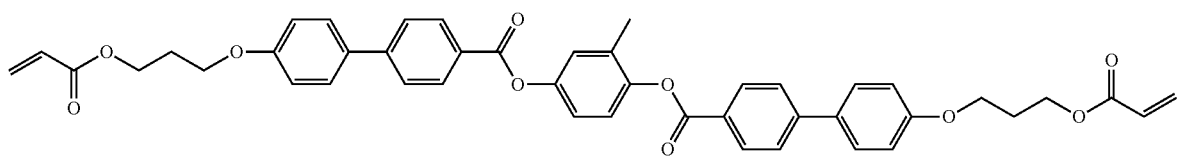

Another suitable aspect of the liquid crystal compound includes a compound represented by Formula (VIII).

Compound Represented by Formula (VIII)

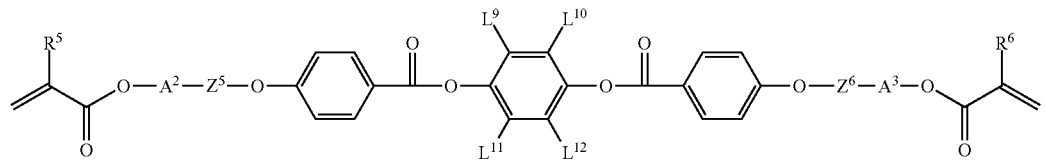

In Formula (VIII), $A^2$ and $A^3$ each independently represent an alkylene group having 2 to 18 carbon atoms, and one $CH_2$ or two or more non-adjacent $CH_2$'s in the alkylene group may be substituted with —O—;

$Z^5$ represents —CO—, —O—CO—, or a single bond;

$Z^6$ represents —CO—, —CO—O—, or a single bond;

$R^5$ and $R^6$ each independently represent a hydrogen atom or a methyl group; and $L^9$, $L^{10}$, $L^{11}$, and $L^{12}$ each independently represent an alkyl group having 1 to 4 carbon atoms, an alkoxy group having 1 to 4 carbon atoms, an alkoxycarbonyl group having 2 to 5 carbon atoms, an acyl group having 2 to 4 carbon atoms, a halogen atom, or a hydrogen atom, and at least one of $L^9$, $L^{10}$, $L^{11}$, or $L^{12}$, or $L^{12}$ represents a group other than a hydrogen atom.

The compound represented by Formula (VIII) is preferably a compound represented by Formula (IX).

Compound Represented by Formula (IX)

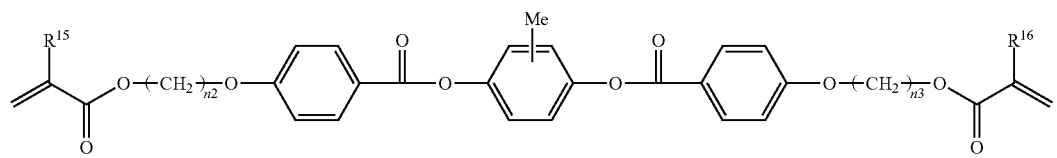

In Formula (IX), n2 and n3 each independently represent an integer of 3 to 6; and
R$^{15}$ and R$^{16}$ each independently represent a hydrogen atom or a methyl group.

In Formula (IX), it is preferred that n2 and n3 each independently represent an integer of 3 to 6, and n2 and n3 are 4.

In Formula (IX), it is preferred that R$^{15}$ and R$^{16}$ each independently represent a hydrogen atom or a methyl group, and R$^{15}$ and R$^{16}$ each represent a hydrogen atom.

Specific examples of the compound represented by Formula (VIII) include the compounds exemplified below.

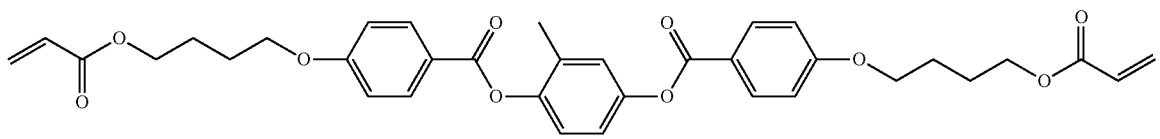
(I-1)

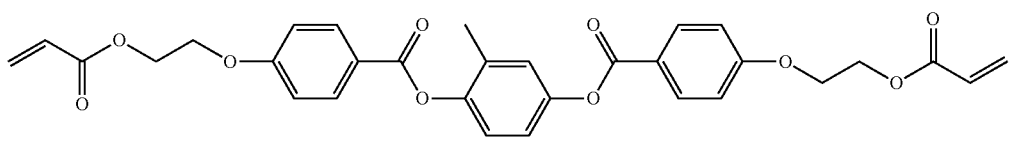
(I-2)

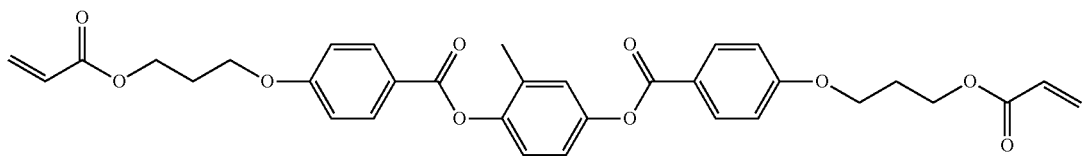
(I-3)

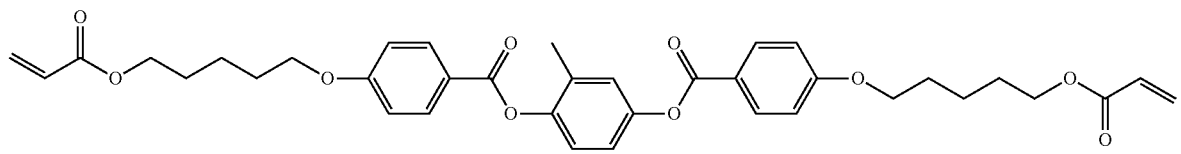
(I-4)

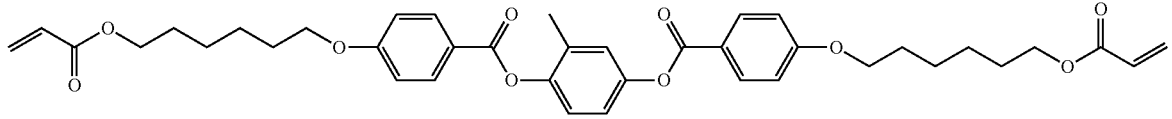
(I-5)

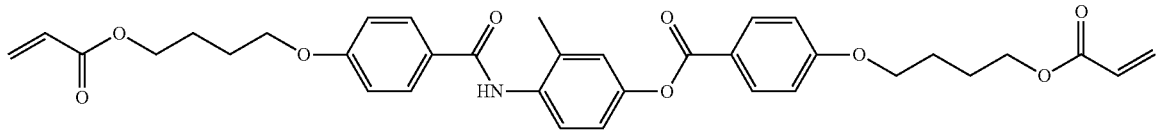
(I-6)

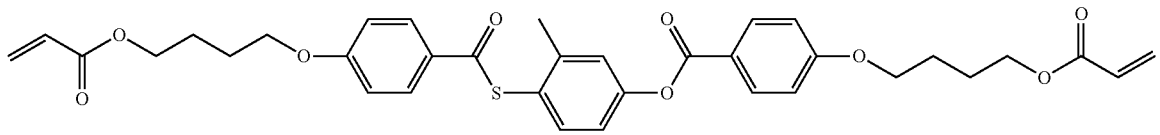
(I-7)

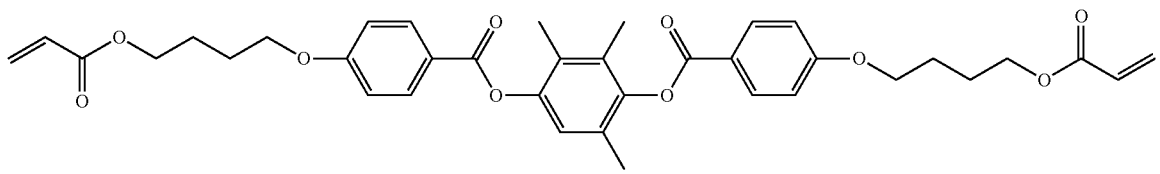
(I-8)

(I-9)
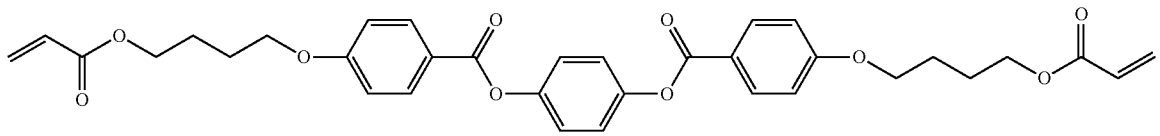

(I-10)
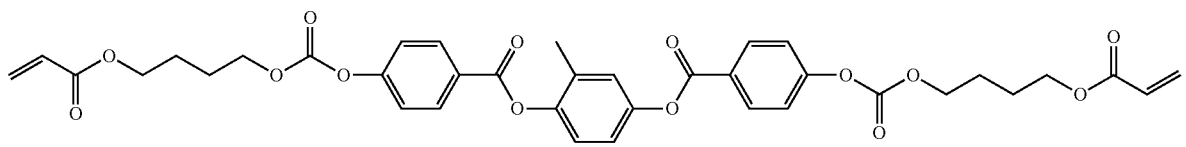

(I-11)
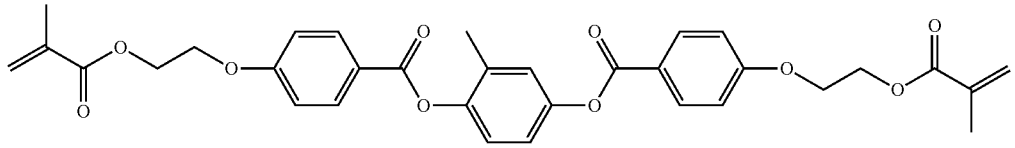

(I-12)
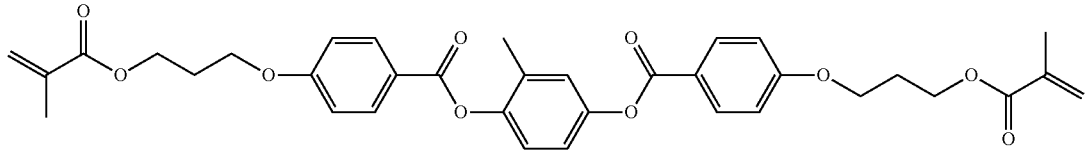

(I-13)
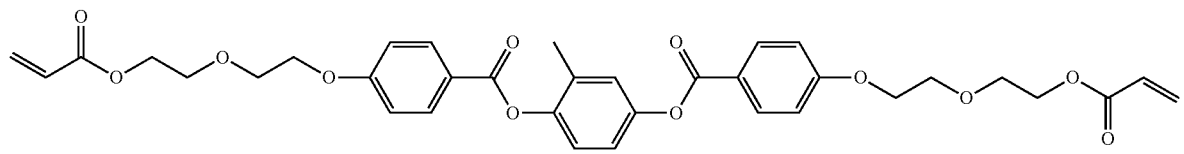

(I-14)
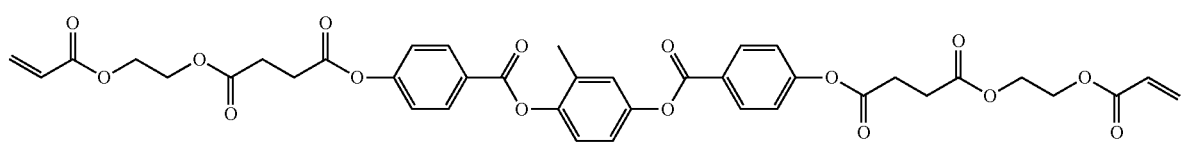

The liquid crystal compound can be produced by a known method.

The content of the liquid crystal compound in the liquid crystal composition is preferably 50% by mass or more, more preferably 60% by mass or more, and still more preferably 60% to 95% by mass with respect to the total solid content of the composition.

Chiral Agent

The liquid crystal composition may contain a chiral agent.

The type of chiral agent (chiral compound) is not particularly limited. The chiral agent may be liquid crystalline or non-liquid crystalline. The chiral agent may be selected from a variety of known chiral agents (for example, as described in Liquid Crystal Device Handbook, Chap. 3, Item 4-3, Chiral Agents for Twisted Nematic (TN) and Super Twisted Nematic (STN), p. 199, edited by the 142$^{nd}$ Committee of the Japan Society for the Promotion of Science, 1989). The chiral agent generally contains an asymmetric carbon atom. However, an axial asymmetric compound or planar asymmetric compound not containing an asymmetric carbon atom may also be used as the chiral agent. Examples of the axial asymmetric compound or the planar asymmetric compound include binaphthyl, helicene, paracyclophane, and derivatives thereof. The chiral agent may have a polymerizable group.

The content of the chiral agent in the composition is preferably 0.5% to 30% by mass with respect to the total mass of the liquid crystal compound. The chiral agent is preferably used in a smaller amount, as it tends not to affect the liquid crystallinity. Accordingly, the chiral agent is preferably a compound having a strong twisting power in order that the compound could achieve twisted alignment of a desired helical pitch even in a case where the amount thereof used is small.

Examples of such a chiral agent having strong twisting power include the chiral agents described in, for example, JP2002-302487A, JP2002-080478A, JP2002-080851A, JP2002-179668A, JP2002-179670A, JP2002-338575A, JP2002-180051A, JP1987-081354A (JP-S62-081354A), WO2002/006195A, JP2011-241215A, JP2003-287623A, and JP2014-034581A, and LC-756 manufactured by BASF SE.

Optional Components

The liquid crystal composition may contain components other than the liquid crystal compound and the specific copolymer.

<Polymerization Initiator>

The liquid crystal composition may contain a polymerization initiator.

The polymerization initiator is preferably a photopolymerization initiator capable of initiating a polymerization reaction upon irradiation with ultraviolet rays. Examples of the photopolymerization initiator include α-carbonyl compounds (as described in U.S. Pat. Nos. 2,367,661A and 2,367,670A), acyloin ethers (as described in U.S. Pat. No. 2,448,828A), α-hydrocarbon-substituted aromatic acyloin compounds (as described in U.S. Pat. No. 2,722,512A), polynuclear quinone compounds (as described in U.S. Pat. Nos. 3,046,127A and 2,951,758A), combinations of triarylimidazole dimer and p-aminophenyl ketone (as described in U.S. Pat. No. 3,549,367A), acridine and phenazine compounds (as described in JP1985-105667A (JP-S60-105667A) and U.S. Pat. No. 4,239,850A), and oxadiazole compounds (as described in U.S. Pat. No. 4,212,970A).

The content of the polymerization initiator in the liquid crystal composition is not particularly limited, but it is preferably 0.1% to 20% by mass and more preferably 1% to 10% by mass, with respect to the total solid content of the liquid crystal compound.

<Other Additives>

The liquid crystal composition may contain one or two or more other additives such as an antioxidant, an ultraviolet absorber, a sensitizer, a stabilizer, a plasticizer, a chain transfer agent, a polymerization inhibitor, an antifoaming agent, a leveling agent, a thickener, a flame retardant, a surface-active substance, a dispersant, and a color material such as a dye and a pigment.

The liquid crystal composition may contain a thickener for the purpose of increasing the viscosity.

The thickener is preferably one capable of increasing the viscosity without significantly disturbing the alignment of the liquid crystal. For example, a polymer having a mesogenic structure is preferable.

Further, for example, a compound having a hydrogen bonding functional group is also preferable. The hydrogen bonding functional group is preferably a hydroxyl group, an amino group, a carboxyl group, a sulfo group, an amido group, a urethane group, a urea group, or the like.

Reflective Layer

The liquid crystal composition can be applied to various applications. Specifically, a cured product (for example, in the form of a film or the like) is obtained by subjecting the liquid crystal composition to a polymerization treatment (light irradiation treatment, heat treatment, or the like), and the cured product can be suitably applied, for example, as an optically anisotropic body and a reflective layer having excellent diffuse reflectivity. In addition, the optically anisotropic body is intended to refer to a substance which has optical anisotropy. In addition, the reflective layer corresponds to a layer formed by fixing a cholesteric liquid crystalline phase and can reflect light in a predetermined reflection band.

Method for Producing Reflective Layer

Hereinafter, a method for producing a reflective layer according to the embodiment of the present invention will be described.

The method for producing a reflective layer according to the embodiment of the present invention preferably has the following steps 1 to 3.

Step 1: a step of forming a composition layer using the above-mentioned liquid crystal composition on a transparent base material that has not been subjected to a uniaxial alignment treatment Step 2: a step in which the liquid crystal compound contained in the composition layer obtained through the step 1 is aligned into a cholesteric liquid crystalline phase state.

Step 3: a step of fixing the cholesteric liquid crystalline phase after the step 2

Step 1

In the step 1, first, the above-mentioned composition layer is prepared.

The method for producing the composition layer is not particularly limited and may be, for example, a method in which the liquid crystal composition is applied onto a base material to form a composition layer.

The base material is not particularly limited as long as it is not subjected to a uniaxial alignment treatment and supports the composition layer. With regard to the base material, more random alignment of the surface on which the composition layer is formed leads to more excellent diffuse reflectivity of a reflective layer to be formed.

The base material is particularly preferably a transparent base material. The transparent base material is intended to refer to a base material having a transmittance of visible light of 60% or more, and the transmittance thereof is preferably 80% or more and more preferably 90% or more. Note that the upper limit value of the transmittance is 100% or less.

The material constituting the base material is not particularly limited, and examples thereof include a cellulose-based polymer, a polycarbonate-based polymer, a polyester-based polymer, a (meth)acrylic polymer, a styrene-based polymer, a polyolefin-based polymer, a vinyl chloride-based polymer, an amide-based polymer, an imide-based polymer, a sulfone-based polymer, a polyether sulfone-based polymer, and a polyether ether ketone-based polymer. The base material is preferably a polymer obtained by curing a mixture of pentaerythritol triacrylate and pentaerythritol tetraacrylate, from the viewpoint that the diffuse reflectivity of the reflective layer is more excellent.

The base material may have a single-layer structure or a multilayer structure. In a case where the base material has a multilayer structure, the layer on the reflective layer side may be a layer that has not been subjected to a uniaxial alignment treatment.

The base material may contain various additives such as an ultraviolet (UV) absorber, a matting agent fine particle, a plasticizer, a deterioration inhibitor, and a release agent.

In addition, the base material preferably has low birefringence in the visible light region. For example, the phase difference at a wavelength of 550 nm of the base material is preferably 50 nm or less and more preferably 20 nm or less.

The thickness of the base material is not particularly limited, but it is preferably 10 to 200 μm and more preferably 20 to 100 μm from the viewpoint of thinning and handleability.

The thickness is intended to refer to an average thickness, and is obtained by measuring thicknesses at any five places of the base material and arithmetically averaging the measured values.

In a case where the above-mentioned composition is applied, the composition may contain a solvent, if necessary.

The solvent may be, for example, water or an organic solvent. Examples of the organic solvent include amides such as N,N-dimethylformamide; sulfoxides such as dimethylsulfoxide; heterocyclic compounds such as pyridine; hydrocarbons such as benzene and hexane; alkyl halides such as chloroform and dichloromethane; esters such as methyl acetate, butyl acetate, and propylene glycol monoethyl ether acetate; ketones such as acetone, 2-butanone, methyl ethyl ketone, cyclohexanone, and cyclopentanone; ethers such as tetrahydrofuran and 1,2-dimethoxyethane; and 1,4-butanediol diacetate. These solvents may be used alone or in combination of two or more thereof.

The method of applying the composition onto the base material is not particularly limited, and examples thereof include a wire bar coating method, an extrusion coating method, a direct gravure coating method, a reverse gravure coating method, and a die-coating method.

If necessary, a treatment for drying the composition applied onto the base material may be carried out after application. By carrying out the drying treatment, the solvent can be removed from the applied composition.

The film thickness of the composition layer disposed on the base material is not particularly limited, but is preferably 0.1 to 20 µm, more preferably 0.2 to 15 µm, and still more preferably 0.5 to 10 µm from the viewpoint of more excellent diffuse reflectivity of the reflective layer.

Step 2

The step 2 is a step in which the liquid crystal compound contained in the composition layer obtained through the step 1 is aligned into a cholesteric liquid crystalline phase state.

The method of aligning the liquid crystal compound may be, for example, a method of heating the composition layer. Specifically, the composition (composition layer) applied onto the substrate is heated to align the liquid crystal compound in the composition layer into a cholesteric liquid crystalline phase state.

The liquid crystalline phase transition temperature of the composition layer is preferably in the range of 10° C. to 250° C. and more preferably in the range of 10° C. to 150° C., from the viewpoint of manufacturing suitability.

As to preferred heating conditions, it is preferable to heat the composition layer at 40° C. to 100° C. (preferably 60° C. to 100° C.) for 0.5 to 5 minutes (preferably 0.5 to 2 minutes).

In a case of heating the composition layer, it is preferable not to heat the composition layer to a temperature at which the liquid crystal compound becomes an isotropic phase (Iso). In a case where the composition layer is heated above the temperature at which the liquid crystal compound becomes an isotropic phase, defects of the cholesteric liquid crystalline phase are increased, which is not preferable.

Step 3

The step 3 corresponds to a step of fixing the cholesteric liquid crystalline phase, and is carried out after the step 2. That is, the reflective layer obtained through the step 3 corresponds to a layer formed by fixing the cholesteric liquid crystalline phase.

Here, as the state where the cholesteric liquid crystalline phase is "fixed", the most typical and preferred aspect is a state in which the alignment of the liquid crystal compound brought into a cholesteric liquid crystalline phase is retained. The state where the liquid crystalline phase is "fixed" is not limited thereto, and specifically, it refers to a state in which, in a temperature range of usually 0° C. to 50° C. and in a temperature range of −30° C. to 70° C. under more severe conditions, the layer has no fluidity and can keep an fixed alignment state stably without causing changes in alignment state due to external field or external force. In the present invention, as will be described later, it is preferable to fix the alignment state of a cholesteric liquid crystalline phase by a curing reaction proceeding upon irradiation with ultraviolet rays.

In the layer obtained by fixing a cholesteric liquid crystalline phase, it is sufficient that the optical properties of the cholesteric liquid crystalline phase are retained in the layer, and finally the composition in the layer no longer needs to show liquid crystallinity.

The method of the fixing treatment is not particularly limited, and examples thereof include a photo curing treatment and a thermal curing treatment. Among them, a light irradiation treatment is preferable, and an ultraviolet irradiation treatment is more preferable. Such a fixing treatment is preferably a polymerization reaction upon light irradiation (particularly ultraviolet irradiation), and more preferably a radical polymerization reaction upon light irradiation (particularly ultraviolet irradiation).

For ultraviolet irradiation, a light source such as an ultraviolet lamp is used.

The irradiation energy quantity of ultraviolet rays is not particularly limited, but it is generally preferably about 0.1 to 0.8 J/cm$^2$. The irradiation time of the ultraviolet rays is not particularly limited, but it may be determined as appropriate from the viewpoint of both sufficient strength and productivity of the obtained reflective layer.

Step 4

The method for producing a reflective layer according to the embodiment of the present invention preferably includes a step 4, which is a step of cooling the composition layer in a cholesteric liquid crystalline phase state, between the step 2 and the step 3, from the viewpoint of further improving the diffuse reflectivity of the reflective layer. In particular, in a case where the liquid crystal composition contains a chiral agent whose helical twisting power (HTP) changes depending on the temperature, a reflective layer having more excellent diffuse reflectivity can be formed through the step 4.

In a case where the composition is cooled, it is preferable to cool the composition layer such that the temperature of the composition layer is lowered by 30° C. or more, from the viewpoint that the diffuse reflectivity of the reflective layer is more excellent. Above all, from the viewpoint that the above effect is more excellent, it is preferable to cool the composition layer so as to lower by 40° C. or more, and it is more preferable to cool the composition layer so as to lower by 50° C. or more. The upper limit value of the reduced temperature range of the cooling treatment is not particularly limited, but is usually about 70° C.

In other words, the above cooling treatment is intended to cool the composition layer so as to be T−30° C. or less in a case where the temperature of the composition layer in a cholesteric liquid crystalline phase state before cooling is T ° C.

The cooling method is not particularly limited, and includes a method in which a substrate on which the composition layer is disposed is allowed to stand in an atmosphere at a predetermined temperature.

In a case where the step 4 is carried out, it is preferable that the above-described fixing treatment in the step 3 is carried out simultaneously with the step 4 or after the step 4.

Applications of Reflective Layer

The reflective layer is a layer showing selective reflection properties with respect to light in a predetermined wavelength range. The reflective layer functions as a circularly polarized selective reflective layer that selectively reflects either the dextrorotatory circularly polarized light or the levorotatory circularly polarized light in the selective reflection wavelength range and transmits the other sense circularly polarized light. A film including one or two or more reflective layers can be used for various applications. In a film including two or more layers of a reflective layer, the senses of circularly polarized light reflected by the reflective layers may be the same or opposite to each other depending on the application. In addition, the center wavelengths of selective reflection of the reflective layers, which will be described later, may be the same as or different from each other depending on the application.

In the present specification, the term "sense" for circularly polarized light means dextrorotatory circularly polarized light or levorotatory circularly polarized light. The sense of circularly polarized light is defined such that, in a case where light is viewed as it proceeds toward an observer and in a case where the distal end of the electric field vector rotates clockwise as time increases, the sense is dextrorotatory circularly polarized light, and in a case where it rotates counterclockwise, the sense is levorotatory circularly polarized light. In the present specification, the term "sense" may be used for the twisted direction of the helix of the cholesteric liquid crystal. Selective reflection by the cholesteric liquid crystal reflects dextrorotatory circularly polarized light and transmits levorotatory circularly polarized light in a case where the twisted direction (sense) of the helix of the cholesteric liquid crystal is right-handed, whereas it reflects levorotatory circularly polarized light and transmits dextrorotatory circularly polarized light in a case where the sense is left-handed.

For example, a film including a reflective layer exhibiting selective reflection properties in the visible light wavelength range (wavelength of 400 to 750 nm) can be used as a screen for projected image display and a half mirror. Further, by controlling the reflection band, such a film can be used as a filter that improves the color purity of display light of a color filter or a display (for example, see JP2003-294948A).

In addition, the reflective layer can be used for various applications such as a polarizing element, a reflective film, an anti-reflection film, a viewing angle compensating film, holography, and an alignment film, which are constituent elements of an optical element.

Hereinafter, the application as a projected image display member which is a particularly preferable application will be described.

By the above-mentioned function of the reflective layer, a projected image can be formed by reflecting circularly polarized light of either sense at the wavelength showing selective reflection among the projected light. The projected image may be visually recognized as such by being displayed on the surface of the projected image display member or may be a virtual image which appears to float above the projected image display member as viewed from an observer.

The center wavelength $\lambda$ of the selective reflection depends on the pitch P of the helical structure (=the period of the helix) in a cholesteric liquid crystalline phase and follows the relationship of $\lambda = n \times P$ with the average refractive index n of the reflective layer. Here, the center wavelength $\lambda$ of the selective reflection of the reflective layer means a wavelength at the center position of the reflection peak of the circularly polarized reflection spectrum measured from the normal direction of the reflective layer. As can be seen from the above Expression, the center wavelength of the selective reflection can be adjusted by adjusting the pitch of the helical structure. That is, by adjusting the n value and the P value, for example, in order to selectively reflect either the dextrorotatory circularly polarized light or the levorotatory circularly polarized light with respect to the blue light, the center wavelength $\lambda$, is adjusted so that an apparent center wavelength of the selective reflection can be set to a wavelength range of 450 to 495 nm. Incidentally, the apparent center wavelength of the selective reflection means a wavelength at the center position of the reflection peak of the circularly polarized reflection spectrum of the reflective layer measured from the observation direction in practical use (in a case of being used as a projected image display member). Since the pitch of the cholesteric liquid crystalline phase depends on the type of the chiral agent to be used together with the liquid crystal compound or the addition concentration thereof, a desired pitch can be obtained by adjusting these factors. For the method of measuring the sense and pitch of helix, methods described in "Easy Steps in Liquid Crystal Chemistry Experiment" p 46, edited by The Japanese Liquid Crystal Society, Sigma Publishing, published in 2007, and "Liquid Crystal Handbook" p 196, Editorial Committee of Liquid Crystal Handbook, Maruzen can be used.

In addition, a projected image display member capable of displaying full color projected images can be produced by preparing and laminating reflective layers having an apparent center wavelength of the selective reflection in the red light wavelength range, the green light wavelength range, and the blue light wavelength range, respectively.

By adjusting the center wavelength of the selective reflection of each reflective layer according to the emission wavelength range of the light source used for projection and the mode of use of the projected image display member, a clear projected image can be displayed with high efficiency of light utilization. In particular, by adjusting the center wavelengths of the selective reflection of the reflective layer respectively according to the light emission wavelength range of the light source used for projection or the like, a clear color projected image can be displayed with high efficiency of light utilization.

In addition, for example, in a case where the projected image display member is configured to be transmissive to light in the visible light region, a half mirror that can be used as a combiner for a head-up display can be obtained. The projected image display half mirror can display the image projected from the projector in a visible manner, and in a case where the projected image display half mirror is observed from the same surface side where the image is displayed, can simultaneously observe the information or scenery on the opposite surface side.

Copolymer

The copolymer according to the embodiment of the present invention contains a repeating unit derived from the monomer represented by General Formula (X2) and a repeating unit derived from the monomer represented by General Formula (Y1), and has a weight-average molecular weight of less than 10,000. That is, the copolymer according to the embodiment of the present invention corresponds to one embodiment of the specific copolymer described above. The suitable aspect of the copolymer is the same as the suitable aspect of the specific copolymer described above, and therefore the description thereof will be omitted.

EXAMPLES

Hereinafter, the present invention will be described in more detail with reference to Examples. The materials, the used amount, the ratio, the contents of a treatment, and the procedures of a treatment described in Examples below may be suitably modified without departing from the spirit of the present invention. Accordingly, the scope of the present invention should not be limitatively interpreted by Examples described below.

Synthesis Example of Copolymer

Hereinafter, Synthesis Examples of copolymer 1-1 and copolymer 1-8 used in the Examples are shown as examples.

Synthesis Example 1: Synthesis of Copolymer 1-1

Synthesis Example of Monomer 1

According to JP2013-067603A, monomer 1 was synthesized according to the following synthesis procedure. In addition, "MsCl" is intended to refer to methanesulfonyl chloride, and "TEA" is intended to refer to triethylamine.

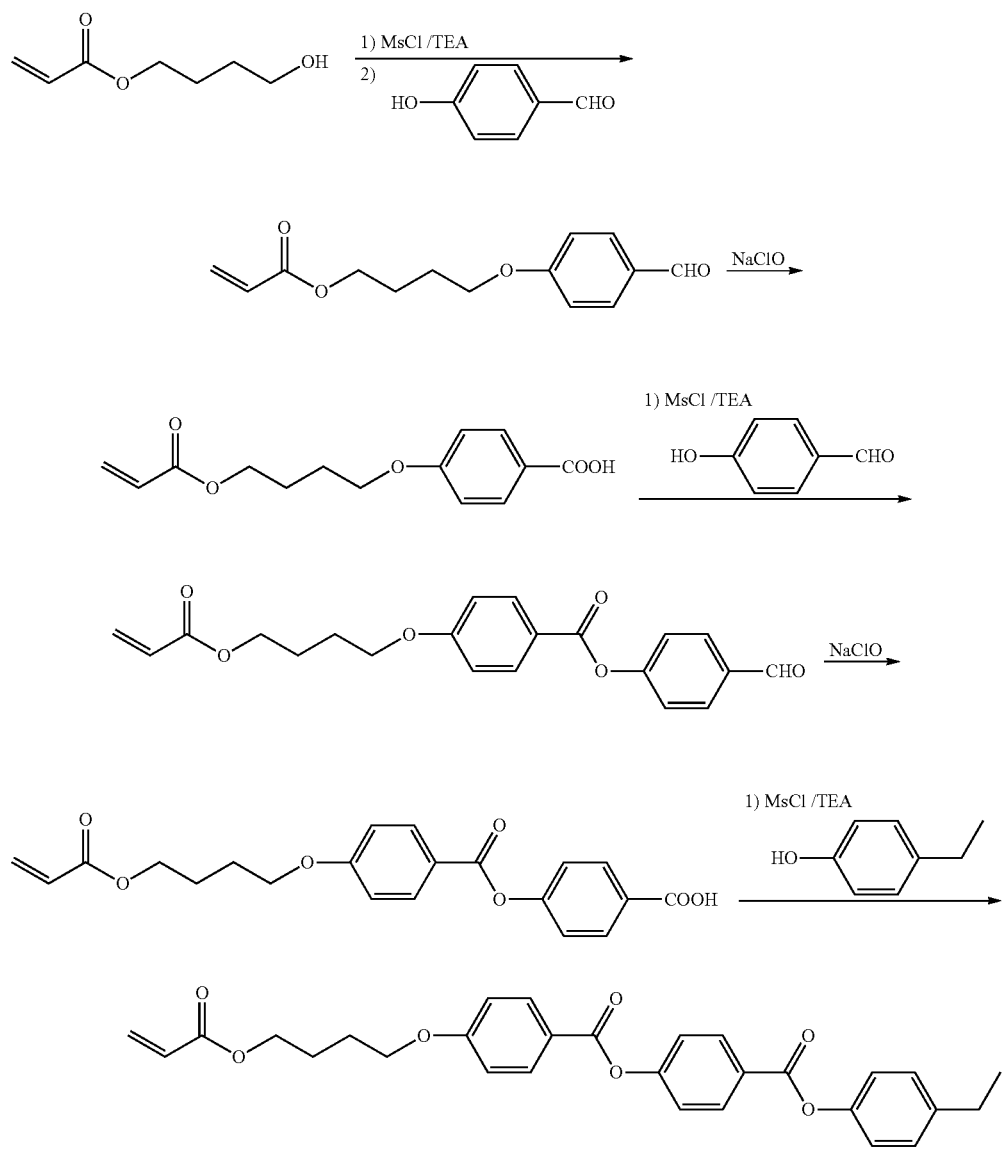

Monomer 1

Synthesis Example of Copolymer 1-1

84 g of cyclohexanone was charged into a 500 ml three-neck flask equipped with a stirrer, a thermometer, a reflux cooling pipe, and a nitrogen gas inlet, the inside of the flask was sufficiently purged with nitrogen, and then the temperature was raised to an internal temperature of 80° C.

Then, a mixed solution of 13.8 g (32.9 mmol) of 2-(perfluorohexyl)ethyl acrylate, 23.8 g (48.6 mmol) of monomer 1, 209 g of cyclohexanone, and 0.68 g of an azo polymerization initiator (V-601, manufactured by Wako Pure Chemical Industries, Ltd.) was added dropwise into the flask at a constant speed such that the dropwise addition was completed in 180 minutes. After the completion of the dropwise addition, the obtained reaction solution was further stirred at 80° C. for 2 hours, and then 0.07 g of an azo polymerization initiator (V-601, manufactured by Wako Pure Chemical Industries, Ltd.) was added thereto. Thereafter, the temperature of the reaction solution was raised to 90° C., and stirring was further continued for 2 hours to obtain copolymer 1-1 represented by the following formula.

The weight-average molecular weight (Mw) of the copolymer 1-1 was 5,800 (calculated in terms of polystyrene by gel permeation chromatography (GPC), in which the columns used were TSKgel SuperHZM-H, TSKgel SuperHZ4000, and TSKgel SuperHZ200 (manufactured by Tosoh Corporation)).

The compositional ratio of each repeating unit in the copolymer 1-1 is based on "% by mass". The compositional ratio of each repeating unit in the copolymer 1-2 to copolymer 1-10 and alignment control agent X-1 to alignment control agent X-4 is also based on "% by mass".

(1-1)

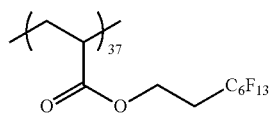

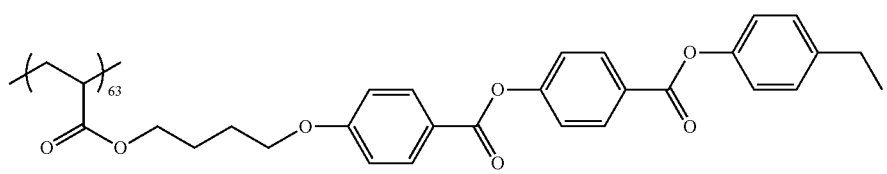

Mw = 5800

Synthesis Example 2: Synthesis of Copolymer 1-8

Synthesis Example of Monomer 2

According to Synthesis Example of monomer 1, monomer 2 was synthesized according to the following synthesis procedure.

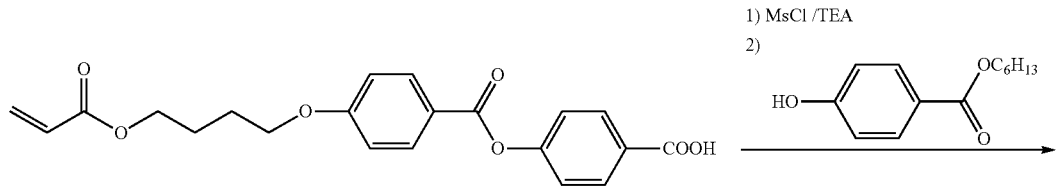

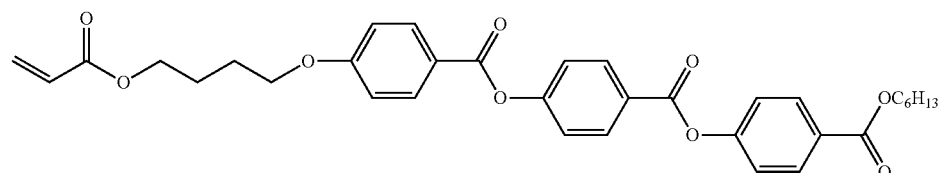

Monomer 2

Synthesis Example of Copolymer 1-8

8.5 g (20.3 mmol) of 2-(perfluorohexyl)ethyl acrylate, 19.7 g (33.7 mmol) of monomer 2, and 135 g of cyclohexanone were charged into a 300 ml three-neck flask equipped with a stirrer, a thermometer, a reflux cooling pipe, and a nitrogen gas inlet, the inside of the flask was sufficiently purged with nitrogen, and then the temperature was raised to an internal temperature of 80° C.

Next, a mixed solution of 1.0 g of an azo polymerization initiator (V-601, manufactured by Wako Pure Chemical Industries, Ltd.) and 31.3 g of cyclohexanone was added dropwise into the flask at a constant speed such that the dropwise addition was completed in 210 minutes. After the completion of the dropwise addition, the obtained reaction solution was stirred at 80° C. for 2 hours, then heated to 90° C., and further stirred for 2 hours to obtain copolymer 1-8 represented by the following formula.

The weight-average molecular weight (Mw) of the copolymer 1-8 was 8,800 (calculated in terms of polystyrene by gel permeation chromatography (GPC), in which the columns used were TSKgel SuperHZM-H, TSKgel SuperHZ4000, and TSKgel SuperHZ200 (manufactured by Tosoh Corporation)).

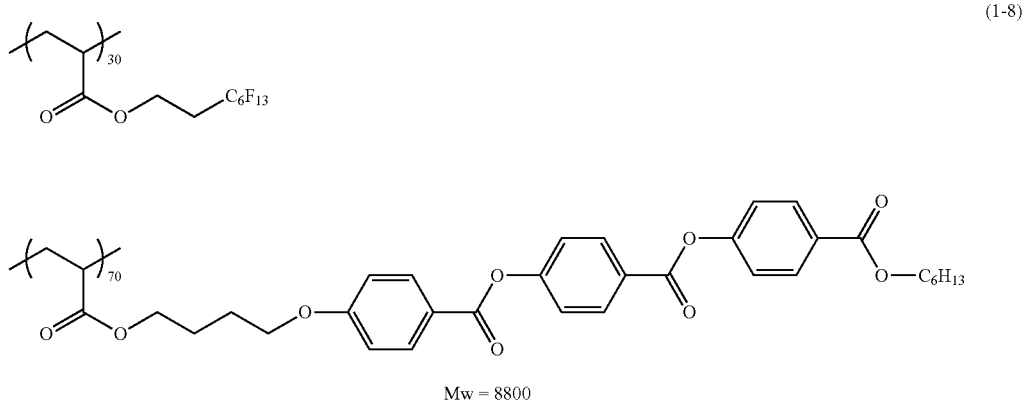

(1-8)

Mw = 8800

Preparation of Liquid Crystal Composition

The components shown in Table 1 below were mixed to prepare liquid crystal compositions of Examples 1 to 12 (corresponding to liquid crystal compositions 1 to 12) and liquid crystal compositions 1 to 5 of Comparative Examples (corresponding to liquid crystal compositions 13 to 17). Table 1 is shown below.

TABLE 1

| | | Composition of liquid crystal composition | | | | |
|---|---|---|---|---|---|---|
| | | Polymerizable liquid crystal compound | | | Chiral agent | Chiral agent |
| | Type of liquid crystal composition | Rod-like liquid crystal compound 201 | Rod-like liquid crystal compound 202 | Rod-like liquid crystal compound 203 | LC-756 (manufactured by BASF SE) | Chiral agent A |
| Example 1 | Liquid crystal composition 1 | 84 parts by mass | 14 parts by mass | 2 parts by mass | 4.9 parts by mass | — |
| Example 2 | Liquid crystal composition 2 | 84 parts by mass | 14 parts by mass | 2 parts by mass | — | 4.5 parts by mass |
| Example 3 | Liquid crystal composition 3 | 84 parts by mass | 14 parts by mass | 2 parts by mass | 4.9 parts by mass | — |
| Example 4 | Liquid crystal composition 4 | 84 parts by mass | 14 parts by mass | 2 parts by mass | — | 4.5 parts by mass |
| Example 5 | Liquid crystal composition 5 | 84 parts by mass | 14 parts by mass | 2 parts by mass | 4.9 parts by mass | — |
| Example 6 | Liquid crystal composition 6 | 84 parts by mass | 14 parts by mass | 2 parts by mass | 4.9 parts by mass | — |
| Example 7 | Liquid crystal composition 7 | 84 parts by mass | 14 parts by mass | 2 parts by mass | 4.9 parts by mass | — |
| Example 8 | Liquid crystal composition 8 | 84 parts by mass | 14 parts by mass | 2 parts by mass | 4.9 parts by mass | — |

TABLE 1-continued

| | | Composition of liquid crystal composition | | | |
|---|---|---|---|---|---|
| | Polymerization initiator | | | Solvent | |
| | Polymerization initiator IRG OXE-01 (manufactured by BASF SE) | Alignment control agent | | Cyclohexanone (manufactured by Wako Pure Chemical Industries, Ltd.) | 2-butanone (manufactured by Wako Pure Chemical Industries, Ltd.) |
| | | Type | Content | | |
| Example 1 | 2 parts by mass | Copolymer 1-1 | 0.15 parts by mass | 25 parts by mass | 200 parts by mass |
| Example 2 | 2 parts by mass | Copolymer 1-1 | 0.15 parts by mass | 25 parts by mass | 200 parts by mass |
| Example 3 | 2 parts by mass | Copolymer 1-2 | 0.15 parts by mass | 25 parts by mass | 200 parts by mass |
| Example 4 | 2 parts by mass | Copolymer 1-2 | 0.15 parts by mass | 25 parts by mass | 200 parts by mass |
| Example 5 | 2 parts by mass | Copolymer 1-3 | 0.15 parts by mass | 25 parts by mass | 200 parts by mass |
| Example 6 | 2 parts by mass | Copolymer 1-4 | 0.15 parts by mass | 25 parts by mass | 200 parts by mass |
| Example 7 | 2 parts by mass | Copolymer 1-5 | 0.15 parts by mass | 25 parts by mass | 200 parts by mass |
| Example 8 | 2 parts by mass | Copolymer 1-6 | 0.15 parts by mass | 25 parts by mass | 200 parts by mass |

| | | Composition of liquid crystal composition | | | | |
|---|---|---|---|---|---|---|
| | | Polymerizable liquid crystal compound | | | Chiral agent | Polymerization initiator |
| | Type of liquid crystal composition | Rod-like liquid crystal compound 201 | Rod-like liquid crystal compound 202 | Rod-like liquid crystal compound 203 | LC-756 (manufactured by BASF SE) | IRG OXE-01 (manufactured by BASF SE) |
| Example 9 | Liquid crystal composition 9 | 84 parts by mass | 14 parts by mass | 2 parts by mass | 4.9 parts by mass | 2 parts by mass |
| Example 10 | Liquid crystal composition 10 | 84 parts by mass | 14 parts by mass | 2 parts by mass | 4.9 parts by mass | 2 parts by mass |
| Example 11 | Liquid crystal composition 11 | 84 parts by mass | 14 parts by mass | 2 parts by mass | 4.9 parts by mass | 2 parts by mass |
| Example 12 | Liquid crystal composition 12 | 84 parts by mass | 14 parts by mass | 2 parts by mass | 4.9 parts by mass | 2 parts by mass |
| Comparative Example 1 | Liquid crystal composition 13 | 84 parts by mass | 14 parts by mass | 2 parts by mass | 4.9 parts by mass | 2 parts by mass |
| Comparative Example 2 | Liquid crystal composition 14 | 84 parts by mass | 14 parts by mass | 2 parts by mass | 4.9 parts by mass | 2 parts by mass |
| Comparative Example 3 | Liquid crystal composition 15 | 84 parts by mass | 14 parts by mass | 2 parts by mass | 4.9 parts by mass | 2 parts by mass |
| Comparative Example 4 | Liquid crystal composition 16 | 84 parts by mass | 14 parts by mass | 2 parts by mass | 4.9 parts by mass | 2 parts by mass |
| Comparative Example 5 | Liquid crystal composition 17 | 84 parts by mass | 14 parts by mass | 2 parts by mass | 4.9 parts by mass | 2 parts by mass |

| | | Composition of liquid crystal composition | | | |
|---|---|---|---|---|---|
| | | | | Solvent | |
| | Alignment control agent | | | Cyclohexanone (manufactured by Wako Pure Chemical Industries, Ltd.) | 2-butanone (manufactured by Wako Pure Chemical Industries, Ltd.) |
| | Type | Content | | | |
| Example 9 | Copolymer 1-7 | 0.15 parts by mass | | 25 parts by mass | 200 parts by mass |
| Example 10 | Copolymer 1-8 | 0.15 parts by mass | | 25 parts by mass | 200 parts by mass |
| Example 11 | Copolymer 1-9 | 0.15 parts by mass | | 25 parts by mass | 200 parts by mass |
| Example 12 | Copolymer 1-10 | 0.15 parts by mass | | 25 parts by mass | 200 parts by mass |
| Comparative Example 1 | — | — | | 25 parts by mass | 200 parts by mass |

| | | | | |
|---|---|---|---|---|
| Comparative Example 2 | Copolymer X-1 | 0.15 parts by mass | 25 parts by mass | 200 parts by mass |
| Comparative Example 3 | Copolymer X-2 | 0.15 parts by mass | 25 parts by mass | 200 parts by mass |
| Comparative Example 4 | Copolymer X-3 | 0.15 parts by mass | 25 parts by mass | 200 parts by mass |
| Comparative Example 5 | Copolymer X-4 | 0.15 parts by mass | 25 parts by mass | 200 parts by mass |

The various components shown in Table 1 are shown below.

Copolymer 1-1 to Copolymer 1-10

The copolymer 1-1 to copolymer 1-10 shown in Table 1 are shown below.

(1-1)

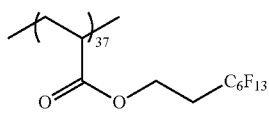
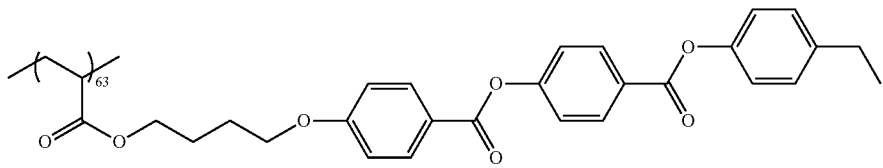

Mw = 5800

(1-2)

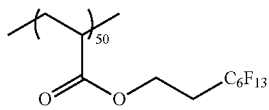
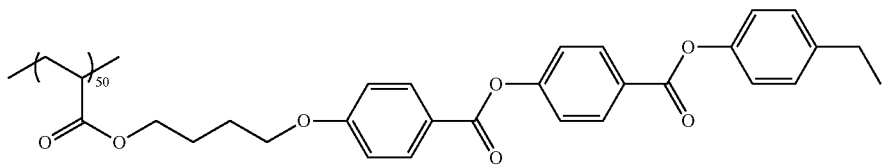

Mw = 5200

(1-3)

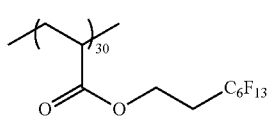
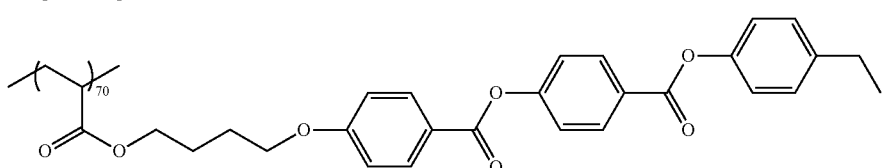

Mw = 4000

(1-4)

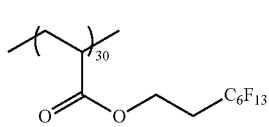

-continued
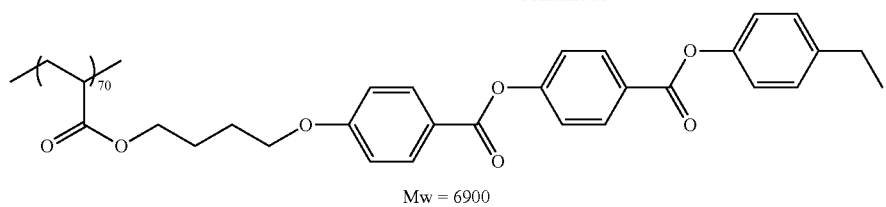
(1-5)
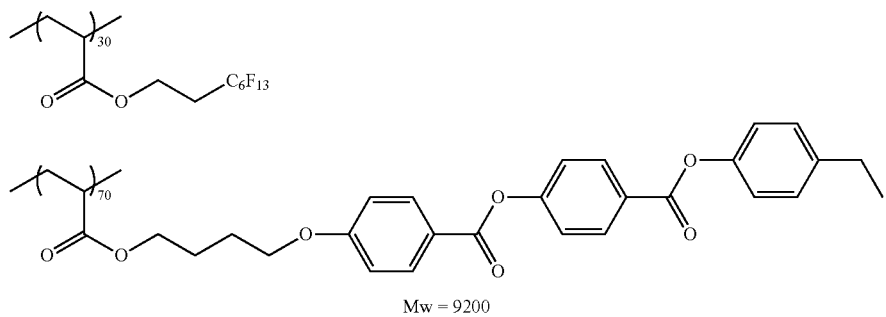
(1-6)
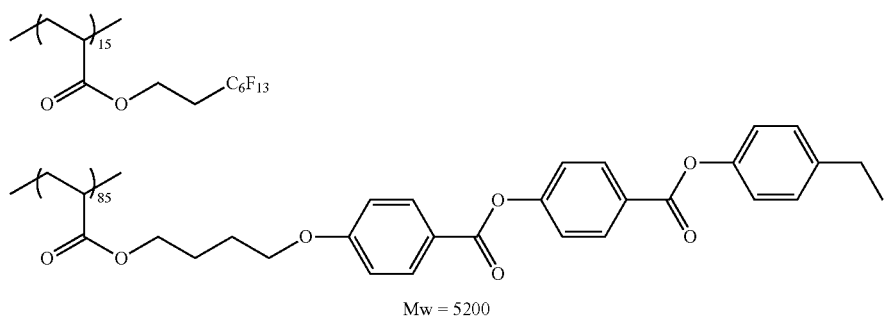
(1-7)
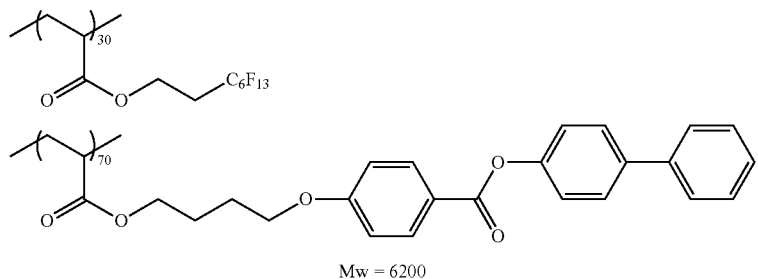
(1-8)
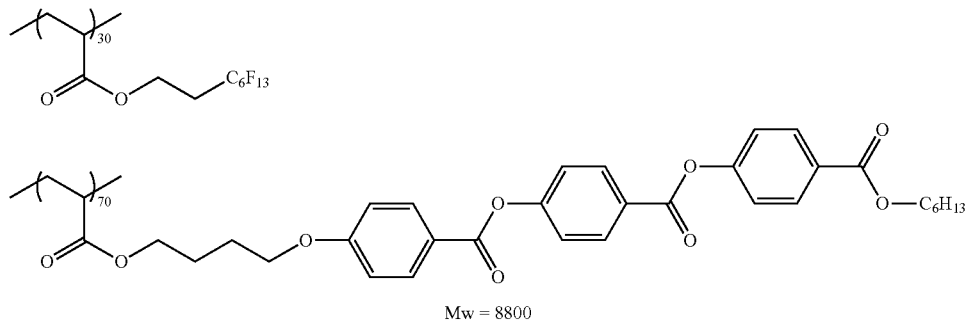
(1-9)
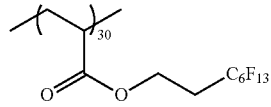

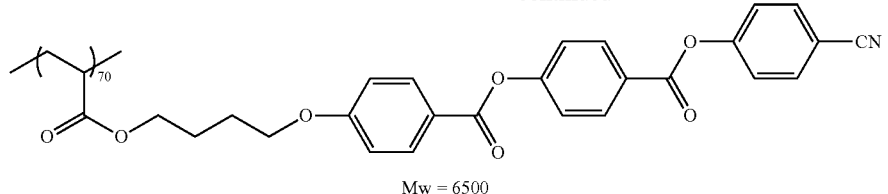
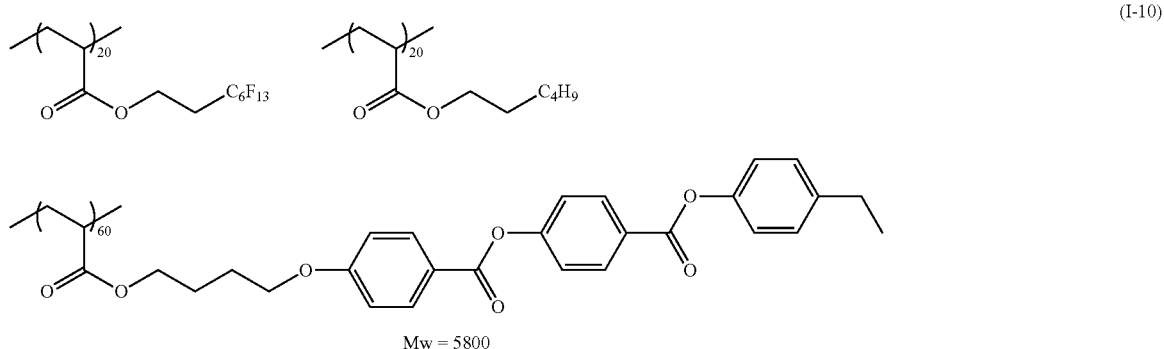
(I-10)
Rod-Like Liquid Crystal Compound 201
The rod-like liquid crystal compound 201 shown in Table 1 is shown below.
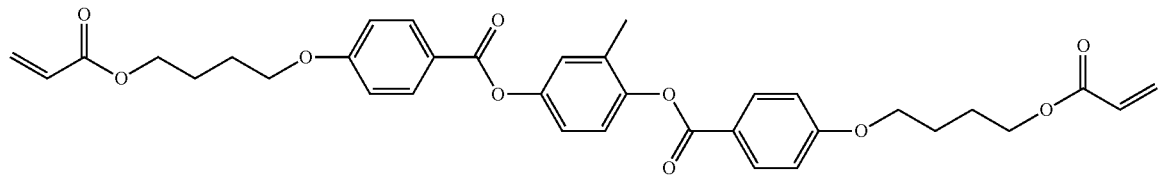 [SMILES: C=CC(=O)OCCCCOc1ccc(C(=O)Oc2ccc(OC(=O)c3ccc(OCCCCOC(=O)C=C)cc3)c(C)c2)cc1]
Rod-Like Liquid Crystal Compound 202
The rod-like liquid crystal compound 202 shown in Table 1 is shown below.
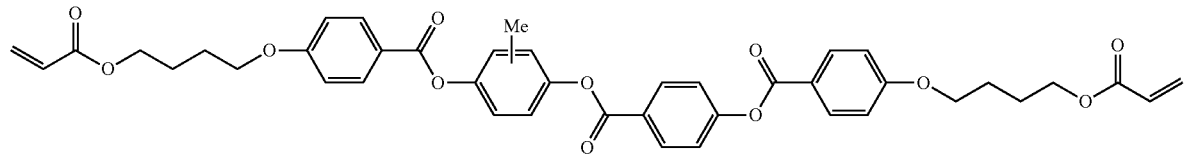
Rod-Like Liquid Crystal Compound 203
The rod-like liquid crystal compound 203 shown in Table 1 is shown below.
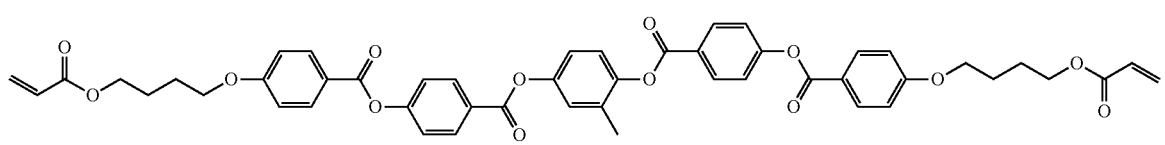 [SMILES: C=CC(=O)OCCCCOc1ccc(C(=O)Oc2ccc(C(=O)Oc3ccc(OC(=O)c4ccc(OC(=O)c5ccc(OCCCCOC(=O)C=C)cc5)cc4)c(C)c3)cc2)cc1]

Chiral Agent A

The chiral agent A shown in Table 1 is shown below.

Note that the chiral agent A is a chiral agent whose helical twisting power (HTP) changes depending on the temperature, and in a case of comparing the absolute value of HTP at 95° C. with the absolute value of HTP at 30° C., the absolute value of HTP at 30° C. is larger.

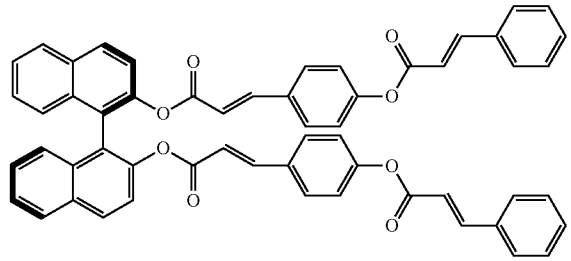

Alignment Control Agent X-1

The alignment control agent X-1 shown in Table 1 is shown below. A compound synthesized according to JP2006-016599A was used as the alignment control agent X-1.

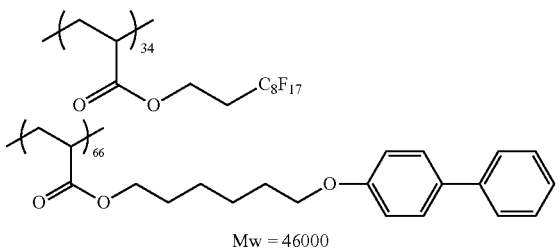

Mw = 46000

Alignment Control Agent X-2

The alignment control agent X-2 shown in Table 1 is shown below.

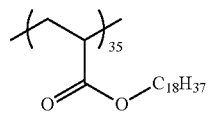

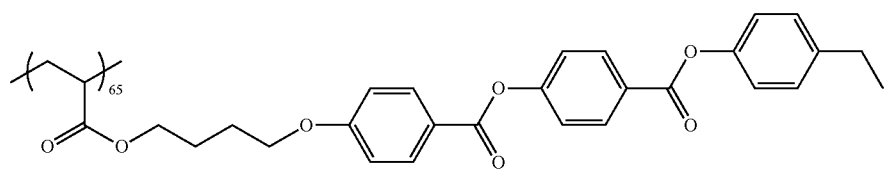

Mw = 5300

Alignment Control Agent X-3

The alignment control agent X-3 shown in Table 1 is shown below.

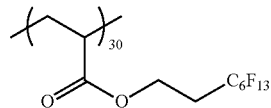

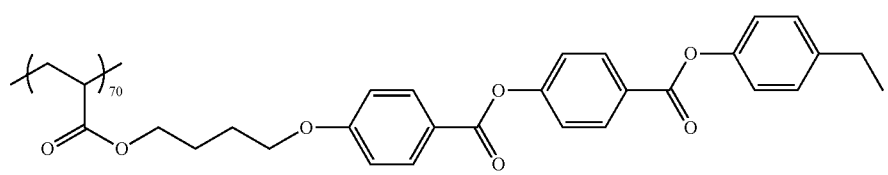

Mw = 33200

Alignment Control Agent X-4

The alignment control agent X-4 shown in Table 1 is shown below. A compound synthesized according to JP2007-217656A was used as the alignment control agent X-4.

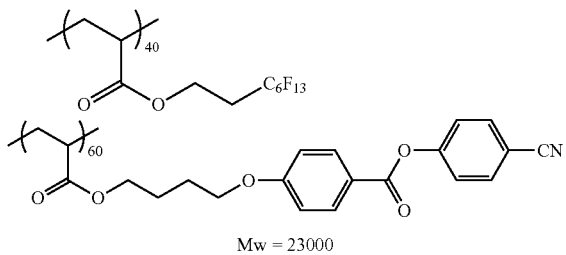

Mw = 23000

Preparation of Base Material

Preparation of Polymerizable Composition Coating Liquid A

The following components were mixed to prepare a polymerizable composition coating liquid A.

| | |
|---|---|
| PET30 (manufactured by Nippon Kayaku Co., Ltd.) | 100 parts by mass |
| Polymerization initiator (Irg819, manufactured by BASF SE) | 3 parts by mass |
| MEK (methyl ethyl ketone, manufactured by Wako Pure Chemical Industries, Ltd.) | 200 parts by mass |

Preparation of Acrylic Layer A

The polymerizable composition coating liquid A was applied onto a PET (polyethylene terephthalate) film (manufactured by Toyobo Co., Ltd.) at room temperature using a wire bar. The obtained coating layer was dried at room temperature for 30 seconds, and then heated in an atmosphere at 85° C. for 2 minutes.

Thereafter, the coating film was irradiated with ultraviolet rays at 30° C. for 6 seconds using a D bulb (lamp 90 mW/cm$^2$, output 60%, manufactured by Fusion Co., Ltd.) to form an acrylic layer A having a thickness of 2 μm (corresponding to a base material not subjected to uniaxial alignment).

The thickness of the acrylic layer A was measured by the following method.

<Film Thickness Measurement>

A part of the formed acrylic layer A was peeled off, and the film thickness was measured with a 10× objective lens using a profile measurement laser microscope VK-X200 (manufactured by Keyence Corporation).

Preparation of Reflective Layer

The liquid crystal composition shown in Table 1 was applied onto the prepared acrylic layer A using a wire bar to form a composition layer. Next, the composition layer of the liquid crystal composition was dried at room temperature for 50 seconds, and then heated in an atmosphere at 95° C. for 1 minute to align the liquid crystal compound (in other words, being brought into a cholesteric liquid crystalline phase state). Next, the composition layer in which the liquid crystal compound was aligned was cooled to 30° C.

Thereafter, with respect to the composition layer in which the liquid crystal compound was aligned, the coating layer was irradiated with ultraviolet rays at 30° C. for 8 seconds using a D bulb (lamp 90 mW/cm$^2$, output 80%, manufactured by Fusion Co., Ltd.) to form a reflective layer (fixed cholesteric liquid crystal layer) having a thickness of 1.6 μm. The thickness of the reflective layer was measured by a method which will be described later.

It was confirmed that each of the reflective layers had a reflection peak in a wavelength range of 450 to 650 nm.

In addition, the cross-sectional SEM observation of the reflective layer confirmed that the reflective layer of the Examples gives a stripe pattern of a bright portion (continuous line) and a dark portion (continuous line) to have a region in which the angle between the normal of a line formed by at least one dark portion and the surface of the CL layer periodically or irregularly changes.

Thickness of Reflective Layer

A part of the formed reflective layer was peeled off, and the film thickness was measured with a 10× objective lens using a profile measurement laser microscope VK-X200 (manufactured by Keyence Corporation).

Various Evaluations

<Evaluation of Diffuse Reflectivity (reflection amount at 45° ("45° reflection amount"))>

In addition, the prepared reflective layer was set facing the light source side on a spectrophotometer V-670 (manufactured by JASCO Corporation) equipped with an absolute reflectance measurement system, and the degree of the reflection performance at 45° was evaluated under the conditions of 0° incidence and 45° detection.

In addition, for the evaluation of the reflection performance at 45°, a graph was plotted by taking the wavelength on the lateral axis and the reflectance on the vertical axis, the reflectance derived from the substrate was removed, the area of the reflection peak in a region of 450 to 650 nm corresponding to the selective reflection wavelength of the reflective layer was calculated, and the size of this area was evaluated as the reflection amount at 45°.

The reflection amount is preferably 5.0 or more and more preferably 7.0 or more.

The results are shown in Table 2.

<Planar Evaluation>

With respect to the composition layer immediately after application using a wire bar, the surface state was visually confirmed under crossed nicols, and the planarity was evaluated according to the following evaluation standards.

In addition, in a case where the evaluation result was "C" or higher, it was judged as pass. The evaluation result is preferably "B" or higher and more preferably "A", from the viewpoint of more excellent production efficiency. The results are shown in Table 2.

(Evaluation Standards)

"A": "Drying unevenness" and "foreign matter" are not observed.

"B": "Drying unevenness" or "foreign matter" is slightly observed, but it can be used without any problem.

"C": "Unevenness due to drying unevenness" or "foreign matter" is slightly observed, but it can be used without any problem.

"D": "Unevenness due to drying unevenness" or "foreign matter" is often observed, which is thus not suitable for use.

In the following table, "Content of repeating unit represented by General Formula (X1)" is intended to refer to the content (% by mass) of the repeating unit containing a group represented by General Formula (X1) with respect to all the repeating units of the specific copolymer.

In the table, "-" shown in the column of "Whether or not $Z^1$ in General Formula (Y1) is hydrogen atom" is intended to mean that the copolymer used does not contain the "repeating unit represented by General Formula (Y1)".

In the table, "-" shown in the column of "Content of repeating unit represented by General Formula (X1)" is intended to mean that the copolymer used does not contain the "repeating unit represented by General Formula (X1)".

where the weight-average molecular weight of the specific copolymer was less than 9,000.

From the results of Example 8, it was confirmed that the planarity of the coating film was further improved and the reflective layer was more excellent in diffuse reflectivity, in a case where the content of the repeating unit containing a group represented by General Formula (X1) in the specific copolymer was 25% by mass or more with respect to all the repeating units.

From the results of Example 9, it was confirmed that, in the repeating unit represented by General Formula (Y1) in the specific copolymer, in a case where $Z^1$ is not a hydrogen atom (in a case where $Z^1$ is preferably an alkyl group having 1 to 20 carbon atoms in which —$CH_2$— may be substituted with —O—, —CO—O—, —O—CO—, or —CO—O—,

TABLE 2

| | | Specific copolymer | | | | | |
|---|---|---|---|---|---|---|---|
| | Type of liquid crystal composition | Type | Weight-average molecular weight | Whether or not $Z^1$ in General Formula (Y1) is hydrogen atom | Content of repeating unit represented by General Formula (X1) | Diffuse reflectivity | Planarity |
| Example 1 | Liquid crystal composition 1 | Copolymer 1-1 | 5800 | Non-hydrogen atom | 37% by mass | 7.8 | A |
| Example 2 | Liquid crystal composition 2 | Copolymer 1-1 | 5800 | Non-hydrogen atom | 37% by mass | 8.6 | A |
| Example 3 | Liquid crystal composition 3 | Copolymer 1-2 | 5200 | Non-hydrogen atom | 50% by mass | 7.4 | A |
| Example 4 | Liquid crystal composition 4 | Copolymer 1-2 | 5200 | Non-hydrogen atom | 50% by mass | 8.2 | A |
| Example 5 | Liquid crystal composition 5 | Copolymer 1-3 | 4000 | Non-hydrogen atom | 30% by mass | 7.4 | A |
| Example 6 | Liquid crystal composition 6 | Copolymer 1-4 | 6900 | Non-hydrogen atom | 30% by mass | 7.5 | A |
| Example 7 | Liquid crystal composition 7 | Copolymer 1-5 | 9200 | Non-hydrogen atom | 30% by mass | 7.5 | B |
| Example 8 | Liquid crystal composition 8 | Copolymer 1-6 | 5200 | Non-hydrogen atom | 15% by mass | 5.3 | C |
| Example 9 | Liquid crystal composition 9 | Copolymer 1-7 | 6200 | Hydrogen atom | 30% by mass | 6.3 | A |
| Example 10 | Liquid crystal composition 10 | Copolymer 1-8 | 8800 | Non-hydrogen atom | 30% by mass | 7.8 | A |
| Example 11 | Liquid crystal composition 11 | Copolymer 1-9 | 6500 | Non-hydrogen atom | 30% by mass | 7.7 | A |
| Example 12 | Liquid crystal composition 12 | Copolymer 1-10 | 5800 | Non-hydrogen atom | 40% by mass | 7.3 | A |
| Comparative Example 1 | Liquid crystal composition 13 | — | — | — | — | 6.2 | D |
| Comparative Example 2 | Liquid crystal composition 14 | Copolymer X-1 | 46000 | — | — | 0.2 | A |
| Comparative Example 3 | Liquid crystal composition 15 | Copolymer X-2 | 5300 | Non-hydrogen atom | — | 6.8 | D |
| Comparative Example 4 | Liquid crystal composition 16 | Copolymer X-3 | 33200 | Non-hydrogen atom | 30% by mass | 6.8 | D |
| Comparative Example 5 | Liquid crystal composition 17 | Copolymer X-4 | 23000 | — | 40% by mass | 4.5 | B |

From the results in Table 2, it was clear that the liquid crystal compositions of Examples had excellent planarity in a case of being formed into a coating film and was also capable of forming a reflective layer having excellent diffuse reflectivity.

From the comparison between Example 1 and Example 2 and the comparison between Example 3 and Example 4, it was confirmed that the diffuse reflectivity of the reflective layer was more excellent by carrying out a step of cooling the composition layer in a cholesteric liquid crystalline state (corresponding to the step 4) using a temperature-dependent chiral agent.

From the results of Example 7, it was confirmed that the planarity of the coating film was further improved in a case —O—CO—, or —CO—, an alkenyl group having 2 to 20 carbon atoms in which —$CH_2$— may be substituted with —O— or —CO—, a halogen atom, a cyano group, an acetyl group, a formyl group, a carboxy group, or a hydroxy group), the horizontal alignment of the liquid crystal compound was suppressed and the reflective layer was more excellent in diffuse reflectivity.

What is claimed is:
1. A liquid crystal composition comprising:
a polymerizable liquid crystal compound; and
a copolymer containing a repeating unit containing a group represented by General Formula (X1) and a repeating unit derived from a monomer represented by

General Formula (Y1), and having a weight-average molecular weight of less than 10,000;

wherein a content of a repeating unit derived from a monomer containing two or more polymerizable groups in the copolymer is less than 5 mol % with respect to all the repeating units of the copolymer:

in General Formula (X1), $L^{11}$ represents a perfluoroalkylene group having 1 to 6 carbon atoms which may contain —O—, $X^a$ represents a hydrogen atom or a fluorine atom, and * represents a bonding position, and

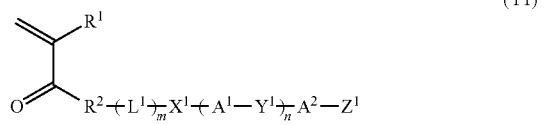

in General Formula (Y1), $R^1$ represents a hydrogen atom or a methyl group, $R^2$ represents —O— or —NR$^3$—, $R^3$ represents a hydrogen atom or an alkyl group having 1 to 3 carbon atoms, $L^1$ represents an alkylene group having 1 to 20 carbon atoms in which —CH$_2$— may be substituted with —O—, —S—, or —CO—, $X^1$ represents a single bond, —O—, —CO—O—, —O—CO—, —O—CO—O—, —O—CH$_2$—, —CH$_2$—O—, —C=N—, —N=C—, —CO—O—CH$_2$CH$_2$—, or —CH$_2$CH$_2$—CO—O—, $Y^1$ represents —O—, —CO—O—, —O—CO—, —O—CO—O—, —O—CH$_2$—, —CH$_2$—O—, —C=N—, —N=C—, —CO—O—CH$_2$CH$_2$—, or —CH$_2$CH$_2$—CO—O—, $A^1$ and $A^2$ each independently represent a phenylene group, a cyclohexylene group, or a naphthylene group, each of which may have a substituent, $Z^1$ represents an alkyl group having 1 to 20 carbon atoms in which —CH$_2$— may be substituted with —O—, —CO—O—, —O—CO—, or —CO—, an alkenyl group having 2 to 20 carbon atoms in which —CH$_2$— may be substituted with —O— or —CO—, a halogen atom, a cyano group, an acetyl group, a formyl group, a carboxy group, a hydrogen atom, or a hydroxy group, m represents 0 or 1, n represents an integer of 2 to 4, and a plurality of $A^1$'s and a plurality of $Y^1$'s each may be the same as or different from each other.

2. The liquid crystal composition according to claim 1, wherein a content of the repeating unit containing a group represented by General Formula (X1) is 25% by mass or more with respect to all the repeating units of the copolymer.

3. The liquid crystal composition according to claim 1, wherein the repeating unit containing a group represented by General Formula (X1) is a repeating unit derived from a monomer represented by General Formula (X2):

in General Formula (X2), $R^{11}$ represents a hydrogen atom or a methyl group, and $R^{12}$ represents a monovalent group containing the group represented by General Formula (X1).

4. The liquid crystal composition according to claim 1, wherein $Z^1$ is an alkyl group having 1 to 20 carbon atoms in which —CH$_2$— may be substituted with —O—, —CO—O—, —O—CO—, or —CO—, an alkenyl group having 2 to 20 carbon atoms in which —CH$_2$— may be substituted with —O— or —CO—, a halogen atom, a cyano group, an acetyl group, a formyl group, a carboxy group, or a hydroxy group.

5. The liquid crystal composition according to claim 1, wherein, in General Formula (Y1),
$A^1$ and $A^2$ each independently represent a 1,2-phenylene group, a 1,3-phenylene group, a 1,4-phenylene group, or a 1,4-cyclohexylene group, each of which may have a substituent,
$X^1$ represents a single bond, —O—, —CO—O—, or —O—CO—,
one or more of $Y^1$'s represent —CO—O— or —O—CO—, and
$Z^1$ represents an alkyl group having 1 to 8 carbon atoms in which —CH$_2$— may be substituted with —O—, —CO—O—, —O—CO—, or —CO—, an alkenyl group having 2 to 8 carbon atoms in which —CH$_2$— may be substituted with —O— or —CO—, a halogen atom, or a cyano group.

6. The liquid crystal composition according to claim 1, wherein the copolymer has a weight-average molecular weight of less than 9,000.

7. The liquid crystal composition according to claim 1, wherein a content of the copolymer is 0.01% by mass or more and less than 5% by mass with respect to a content of the polymerizable liquid crystal compound.

8. The liquid crystal composition according to claim 1, further comprising:
a chiral agent.

9. A method for producing a reflective layer, comprising:
a step 1 of forming a composition layer on a transparent base material not subjected to a uniaxial alignment treatment using the liquid crystal composition according to claim 1;
a step 2 of aligning a liquid crystal compound contained in the composition layer into a cholesteric liquid crystalline phase state; and
a step 3 of fixing the cholesteric liquid crystalline phase after the step 2.

10. A copolymer comprising:
a repeating unit derived from a monomer represented by General Formula (X2); and
a repeating unit derived from a monomer represented by General Formula (Y1),
wherein the copolymer has a weight-average molecular weight of less than 10,000;
wherein General Formula (Y1) does not include two or more polymerizable groups:

in General Formula (X2), $R^{11}$ represents a hydrogen atom or a methyl group, and $R^{12}$ represents a monovalent group containing a group represented by General Formula (X1),

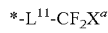

(X1)

in Formula (X1), $L^{11}$ represents a perfluoroalkylene group having 1 to 6 carbon atoms which may contain —O—, $X^a$ represents a hydrogen atom or a fluorine atom, and * represents a bonding position, and

(Y1)

in General Formula (Y1), $R^1$ represents a hydrogen atom or a methyl group, $R^2$ represents —O— or —$NR^3$—, $R^3$ represents a hydrogen atom or an alkyl group having 1 to 3 carbon atoms, $L^1$ represents an alkylene group having 1 to 20 carbon atoms in which —$CH_2$— may be substituted with —O—, —S—, or —CO—, $X^1$ represents a single bond, —O—, —CO—O—, —O—CO—, —O—CO—O—, —O—$CH_2$—, —$CH_2$—O—, —C=N—, —N=C—, —CO—O—$CH_2CH_2$—, or —$CH_2CH_2$—CO—O—, $Y^1$ represents —O—, —CO—O—, —O—CO—, —O—CO—O—, —O—$CH_2$—, —$CH_2$—O—, —C=N—, —N=C—, —CO—O—$CH_2CH_2$—, or —$CH_2CH_2$—CO—O—, $A^1$ and $A^2$ each independently represent a phenylene group, a cyclohexylene group, or a naphthylene group, each of which may have a substituent, $Z^1$ represents an alkyl group having 1 to 20 carbon atoms in which —$CH_2$— may be substituted with —O—, —CO—O—, —O—CO—, or —CO—, an alkenyl group having 2 to 20 carbon atoms in which —$CH_2$— may be substituted with —O— or —CO—, a halogen atom, a cyano group, an acetyl group, a formyl group, a carboxy group, a hydrogen atom, or a hydroxy group, m represents 0 or 1, n represents an integer of 2 to 4, and a plurality of $A^1$'s and a plurality of $Y^1$'s each may be the same as or different from each other.

11. The liquid crystal composition according to claim 1, wherein General Formula (Y1) does not include two or more polymerizable groups.

12. The liquid crystal composition according to claim 1, wherein $Z^1$ is an alkyl group having 1 to 20 carbon atoms in which —$CH_2$— may be substituted with —O—, —CO—O—, —O—CO—, or —CO—, a halogen atom, a cyano group, an acetyl group, a formyl group, a carboxy group, a hydrogen atom or a hydroxy group.

13. The copolymer according to claim 10, wherein $Z^1$ is an alkyl group having 1 to 20 carbon atoms in which —$CH_2$— may be substituted with —O—, —CO—O—, —O—CO—, or —CO—, a halogen atom, a cyano group, an acetyl group, a formyl group, a carboxy group, a hydrogen atom or a hydroxy group.

14. The liquid crystal composition according to claim 2, wherein the repeating unit containing a group represented by General Formula (X1) is a repeating unit derived from a monomer represented by General Formula (X2):

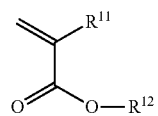

(X2)

in General Formula (X2), $R^{11}$ represents a hydrogen atom or a methyl group, and $R^{12}$ represents a monovalent group containing the group represented by General Formula (X1).

15. The liquid crystal composition according to claim 2, wherein $Z^1$ is an alkyl group having 1 to 20 carbon atoms in which —$CH_2$— may be substituted with —O—, —CO—O—, —O—CO—, or —CO—, an alkenyl group having 2 to 20 carbon atoms in which —$CH_2$— may be substituted with —O— or —CO—, a halogen atom, a cyano group, an acetyl group, a formyl group, a carboxy group, or a hydroxy group.

16. The liquid crystal composition according to claim 3, wherein $Z^1$ is an alkyl group having 1 to 20 carbon atoms in which —$CH_2$— may be substituted with —O—, —CO—O—, —O—CO—, or —CO—, an alkenyl group having 2 to 20 carbon atoms in which —$CH_2$— may be substituted with —O— or —CO—, a halogen atom, a cyano group, an acetyl group, a formyl group, a carboxy group, or a hydroxy group.

17. The liquid crystal composition according to claim 2, wherein, in General Formula (Y1),
$A^1$ and $A^2$ each independently represent a 1,2-phenylene group, a 1,3-phenylene group, a 1,4-phenylene group, or a 1,4-cyclohexylene group, each of which may have a substituent,
$X^1$ represents a single bond, —O—, —CO—O—, or —O—CO—,
one or more of $Y^1$'s represent —CO—O— or —O—CO—, and
$Z^1$ represents an alkyl group having 1 to 8 carbon atoms in which —$CH_2$— may be substituted with —O—, —CO—O—, —O—CO—, or —CO—, an alkenyl group having 2 to 8 carbon atoms in which —$CH_2$— may be substituted with —O— or —CO—, a halogen atom, or a cyano group.

18. A liquid crystal composition comprising:
a polymerizable liquid crystal compound; and
a copolymer containing a repeating unit derived from a monomer represented by General Formula (X4) and a repeating unit derived from a monomer represented by General Formula (Y1), and having a weight-average molecular weight of less than 10,000;
wherein a content of a repeating unit derived from a monomer containing two or more polymerizable groups in the copolymer is less than 5 mol % with respect to all the repeating units of the copolymer:

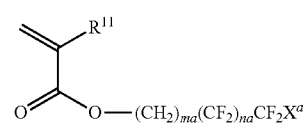

(X4)

in General Formula (X4), $R^{11}$ represents a hydrogen atom or a methyl group, ma represents an integer of 1 to 4, na represents an integer of 3 to 5, and $X^a$ represents a hydrogen atom or a fluorine atom, and

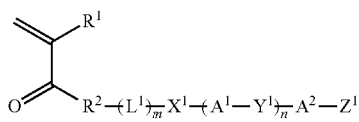

(Y1)

in General Formula (Y1), $R^1$ represents a hydrogen atom or a methyl group, $R^2$ represents —O— or —$NR^3$—, $R^3$ represents a hydrogen atom or an alkyl group having 1 to 3 carbon atoms, $L^1$ represents an alkylene group having 1 to 20 carbon atoms in which —$CH_2$— may be substituted with —O—, —S—, or —CO—, $X^1$ represents a single bond, —O—, —CO—O—, —O—CO—, —O—CO—O—, —O—$CH_2$—, —$CH_2$—O—, —C=N—, —N=C—, —CO—O—$CH_2CH_2$—, or —$CH_2CH_2$—CO—O—, $Y^1$ represents —O—, —CO—O—, —O—CO—, —O—CO—O—, —O—$CH_2$—, —$CH_2$—O—, —C=N—, —N=C—, —CO—O—$CH_2CH_2$—, or —$CH_2CH_2$—CO—O—, $A^1$ and $A^2$ each independently represent a phenylene group, a cyclohexylene group, or a naphthylene group, each of which may have a substituent, $Z^1$ represents an alkyl group having 1 to 20 carbon atoms in which —$CH_2$— may be substituted with —O—, —CO—O—, —O—CO—, or —CO—, an alkenyl group having 2 to 20 carbon atoms in which —$CH_2$— may be substituted with —O— or —CO—, a halogen atom, a cyano group, an acetyl group, a formyl group, a carboxy group, a hydrogen atom, or a hydroxy group, m represents 0 or 1, n represents an integer of 2 to 4, and a plurality of $A^1$'s and a plurality of $Y^1$'s each may be the same as or different from each other.

19. A copolymer comprising:

a repeating unit derived from a monomer represented by General Formula (X4); and a repeating unit derived from a monomer represented by General Formula (Y1), wherein the copolymer has a weight-average molecular weight of less than 10,000;

wherein General Formula (Y1) does not include two or more polymerizable groups:

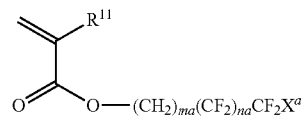

(X4)

in General Formula (X4), $R^{11}$ represents a hydrogen atom or a methyl group, ma represents an integer of 1 to 4, na represents an integer of 3 to 5, and $X^a$ represents a hydrogen atom or a fluorine atom, and

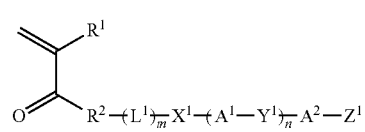

(Y1)

in General Formula (Y1), $R^{11}$ represents a hydrogen atom or a methyl group, $R^2$ represents —O— or —$NR^3$—, $R^3$ represents a hydrogen atom or an alkyl group having 1 to 3 carbon atoms, $L^1$ represents an alkylene group having 1 to 20 carbon atoms in which —$CH_2$— may be substituted with —O—, —S—, or —CO—, $X^1$ represents a single bond, —O—, —CO—O—, —O—CO—, —O—CO—O—, —O—$CH_2$—, —$CH_2$—O—, —C=N—, —N=C—, —CO—O—$CH_2CH_2$—, or —$CH_2CH_2$—CO—O—, $Y^1$ represents —O—, —CO—O—, —O—CO—, —O—CO—O—, —O—$CH_2$—, —$CH_2$—O—, —C=N—, —N=C—, —CO—O—$CH_2CH_2$—, or —$CH_2CH_2$—CO—O—, $A^1$ and $A^2$ each independently represent a phenylene group, a cyclohexylene group, or a naphthylene group, each of which may have a substituent, $Z^1$ represents an alkyl group having 1 to 20 carbon atoms in which —$CH_2$— may be substituted with —O—, —CO—O—, —O—CO—, or —CO—, an alkenyl group having 2 to 20 carbon atoms in which —$CH_2$— may be substituted with —O— or —CO—, a halogen atom, a cyano group, an acetyl group, a formyl group, a carboxy group, a hydrogen atom, or a hydroxy group, m represents 0 or 1, n represents an integer of 2 to 4, and a plurality of $A^1$'s and a plurality of $Y^1$'s each may be the same as or different from each other.

* * * * *